(12) United States Patent
Lee et al.

(10) Patent No.: US 7,889,524 B2
(45) Date of Patent: Feb. 15, 2011

(54) INTEGRATED BI-DIRECTIONAL CONVERTER FOR PLUG-IN HYBRID ELECTRIC VEHICLES

(75) Inventors: Young Joo Lee, Chicago, IL (US); Ali Emadi, Chicago, IL (US)

(73) Assignee: Illinois Institute of Technology, Chicago, IL (US)

( * ) Notice: Subject to any disclaimer, the term of this patent is extended or adjusted under 35 U.S.C. 154(b) by 663 days.

(21) Appl. No.: 11/975,530

(22) Filed: Oct. 19, 2007

(65) Prior Publication Data

US 2009/0103341 A1 Apr. 23, 2009

(51) Int. Cl.
*H02M 7/00* (2006.01)
(52) U.S. Cl. .................. 363/65; 363/124; 307/10.1
(58) Field of Classification Search ............... 363/65, 363/124; 307/10.1; 320/109, 116, 118
See application file for complete search history.

(56) References Cited

U.S. PATENT DOCUMENTS

| | | | |
|---|---|---|---|
| 5,343,970 A | 9/1994 | Severinsky | |
| 5,589,743 A | 12/1996 | King | |
| 5,818,115 A | 10/1998 | Nagao | |
| 6,075,331 A | 6/2000 | Ando et al. | |
| 6,202,615 B1 | 3/2001 | Pels et al. | |
| 6,320,274 B1 | 11/2001 | Goetze et al. | |
| 6,479,970 B2 | 11/2002 | Reddy | |
| 6,624,533 B1 | 9/2003 | Swanson et al. | |
| 6,683,389 B2 | 1/2004 | Geis | |
| 6,923,279 B2 | 8/2005 | Shimane et al. | |
| 7,013,205 B1 | 3/2006 | Hafner et al. | |
| 7,014,001 B2 | 3/2006 | Beckerman et al. | |
| 7,190,133 B2 | 3/2007 | King et al. | |
| 7,245,108 B2 * | 7/2007 | Chertok et al. | 320/132 |
| 7,352,154 B2 * | 4/2008 | Cook | 320/116 |
| 7,378,818 B2 * | 5/2008 | Fowler et al. | 320/119 |
| 7,681,676 B2 * | 3/2010 | Kydd | 180/65.21 |
| 2004/0065489 A1 | 4/2004 | Aberle et al. | |
| 2004/0140139 A1 | 7/2004 | Malik | |

FOREIGN PATENT DOCUMENTS

| | | |
|---|---|---|
| DE | 19709298 | 9/1998 |
| DE | 19752661 | 6/1999 |
| EP | 0644079 | 3/1995 |
| JP | 2004007972 | 1/2004 |
| WO | WO 2006/057889 | 6/2006 |
| WO | WO 2006/121761 | 11/2006 |
| WO | WO 2006/124130 | 11/2006 |

OTHER PUBLICATIONS

Co-pending U.S. Appl. No. 11/977,118, filed Oct. 23, 2007, Power Management for Multi-Module Energy Storage Systems in Electric, Hybrid Electric, and Fuel Cell Vehicles.

* cited by examiner

*Primary Examiner*—Adolf Berhane
(74) *Attorney, Agent, or Firm*—Pauley Petersen & Erickson

(57) ABSTRACT

This invention relates to a power module for a plug-in hybrid electric vehicle including an integrated converter having a rectifier changing AC to DC, a DC/DC converter changing from a first voltage to a second voltage, and a battery storing electrical energy. The integrated converter operates in three modes 1) AC plug-in charging mode, 2) boost mode supplying power from the battery to the electrical bus and 3) buck mode supplying power from the electrical bus to the battery. The integrated converter utilizes the same single inductor during each of the three operating modes to reduce cost and weight of the system.

20 Claims, 41 Drawing Sheets

INTEGRATED BI-DIRECTIONAL CONVERTER FOR PLUG-IN HYBRID ELECTRIC VEHICLES

BACKGROUND OF THE INVENTION

1. Field of the Invention

The present invention addresses the need for a plug-in hybrid electric vehicle and the control of the power for the vehicle.

2. Discussion of the Related Art

There is a need to reduce emissions and increase fuel economy or gas mileage from conventional internal combustion engine vehicles. In response to these needs, hybrid electric vehicles ("HEVs") have been developed that incorporate an electric drive system typically in combination with a smaller internal combustion engine and a generator. HEVs offer some advantages but still require the internal combustion engine to operate, usually even on shorter trips. The fuel economy of HEVs is improving, but there remains a need for vehicles with even greater fuel economy, further reduced emissions and vehicles that do not need to use the internal combustion engine for short and longer trips.

Plug-in hybrid electric vehicles ("PHEVs") offer an improvement over HEVs since they have an increased electric only range, increased fuel economy and reduced tailpipe emissions. Known PHEVs include separate AC chargers and separate DC/DC converters to provide the desired plug in functionality. Often, an additional power pack or battery is included in the PHEV. PHEVs charge the battery, provide power from the battery to the HEV and desirably capture surplus power from the HEV.

Known PHEV configurations include a cascade configuration which employees at least two inductor coils (usually at least three inductor coils) for the needed power management functions. Other limitations of this known configuration include increased weight, increased cost and increased space for the plug-in converter equipment.

There is a need and a desire for a simple stable converter design with a reduced number of large, heavy and costly components while offering safe and reliable functionality.

SUMMARY OF THE INVENTION

A general object of the invention is to provide a power module for a PHEV having a single inductor structure operating in plug-in charging, boost and buck modes.

A more specific objective of the invention is to overcome one or more of the problems described above.

The general object of the invention can be attained, at least in part, through an AC/DC power module for a plug-in hybrid electric vehicle having an electric drive system and an electric power supply. The power module includes a plug connectable to an AC power source, a rectifier, a bidirectional DC to DC converter, a battery and a bus connectable to the electric drive system of the HEV.

The rectifier includes a rectifier input connected to the plug for receiving an alternating current therethrough, a rectifier circuit changing alternating current to direct current and a rectifier output supplying a direct current.

The bidirectional DC to DC converter includes a first converter terminal operating at a first voltage and a second converter terminal operating at a second voltage that is different than the first voltage, a converter circuit changing direct current to or from the first voltage and the second voltage and the first converter terminal connected to the rectifier output.

The power module also includes an inductor coil where each of the rectifier and the bidirectional DC to DC converter include and use the inductor when power is utilized therethrough. This is a power inductor or a shared inductor configuration and saves cost, weight and space to form an integrated converter.

The battery connects to the first converter terminal and the second converter terminal while the bus connects to the first converter terminal and the second converter terminal.

The power module with the inductor operates in a plug-in charging mode to supply power from the plug to the battery, in a boost function mode to supply power from the battery to the bus and in a buck function mode to supply power from the bus to the battery.

According to an embodiment of this invention, the overall power module may include at least four switches and at least four diodes operatively connected with respect to each other.

The invention also includes a plug-in hybrid electric vehicle with the power module of this invention.

Another aspect of this invention includes a method of controlling power for a plug-in hybrid electric vehicle having an electric drive system. The method includes charging a battery with an AC power supply by rectifying power from alternating current to direct current and converting in a bidirectional DC to DC converter the power from a supply voltage to a battery voltage for storage in the battery, boosting power supplied to the hybrid electric vehicle when needed by the electric drive system by converting power stored in the battery from the battery voltage to a bus voltage for use by a bus connectable to the electric drive system and bucking power supplied by the hybrid electric vehicle when available by converting power from the bus voltage to the battery voltage for storage in battery.

According to an embodiment of this invention, the method charges the battery in less than about 8 hours and more desirably in less than about 4 hours. A controller with an algorithm controls switch gating within the bidirectional converter.

BRIEF DESCRIPTION OF THE DRAWINGS

These and other objects and features of this invention will be better understood from the following detailed description taken in conjunction with the drawings, wherein.

DETAILED DESCRIPTION

Conversion of conventional hybrid electric vehicles, also referred to as HEVs, into plug-in hybrid electric vehicles, also referred to as PHEVs, to reduce fuel consumption and emissions is desired. According to an embodiment of this invention, the conversion may be achieved either by adding a high energy battery pack or by replacing the existing battery pack of HEV in order to extend the all electric range. In either case, the high energy battery pack stores enough electrical energy from an external AC outlet and/or from regenerative braking while supplying the stored electrical energy to the drive system. AC outlet charging typically includes a battery charger composed of an AC/DC converter with a programmable digital controller having a proper voltage-current profile for the high energy battery pack. A bi-directional DC/DC converter typically follows with a well suited charging-discharging profile to transfer energy between the battery and the traction motor system.

According an embodiment of this invention, the PHEV conversion kit includes the add-on of a high energy battery without modifying the original HEV power system.

The high energy battery can operate at any suitable voltage. According to an embodiment of this invention, the add-on battery voltage is relatively lower than the voltage of the traction motor system for the HEV.

Adding an AC/DC and a bi-directional DC/DC converter in cascade to a PHEV increases the cost, the volume, the weight, the number of current transducers and the number of high current inductors. According to an embodiment of this invention, fault tolerances of the switching devices meet at least the standards for automotive safety.

A desirable design for a converter for a PHEV conversion minimizes an electrical impact on the existing HEV power system even when a fault current occurs. According to an embodiment of this invention, the conversion kit includes an integrated configuration for a bi-directional converter. The converter includes three operating modes: 1) plug-in charging of the add-on battery with a low voltage high energy density; 2) boosting from a low voltage to a high voltage bus of the HEV; and 3) regenerative charging of the add-on battery.

Figure 1A:
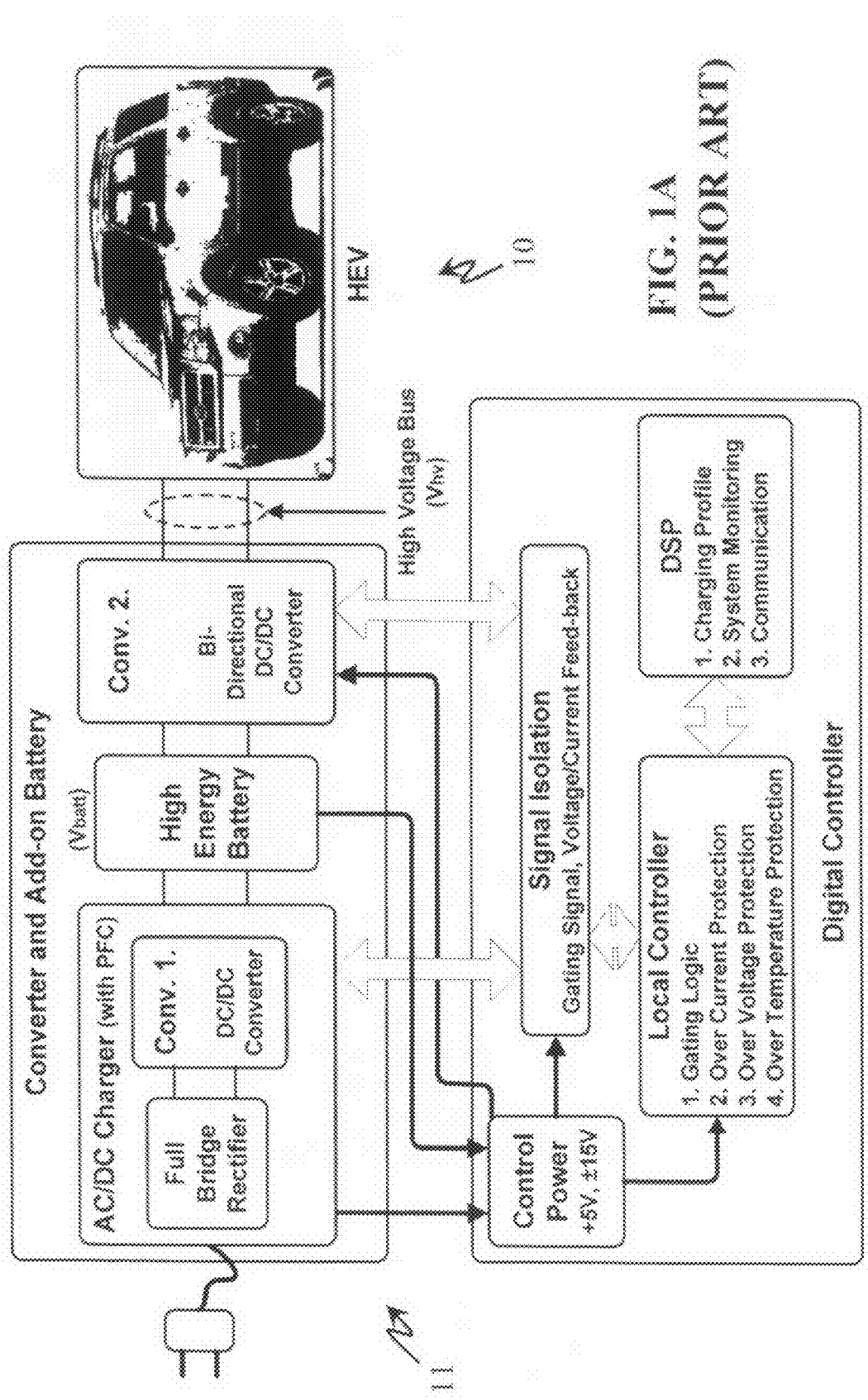
FIG. 1A is a PHEV conversion with an add-on battery, as known in the art.
Figure 1B:
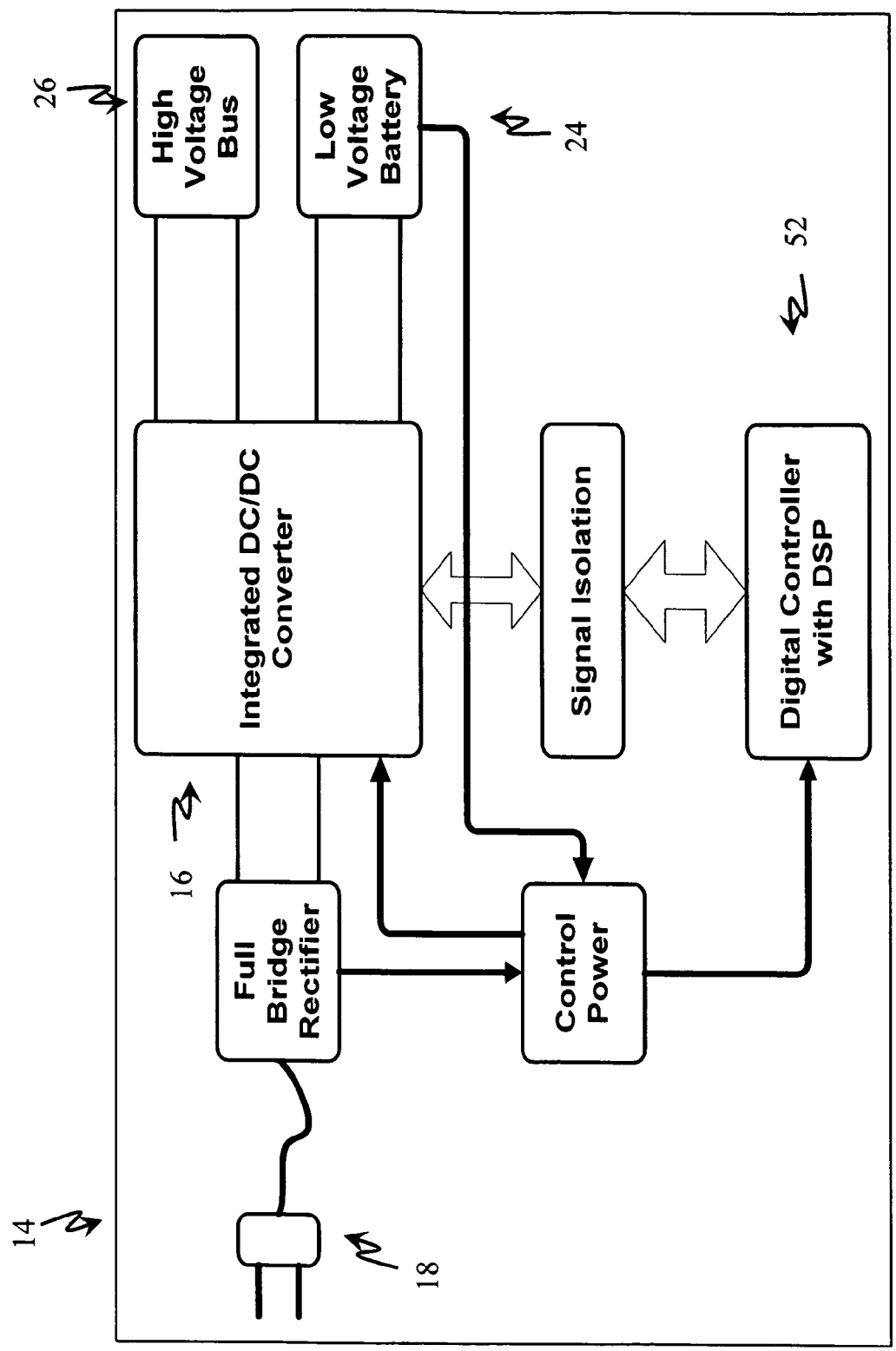
FIG. 1B is a system block diagram, according to an embodiment of this invention.

In general, plug-in electric vehicles can be divided into parallel PHEVs, series PHEVs and pure electric vehicles, also referred to as EVs. Other considerations for vehicle design may include range, power level and number of driven wheels. The overall typical diagrams of these three vehicle configurations is shown in FIG. 1D, FIG. 1E and FIG. 1F respectively, for example. Including the rectifier/charger capabilities and the bidirectional converter capabilities allows the plug-in electric vehicle functionality, as seen in FIGS. 1D-1F.

The term "Rectifier/Charger" includes a device for providing current from an AC outlet for plug-in charging of the high power battery.

The term "DC/DC Converter" includes a device for bi-directional capabilities and has two purposes: 1) boost functions; and 2) buck functions between the high power battery and the high voltage bus of electric traction system.

The term "boosting" includes, without limitation, the act of converting a power flow from a first voltage to a second higher voltage.

The term "bucking" includes, without limitation, the act of converting a power flow from a first voltage to a second lower voltage.

The term "High Voltage Storage", in FIGS. 1D-1F, for example, includes batteries, capacitors, supercapacitors, ultracapacitors and/or any other suitable device holding at least a portion an electric potential or charge. High Voltage Storage optionally aids during instantaneous peak power demand from the electric traction drive system (motor). According to an embodiment of this invention, the high voltage storage includes the original batteries of the HEV after conversion to the PHEV.

The functional requirements for plug-in electric vehicles include "Plug-In Charging Mode" for charging of the high power battery through an AC outlet or another suitable power source, "Boost Function Mode" for supplying electricity from the high power battery to the electric motor traction and "Buck Function Mode" for regenerative charging of the high power battery with electricity from regenerative braking of the traction system.

Figure 1C:
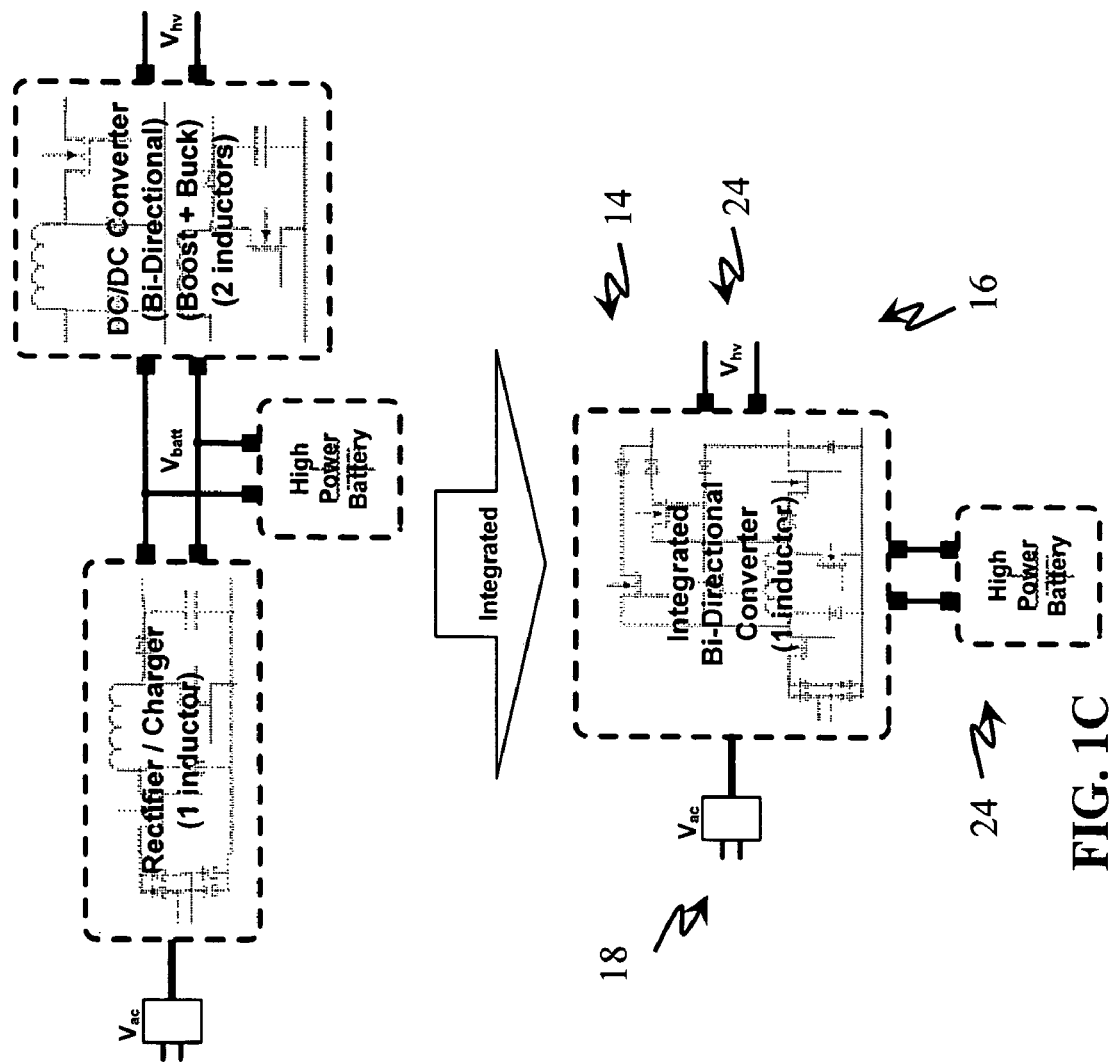
FIG. 1C shows integration of the charger and the bi-directional converter, according to an embodiment of this invention.
Figure 1D:
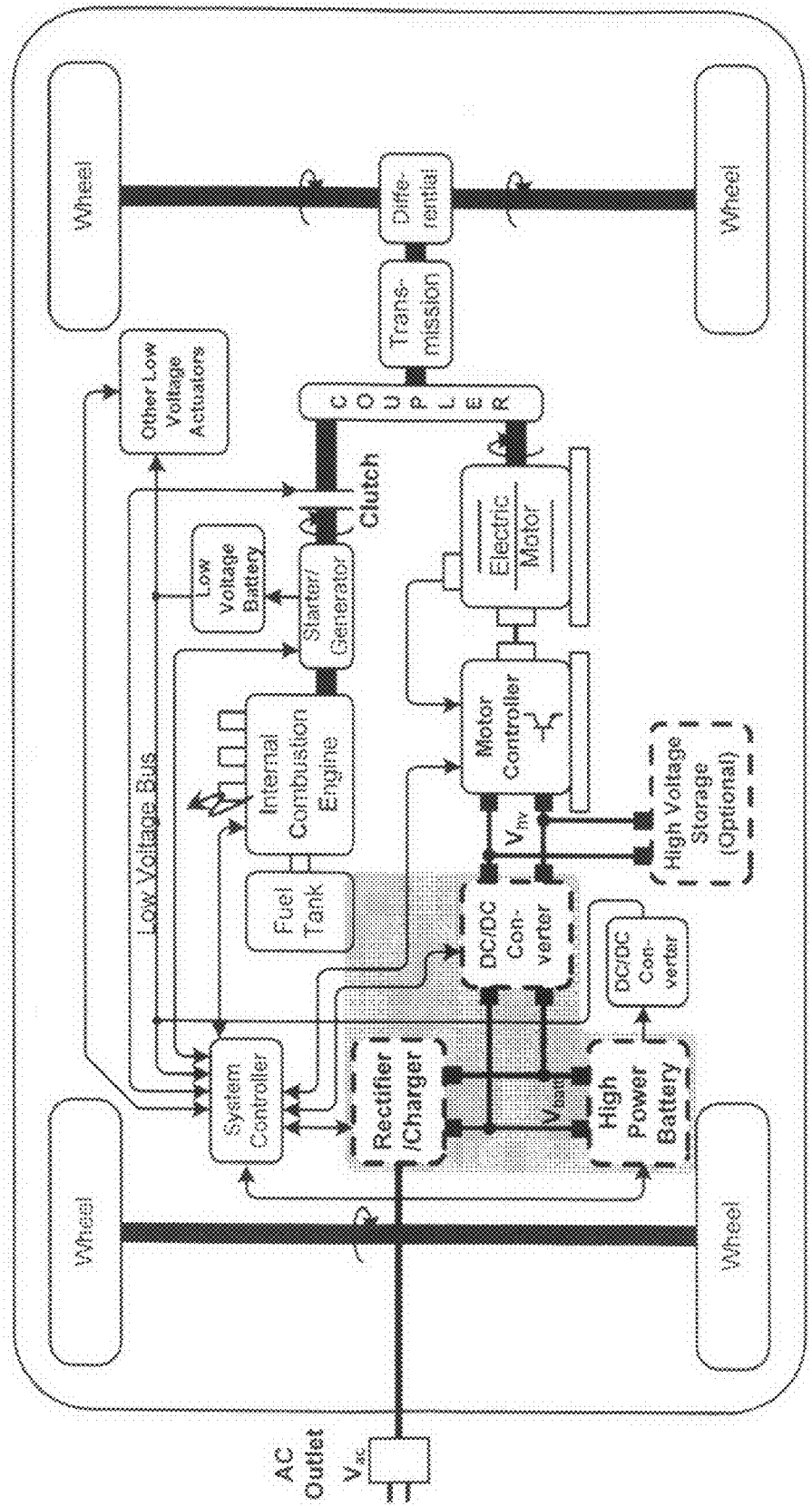
FIG. 1D is an overall diagram of parallel PHEVs, according to an embodiment of this invention.
Figure 1E:
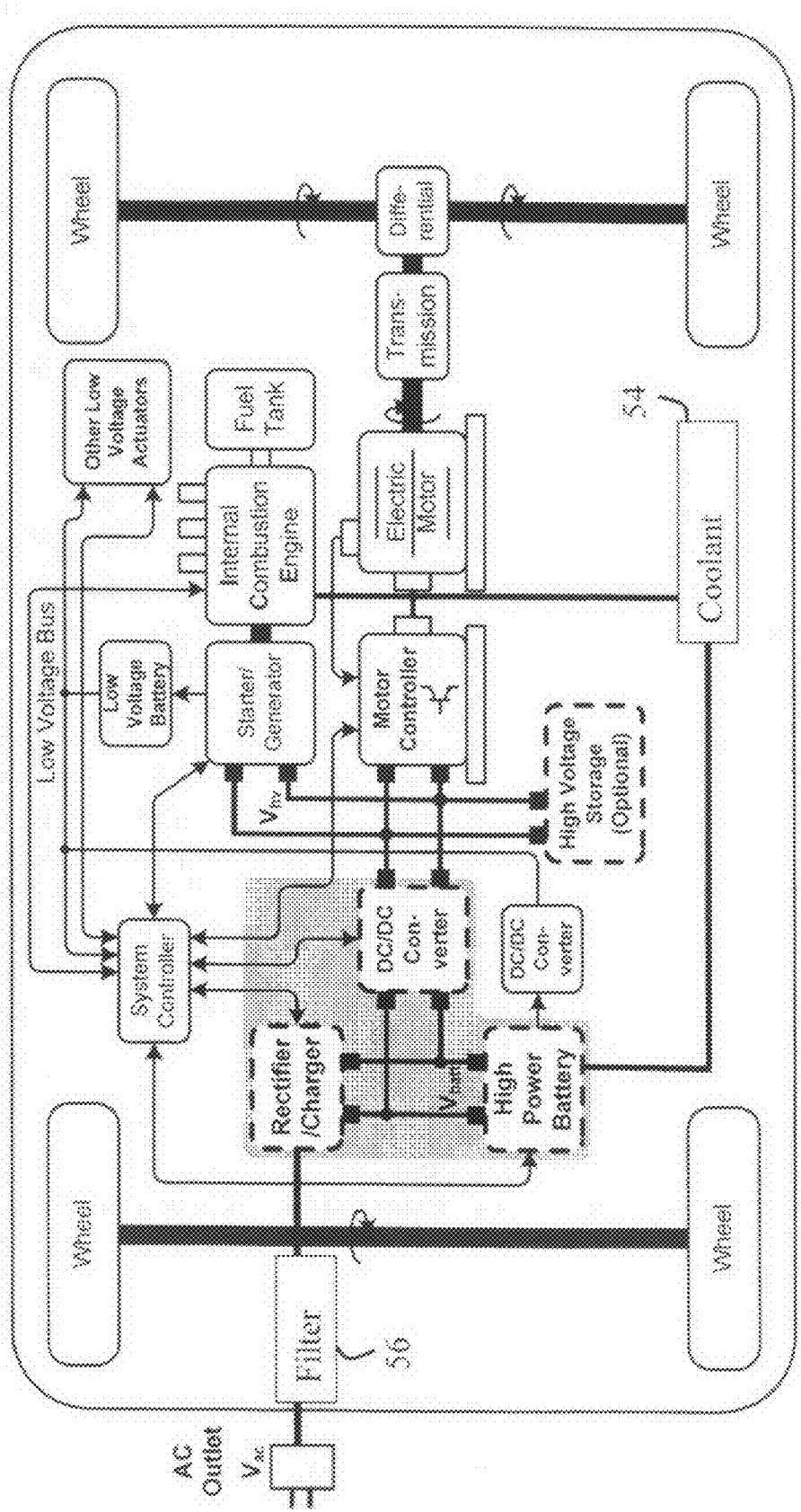
FIG. 1E is an overall diagram of series PHEVs, according to an embodiment of this invention.
Figure 1F:
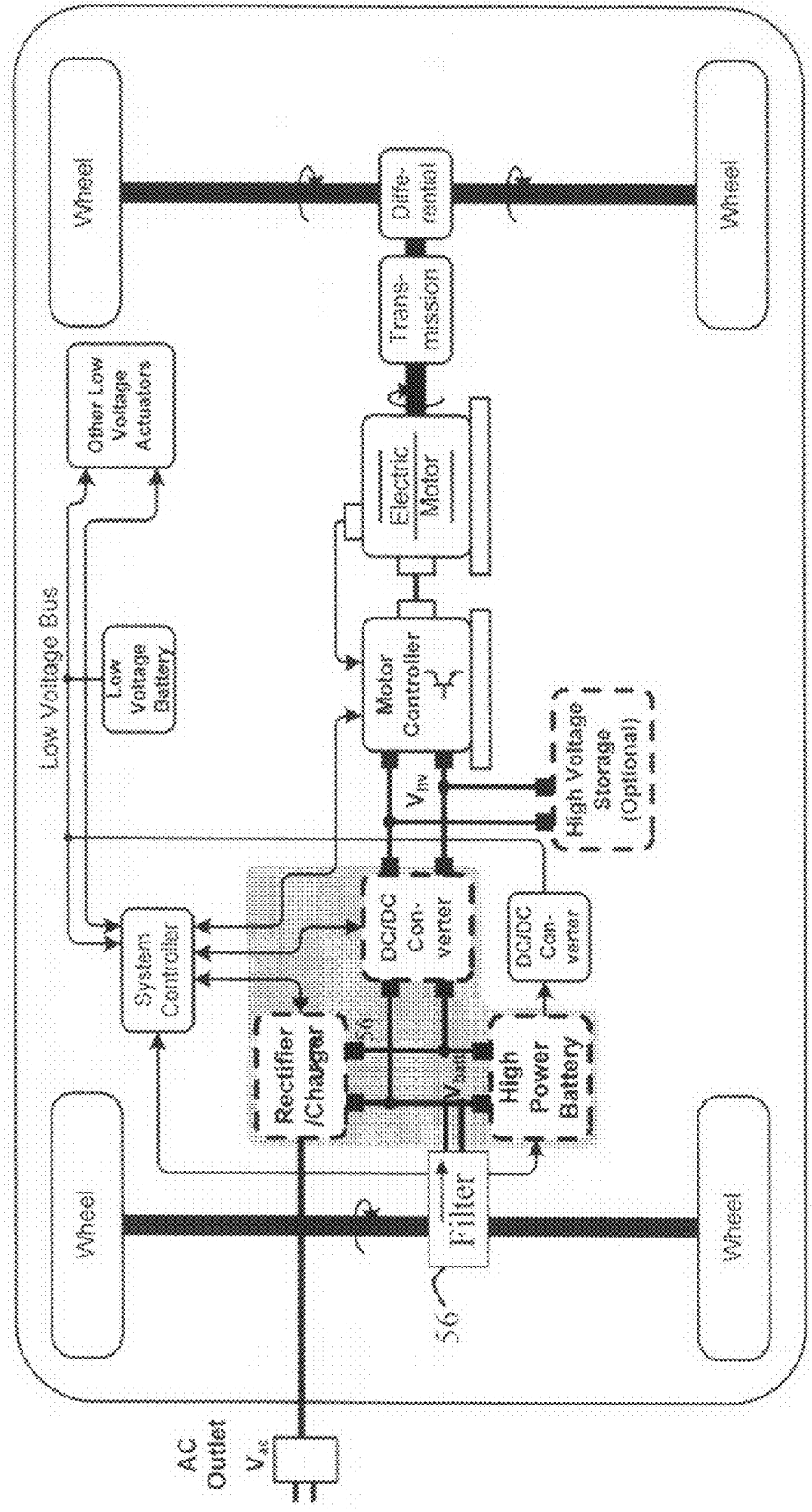
FIG. 1F is an overall diagram of pure EVs, according to an embodiment of this invention.

According to an embodiment of this invention, the rectifier/charger and the bi-directional DC/DC converter are integrated into a unitary device, as shown in FIG. 1C. The AC/DC power module including the battery provides three operating modes with only one inductor or inductor coil assembly, also referred to as a "power inductor", while providing a simple and stable control strategy. Other advantages include reduced cost, smaller size, lighter weight and a strategy of increasing power ratting. Configurations with a shared inductor structure (3 modes), but including multiple smaller inductors, such as, in parallel, are possible.

Figure 2A:
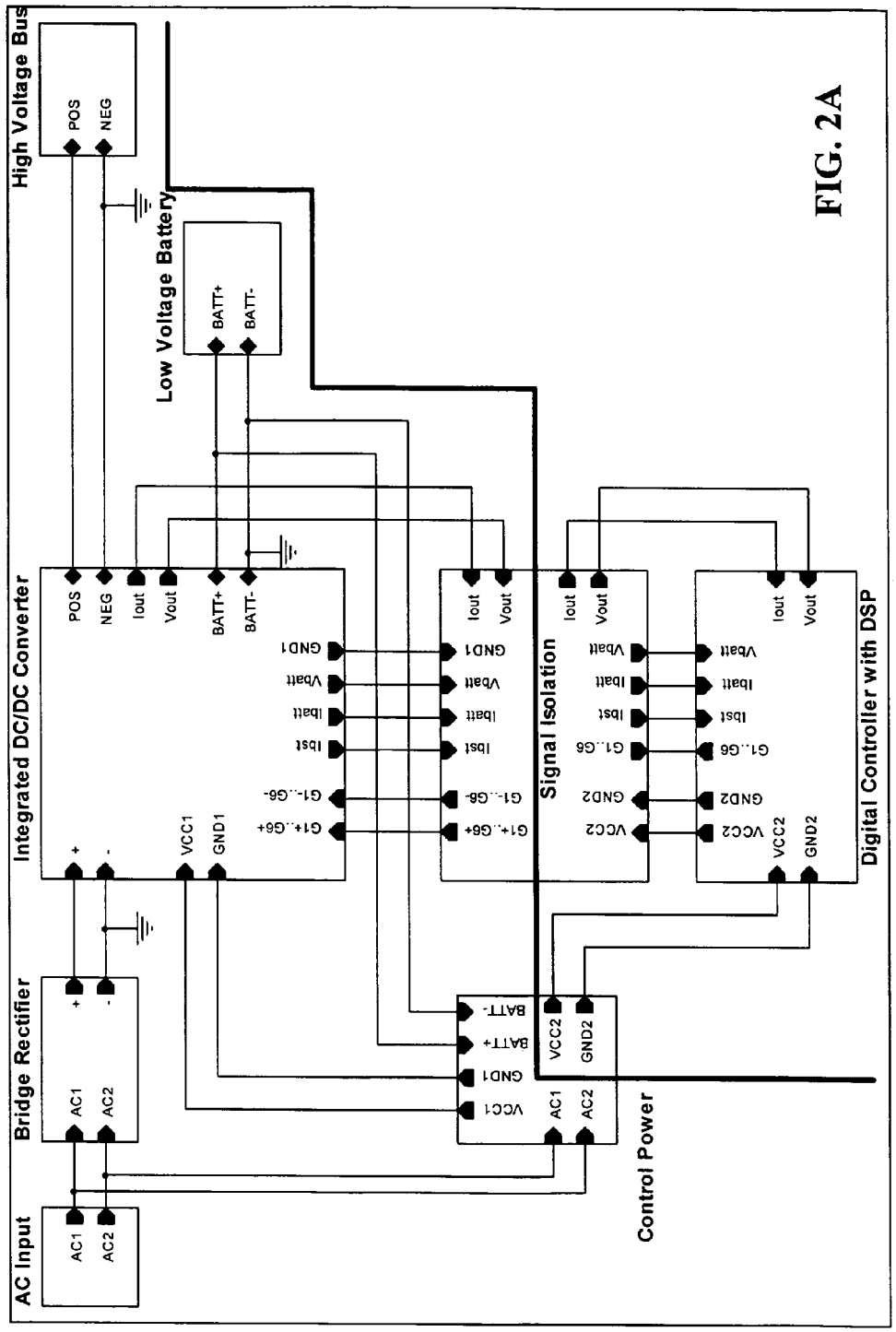
FIG. 2A is an interfacing diagram, according to an embodiment of this invention.
Figure 2B:
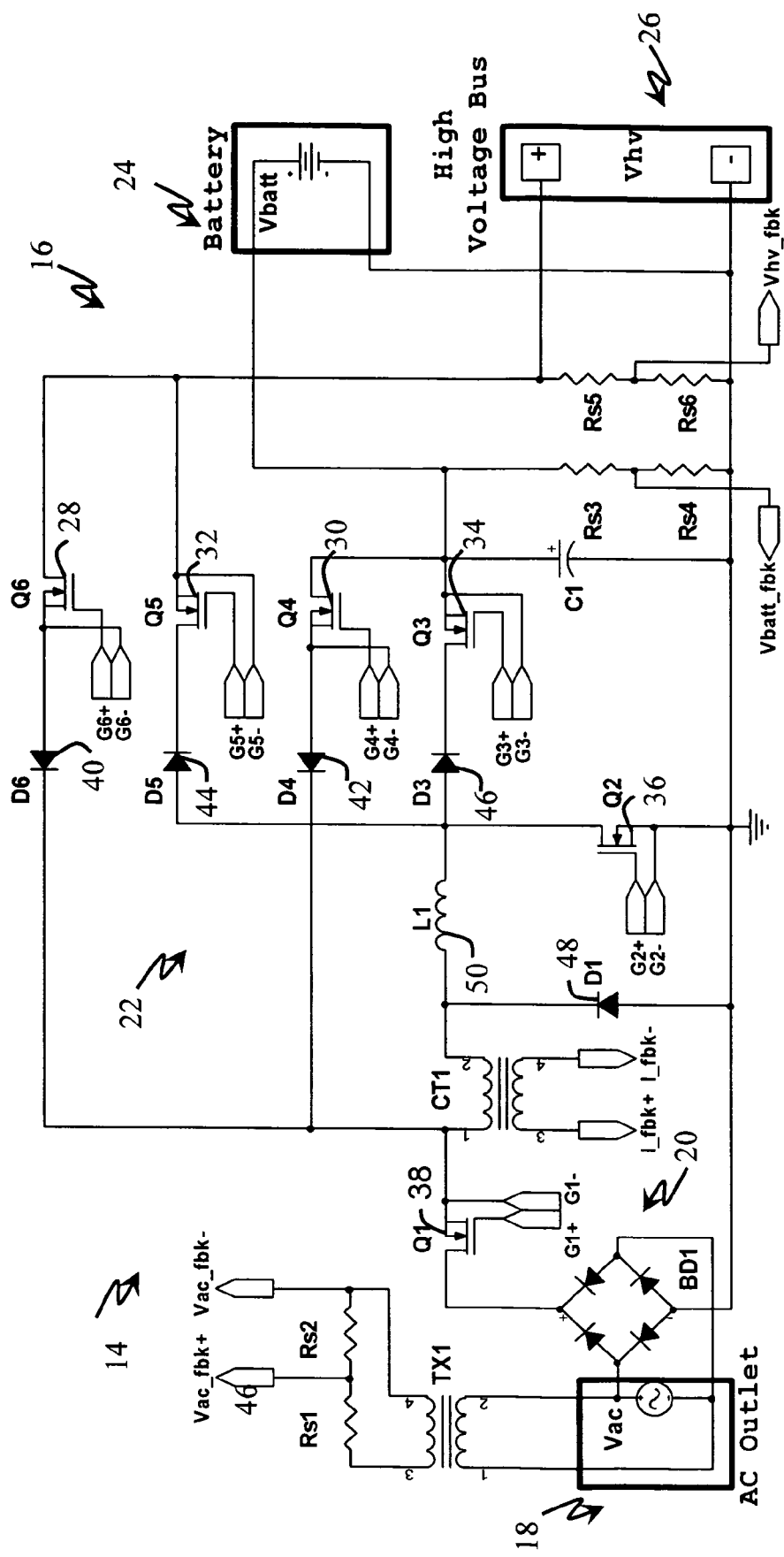
FIG. 2B is an overall schematic of the IBC, according to an embodiment of this invention.

According to an embodiment of this invention and as shown in FIG. 2B, the integrated converter does not utilize a cascaded structure. The integrated converter includes one inductor, six switches, and five diodes which properly combine in order to construct buck and boost modes among the voltage sources Vac, Vbatt and Vhv.

According an embodiment of this invention, the integrated converter includes one current feedback I_fbk and three voltage feedbacks Vac_fbk, Vbatt_fbk and Vhv_fbk. Pulse Width Modulation is also referred to as "PWM". PWM gating signals may be generated by a controller using either truly digital control or a classic control method, such as, PID-control (proportional-integral-derivative) or the combination of those two or any other suitable control schemes.

The controller may include a digital signal processor, a microprocessor, a microcontroller, a central processor unit and/or any other suitable device for executing a control algorithm or software sequence.

Q1, Q2 and Q6 desirably include PWM switching for buck and boost functions. Q3, Q4 and Q5 desirably function as simple on/off switches to connect or to disconnect the corresponding current flow paths. If the minimum value of Vbatt (Vbatt_min) is chosen to be higher than Vac_pk, then Q1 can be eliminated to reduce the number of switches and reduce conduction losses during plug-in charging, for example.

FIG. 1A shows the overall configuration of a known conventional PHEV conversion utilizing a cascade configuration 11. The main elements for the conventional conversion include an AC/DC charger, a high energy battery added to HEV, a bi-directional DC/DC converter and a digital controller with a digital signal processor, also referred to as a "DSP".

These main elements are arranged in cascade except the digital controller, as seen in FIG. 1A. The charger for plug-in charging is composed of two separate and distinct parts: 1) an AC/DC rectifier; and 2) a DC/DC converter (Conv. 1.). Another separate and distinct part, the bi-directional DC/DC converter (Conv. 2.), is placed between the add-on battery and the high voltage bus of the HEV The digital controller controls and monitors the AC/DC charger and the bi-directional DC/DC converter while in communication with an external system. In FIG. 1A, three voltages exist, AC outlet voltage ($V_{ac}$), battery voltage ($V_{batt}$) and high voltage bus of HEV ($V_{hv}$). These voltages often are at different levels with respect to each other and for each converter. For example, Conv. 1. with power factor correction, also referred to as "PFC", should be in buck-boost operation when peak value of Vac ($V_{ac\_pk}$) is higher than $V_{batt}$, and otherwise be only in boost operation. A similar logic applies to Conv. 2. with $V_{batt}$ for input and $V_{hv}$ for output.

Conv. 1. is for plug-in charging and Conv. 2. is for transferring battery energy to HEV and for regenerative charging of the battery, respectively. These three operations do not occur at the same time. Plug-in charging does not occur while driving down the road. Also, discharging and regenerative charging of the battery are exclusive each other.

A block diagram and an interfacing diagram of the integrated converter of an embodiment of this invention are shown in FIGS. 1B and 2A, respectively. Comparing FIG. 1A to FIG. 1B shows a power module 14 of this invention replaces the cascade configuration 11. The power module 14, according to an embodiment of this invention, is suitable for use in PHEVs as well as a retrofit kit to convert a HEV to a PHEV.

The integrated converter of this invention includes of two main parts. The first includes the high power sub-system including from the AC input to the high voltage bus output. The second includes the controller with lower power consumption. Significant cost savings occur with the integrated DC/DC converter of this invention, as shown in FIG. 1B, over the conventional cascade configuration 11, as shown in FIG. 1A. The controller of this invention provides performance and stability for a relatively lower cost and with much less variation. In addition, the gating signals of this invention are generated by the digital controller, which utilizes either a universal control method or a specific control method including conventional PI-control (proportional integral), fuzzy logic control and/or any other suitable control scheme.

Figure 3:
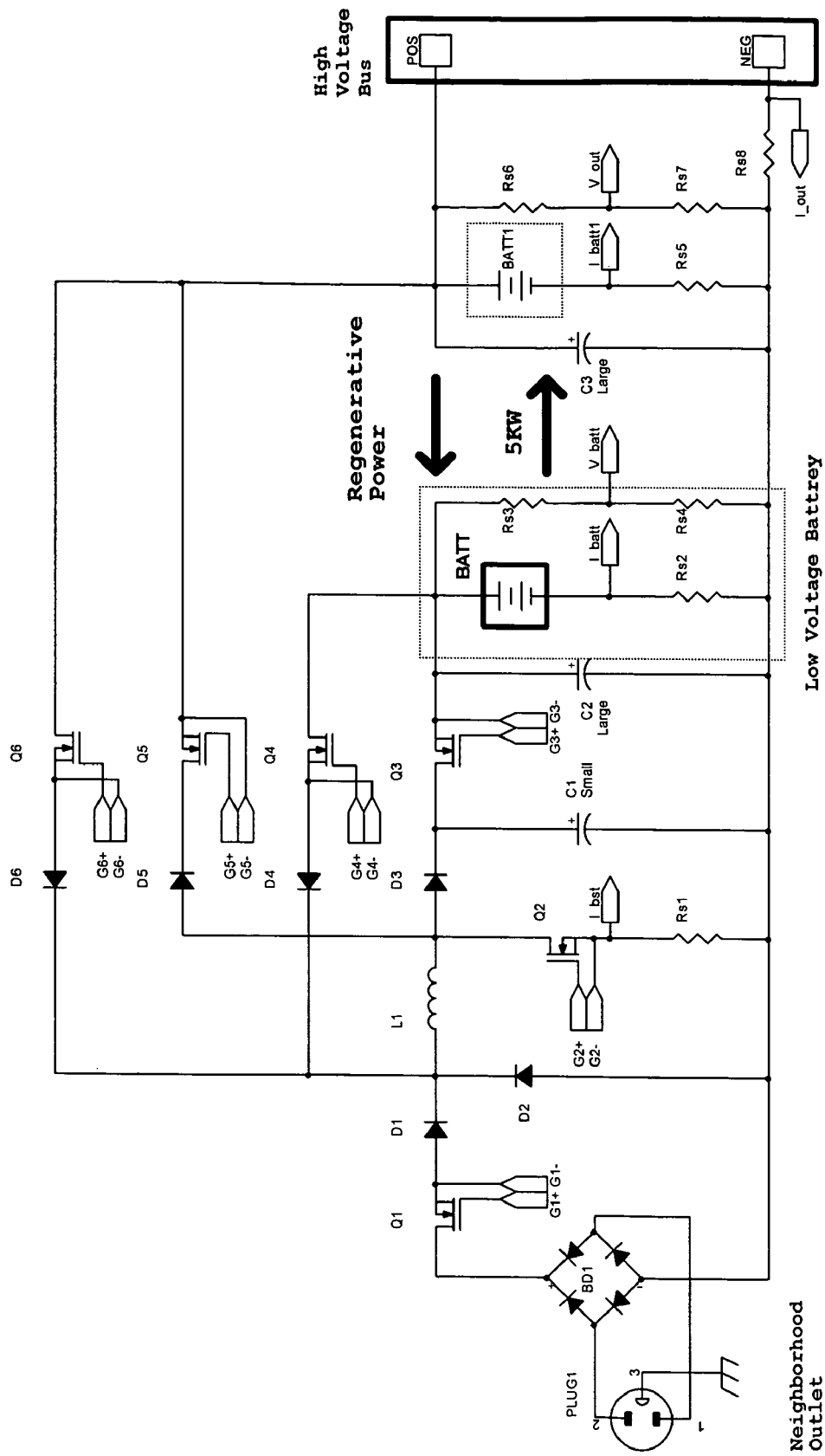
FIG. 3 shows an overall hardware configuration, according to an embodiment of this invention.

According an embodiment of this invention and as shown in FIG. 3, the overall hardware configuration includes one inductor, six switches and six diodes. Three of the switches Q1, Q2 and Q6 work in switching mode for buck, boost/buck and boost operation. The other three switches Q3, Q4 and Q5 function in simple on/off mode to connect or disconnect the corresponding lines.

The positive buck/boost operation achieves PFC, constant voltage and constant current charging of the low voltage battery pack during plug-in charging. If the minimum battery voltage is chosen higher than the peak value of the input AC voltage, then only boost operation of the converter will be needed, simplifying the control strategy. During plug-in charging the controller considers the best charging-profile of the selected battery, such as pre-programmed by the manufacturer.

The boost operation or step-up function includes directing power from the low battery voltage to the high bus voltage. The power transferred by the converter includes any suitable level, such as, for example, at least 2.5 kW, at least 5 kW and/or at least 7 kW. According to an embodiment of this invention, increased power transfer utilizes a parallel alternative switching strategy, as discussed below.

The buck operation or step-down function includes directing power while regenerative charging of the low voltage battery, such as, during braking. The regenerative power comes from the high bus voltage and charges the low voltage battery through the buck operation based on the voltage/current profile for the low voltage battery pack, for example.

The AC power supply may include any suitable voltage, frequency and/or number of phases, such as, for example, those commonly available in residential and/or industrial settings. Typical ranges include, for example, from about 100 volts to about 500 volts, and more particularly about 110 volts, about 220 volts and/or about 440 volts. Applicable AC outlet voltage includes all voltage levels in single phase, three phase and multi-phase AC outlet supply by properly designing BD1 in FIG. 2B. Suitable designs for BD1 may include a single phase full bridge rectifier, a three phase full bridge rectifier, a multi-phase full bridge rectifier and/or any other suitable combination of power electronic devices, for example. Applicable AC outlet frequency includes all suitable frequencies by choosing a proper design of C1 in FIG. 2B.

The battery includes any suitable voltage level, such as ideally from zero to infinity. Insulation, isolation distances and other constraints are considered in battery selection and/or design. The applicable battery voltage ranges and the kinds of batteries include wide ranges depending on the basis of the integrated converter's inherent structure of non-inverted buck-boost operating modes, for example. Any suitable combination of series and parallel arrangements of battery cells including wet cells and/or dry cells comprise the battery.

The available power rate from the converter includes three parts, which comprise Pchrg (power for plug-in charging) from the AC outlet to the high power battery, Pboost (power for boost function) from the high power battery to the high voltage bus of the electric traction system and Pregen (power for regenerative charging) from the high voltage bus of the electric traction system to the high power battery. Any suitable power level may be selected depending upon the application, such as a passenger vehicle uses a first power level while an industrial truck uses a second greater power level, for example.

A properly designed system includes suitable power electronic devices. A parallel alternative switching strategy increases the power transferred between the high voltage bus of electric traction system and high power battery.

A primary application of the integrated bidirectional converter, also referred to as an "IBC", is to charge and to discharge a high power battery for any kind of plug-in hybrid electric vehicle and/or as a part of a plug-in hybrid electric conversion kit.

There is no limitation to the type, make and/or manner of transportation device that may include the integrated converter of this invention, such as, for example, powered indoor vehicles, powered bicycles, powered tricycles, scooters, motorcycles, all terrain vehicles, passenger cars, buses, trucks, sport utility vehicles, locomotives, military vehicles, personal water craft, boats, submarines, helicopters, airplanes, spacecraft and/or any other suitable manned or unmanned vehicles with an electric motor.

Furthermore and according to an embodiment of this invention, the integrated converter provides stable power support for all sorts of mobile devices and vehicles using battery back-up systems.

Often night-time electricity rates are less costly than peak day-time rates for neighborhood and/or industrial electric customers. According to an embodiment of this invention, the vehicle owner charges the PHEV during the evening to reduce charging costs and also load balance the electrical generating system.

According to another embodiment of this invention, the converter also includes vehicle-to-grid (V2G) capabilities where the vehicle generates electricity and supplies the electricity to the electrical grid, for the purposes of distributed power generation.

Operating Mode 1: Plug-In Charging

For operating mode 1, according to an embodiment of this invention, the current flow path includes one inductor, three switches and three diodes. Where the minimum value of the low voltage battery is higher than the peak value of the input AC voltage, the PFC between the input voltage, the current and the best charging profile for the selected battery includes constant voltage, constant current and tail off control in order to maximize the life cycle of the battery.

Figure 4A:
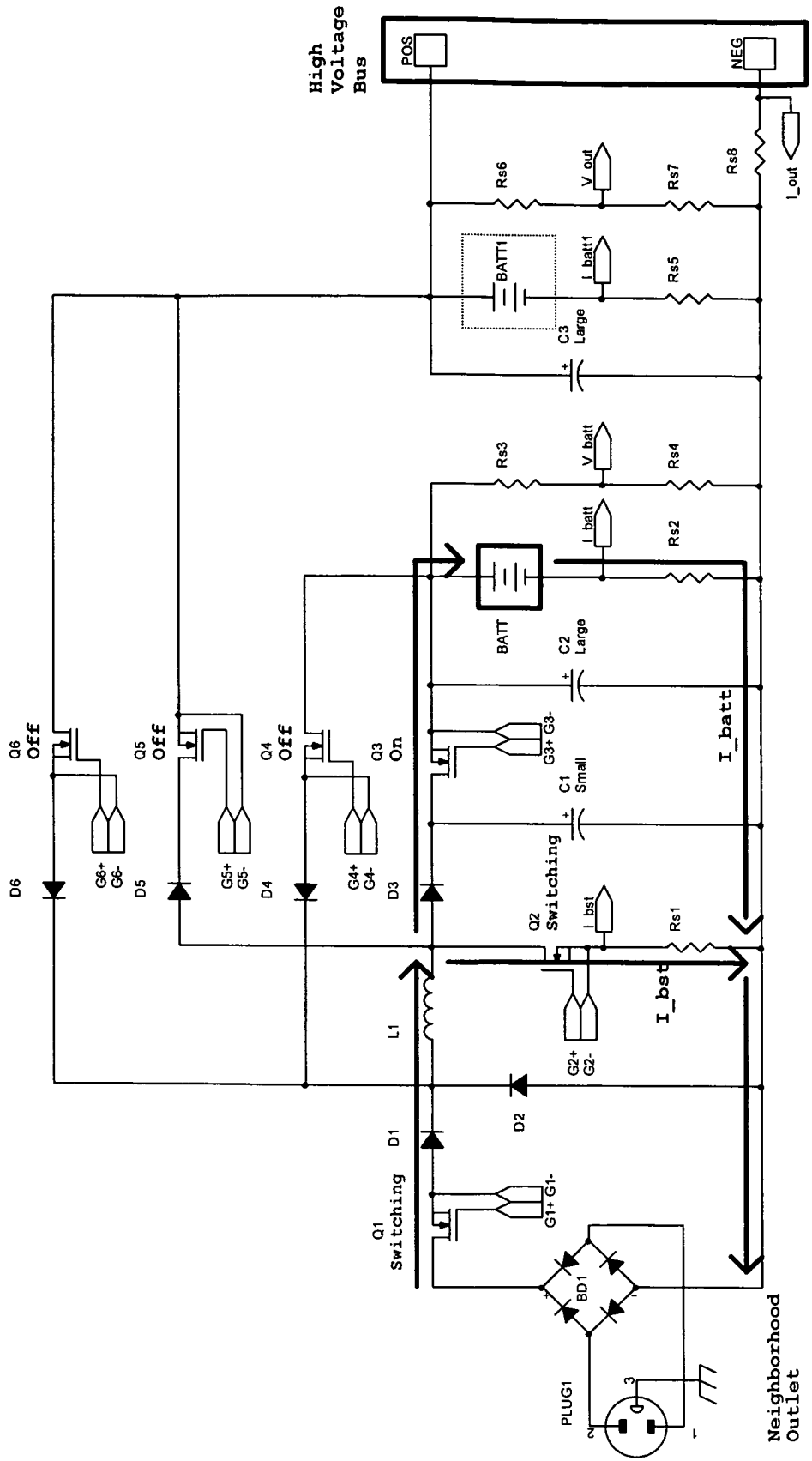
FIG. 4A shows Plug-In Charging, according to an embodiment of this invention.

As shown in FIG. 4A, L1, Q1, Q2, Q3, D1, D2 and D3 comprise the positive buck/boost converter. Q1 and Q2 utilize switching operation and Q3 utilizes an on-state during this mode. D1 avoids reverse current in Q1 during the other operating modes. The combination of the buck and boost modes based upon the charging profile of the battery achieve the desired output voltage and current of this mode. Output voltage and current are sensed by resistors Rs1, Rs2, Rs3 and Rs4, for example. Specifically, Rs1 and Rs2 detect the AC input, the charging current and contribute to PFC.

According to an embodiment of this invention, during plug-in charging, the other switches and diodes Q4, Q5, Q5, D4, D5 and D6 are in an off-state. While charging the low voltage battery, the high voltage bus disconnects from the AC input and the low voltage battery at Q5, and Q6, respectively.

Figure 4B:
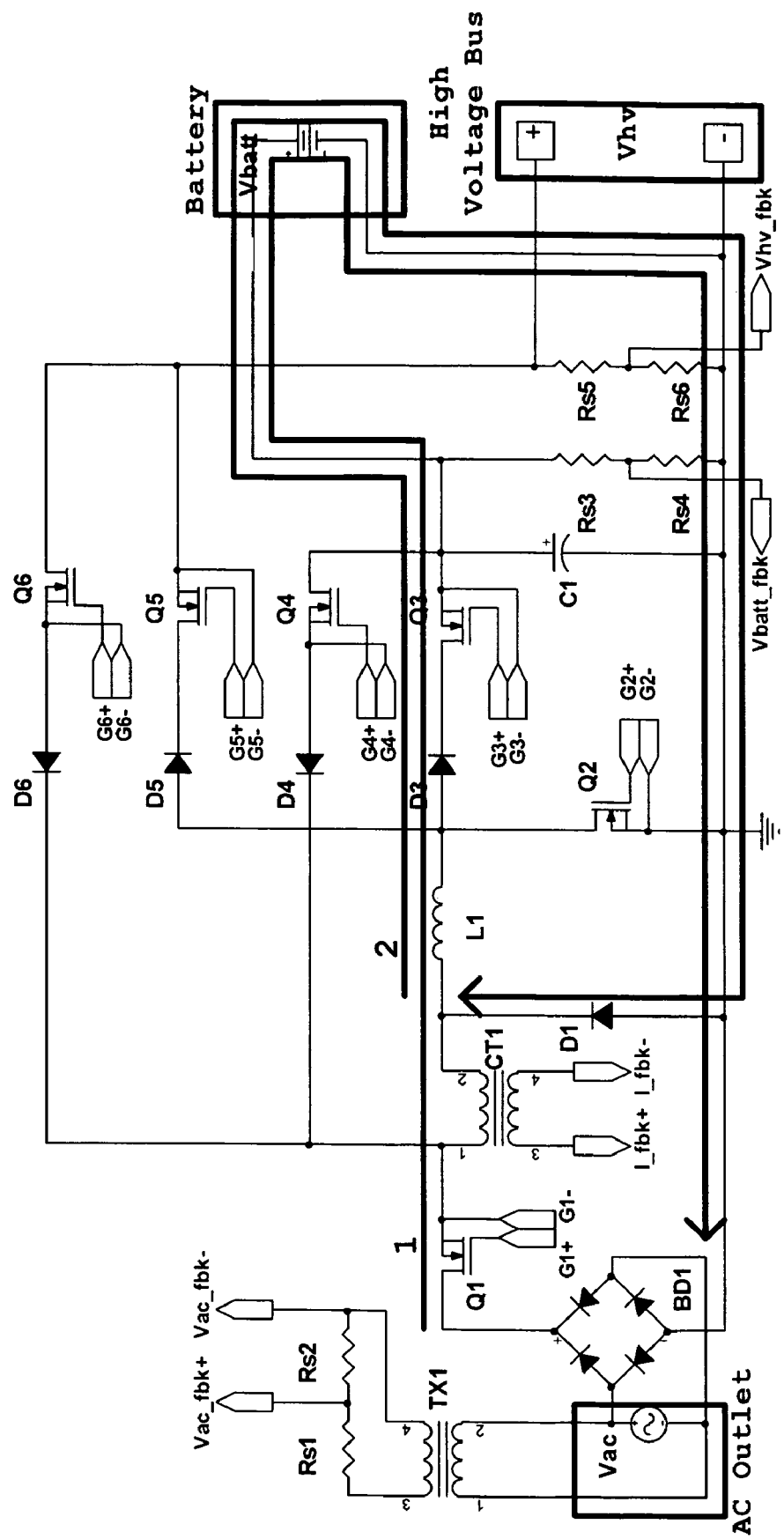
FIG. 4B shows Plug-in Charging of the add-on battery, buck operation, according to an embodiment of this invention.
Figure 4C:
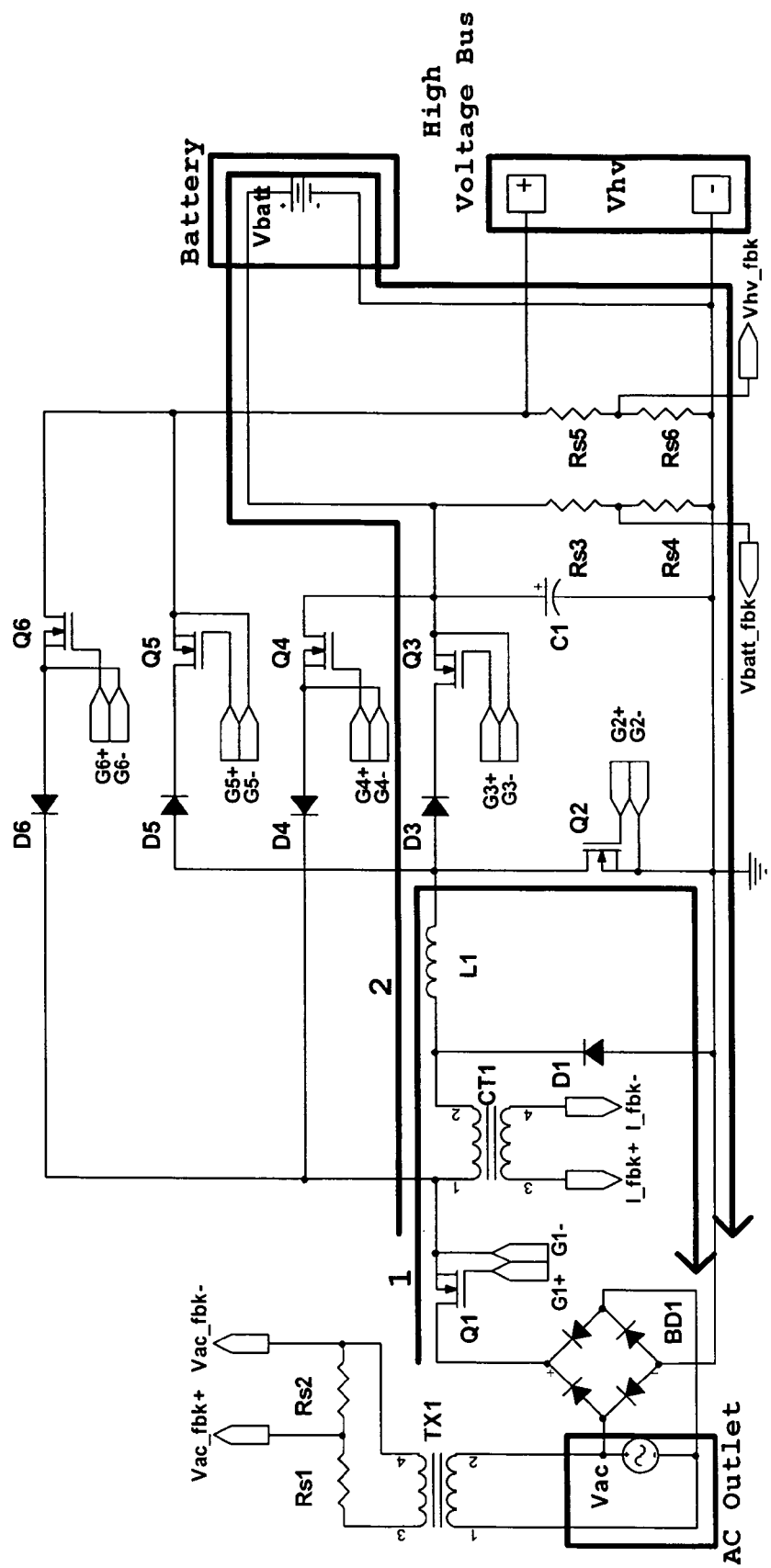
FIG. 4C shows Plug-in charging of the add-on battery, boost operation, according to an embodiment of this invention.

According to another embodiment of the plug-in charging mode of this invention and as shown in FIGS. 4B and 4C, Q1, Q2, Q3, D1, D3, and L1 comprise the non-inverted buck/boost converter which provides charge function and PFC without regard to whether or not the battery voltage ($V_{batt}$) is higher than the peak value of the AC outlet ($V_{ac\_k}$). Desirably, Q1 and Q2 are in PWM switching mode and Q3 is in a simple on-state during operation. Output voltage and current are regulated by a combination of buck and boost mode based on the voltage and the current profile for the battery. Rs1, Rs2, Rs3, Rs4 and CT1 measure the input/output voltage and the input current. The other switches and diodes, Q4, Q5, Q6, D4, D5 and D6 are in an off-state in order to disconnect the high voltage bus of the HEV from both the AC input and the add-on battery.

Operating Mode 2: Boost Function

Figure 5A:
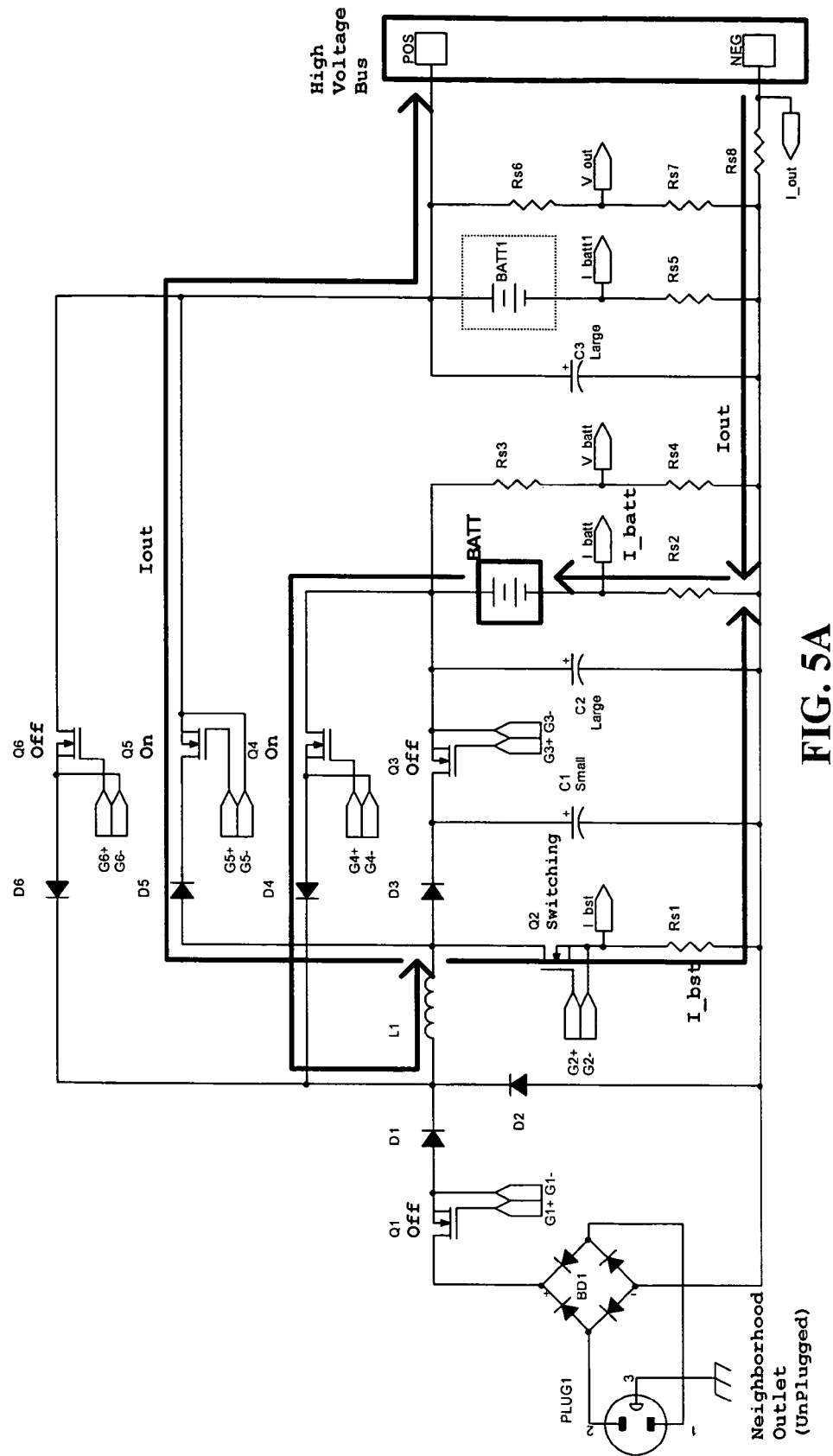
FIG. 5A shows the Boost function, according to an embodiment of this invention.

For operating mode 2, according to an embodiment of this invention, as seen in FIG. 5A, the current path includes one inductor, three switches and two diodes. In this mode, BATT1 becomes the power source while L1, Q2, Q4, Q5, D4 and D5 form the simple boost converter from the low voltage battery BATT1 to the high voltage bus.

The actual boost function occurs by L1, Q2 and D5 while Q4, Q5, D4 and D5 are in an on-state in order to make the current path from the battery to the high voltage bus. The other switches and diodes Q1, Q3, Q6, D1, D3 and Q6 remain at an off-state. A simple boost converter configuration with one inductor L1 which is shared with other operating modes provides power to the high bus voltage. The power transferred from the battery to the high voltage bus is regulated by sensing the battery current and the high voltage bus, for example.

The invention also includes detecting the current and the voltage according to the strategy presented in operating mode 1 using resistors. Rs2 for sensing the battery output current, Rs3 and Rs4 for sensing the battery voltage and Rs6, Rs7 and Rs8 for measuring the voltage and the current of the high voltage bus. The power from the battery to the high voltage bus is measured by calculating the battery output current Ibatt multiplied by the battery voltage Vbatt to measure and regulate the power transferred, for example. The measured power value reflects the power limit between the battery and the high voltage bus.

Figure 5B:
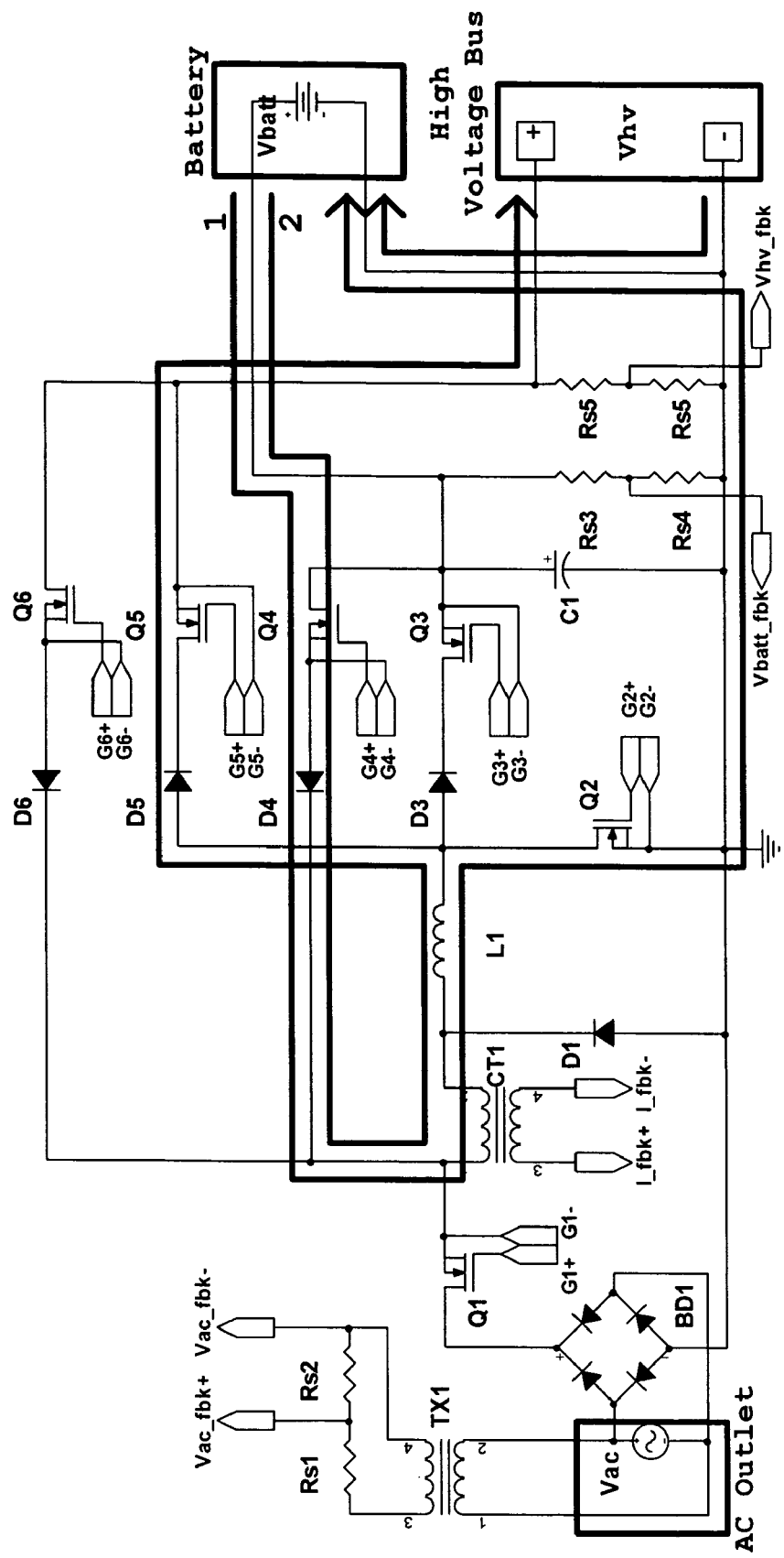
FIG. 5B shows Boost from the add-on battery to the high voltage bus, according to an embodiment of this invention.

According to another embodiment of this invention, the boost function from the add-on battery to the high voltage bus of the HEV is shown in FIG. 5B. In this mode, $V_{batt}$ becomes a power source and L1, Q2, Q4, Q5, D4 and D5 form a simple boost converter from the battery to high voltage bus when $V_{hv\_bus}$ is higher than $V_{bat}$. Q2 operates in PWM switching mode and Q4 and Q5 operate in simple on-state to form the current path between the battery and high voltage bus. The other switches and diodes Q1, Q3, Q6, D1, D3 and D6 maintain an off-state to separate the AC outlet. Input/output voltage and input current are measured through Rs3, Rs4, Rs5, Rs6 and CT1, for example. Power from the battery to the high voltage bus is estimated using measured battery voltage and current, such as, to allow regulation of transferred power, for example.

Operating Mode 3: Buck (Regenerative Charging)

Figure 6A:
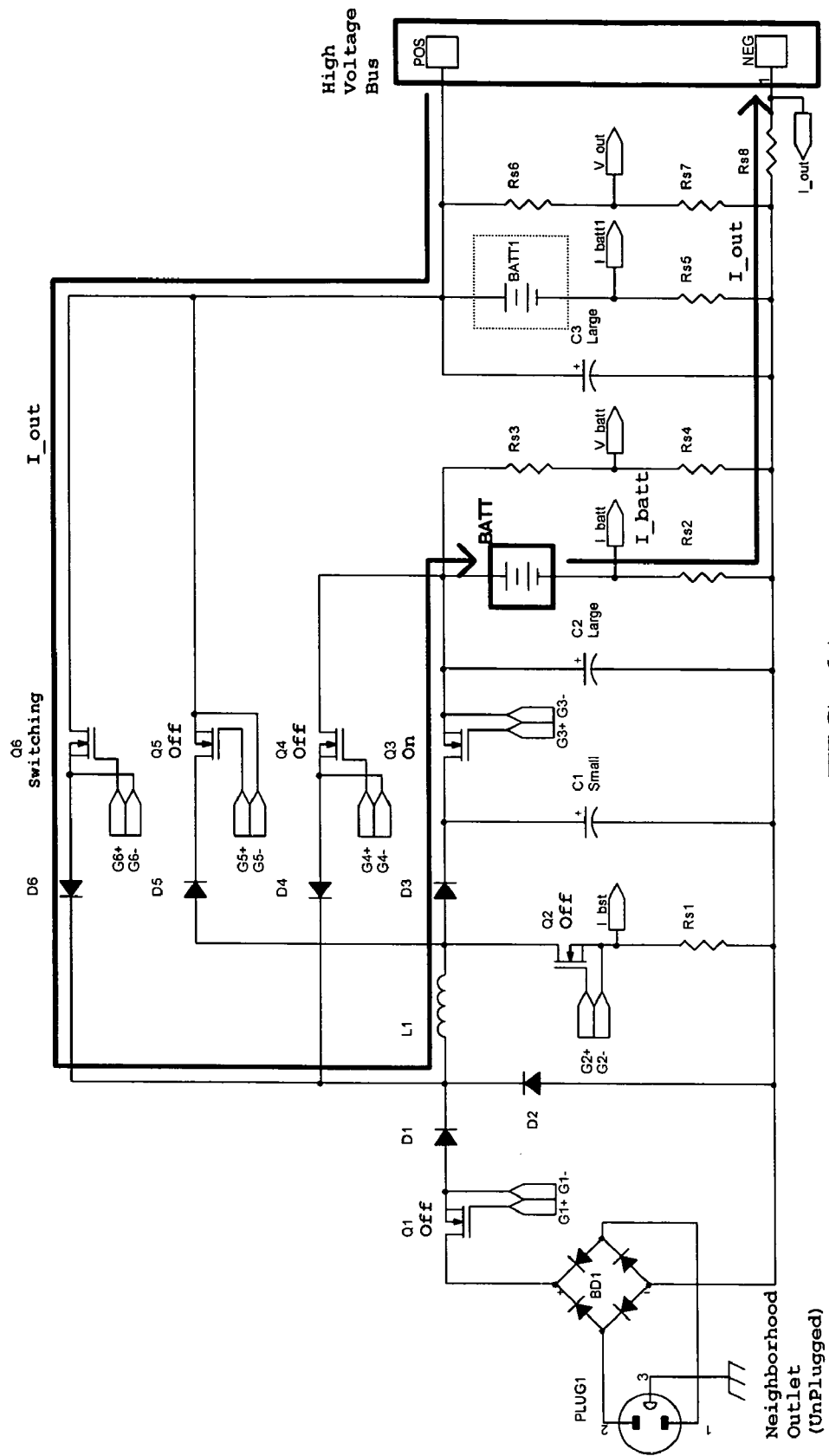
FIG. 6A shows Regenerative Charging, according to an embodiment of this invention.

For operation mode 3, according to an embodiment of this invention, the current path includes one inductor, two switches and three diodes. In this mode, as shown in FIG. 6A, for example, the voltage of the high voltage bus is higher than the level which is set by the control strategy. In order to draw proper regenerative power from the high voltage bus to BATT1, buck (step-down) operation utilizes this circuit. The buck converter is comprised of L1, Q3, Q6, D2, D3 and D6, for example. Desirably, Q3 maintains a simple on-state and Q6 functions as a switch for buck operation while D2 provides the free-wheeling path. Other switches and diodes Q1, Q2, Q4, Q5, D1, D4 and D5 stay at a simple off-state. Sensing resistors, Rs2, Rs3, Rs4, Rs6, Rs7 and Rs8 serve as current and voltage sensors to regulate regenerative power within the desired range. The control strategy for this mode includes the buck converter.

Figure 6B:
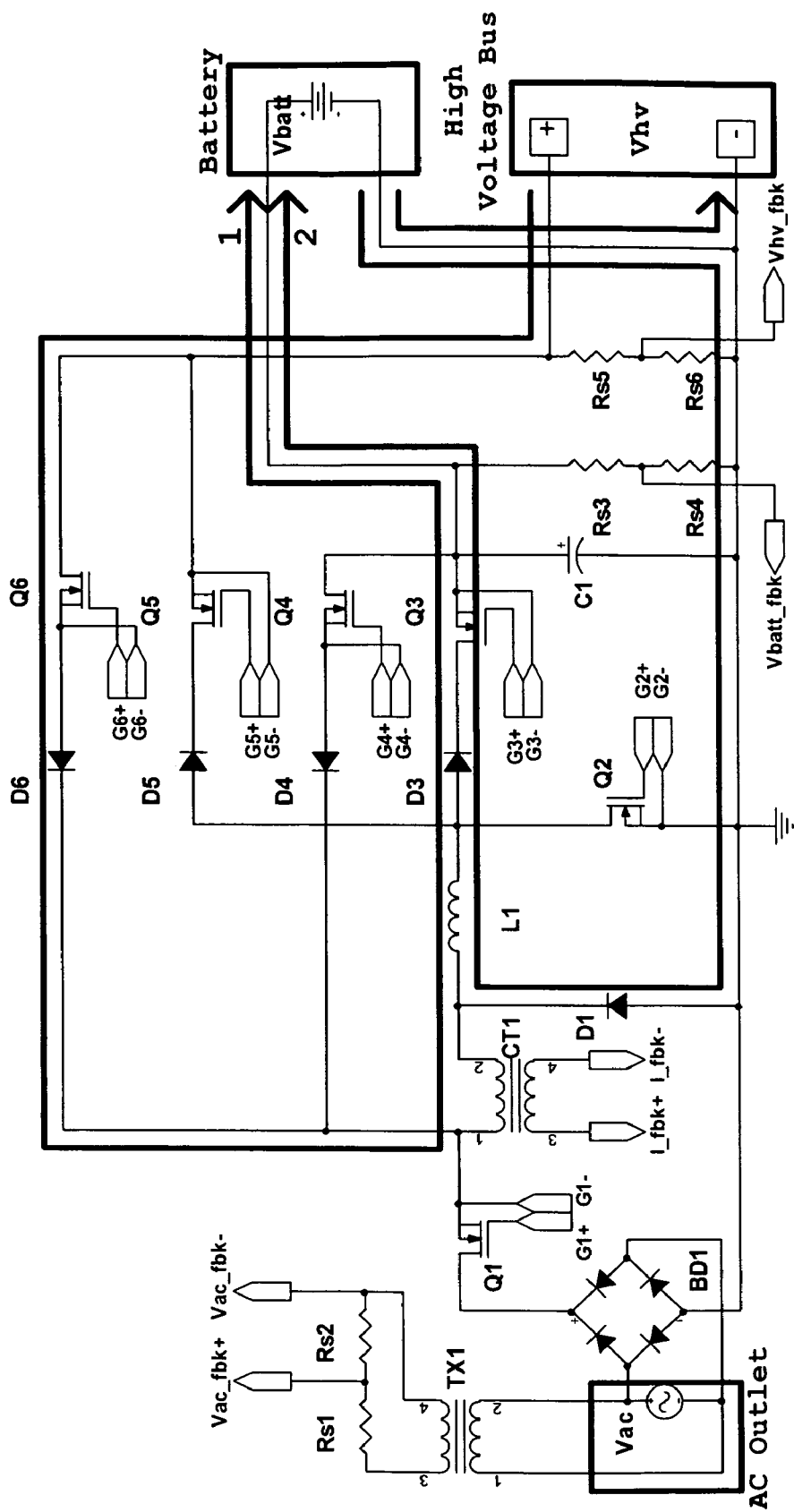
FIG. 6B shows Regenerative Charging of the add-on battery, according to an embodiment of this invention.
Figure 7:
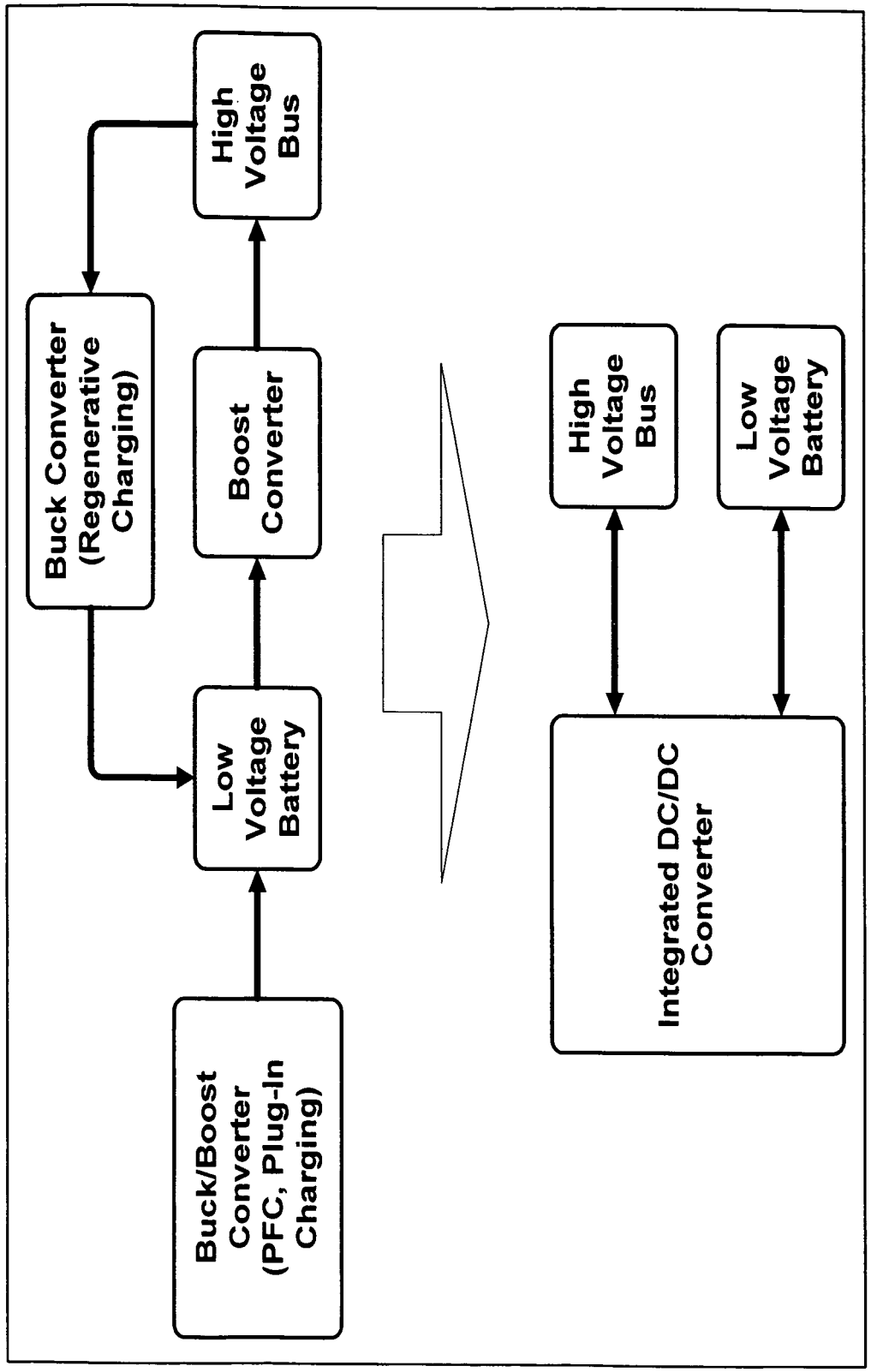
FIG. 7 shows the integrated structure, according to an embodiment of this invention.

According to another embodiment of this invention, as shown in FIG. 6B, regenerative charging of the add-on battery utilizes buck operation from the high voltage bus to the battery. In this mode, L1, Q3, Q6, D1, D3 and D6 form the buck converter when $V_{hv}$ is higher than $V_{batt}$. Desirably, Q6 works for PWM switching, Q3 stays in a simple on-state and D1 provides a free-wheeling path. Other switches and diodes Q1, Q2, Q4, Q5, D4 and D5 are in a simple off-state, for example. Desirably, sensing input/output voltage and current utilizes Rs3, Rs4, Rs5, Rs6 and CT1.

An important advantage of the integrated converter of this invention is the highly integrated structure composed of three stable and exclusive independent operating modes: buck; positive buck/boost; and boost operation. The configuration utilizes the same single power inductor for each of the three operating modes.

The integrated converter utilizes a control strategy adopted for its particular configuration. According to an embodiment of this invention, the integrated controller utilizes digital control. Table 1A shows a switching truth table based on operating mode.

TABLE 1A

| Switch Mode | Q1 | Q2 | Q3 | Q4 | Q5 | Q6 | Comments |
|---|---|---|---|---|---|---|---|
| Mode 1 | Switching | Switching | On | Off | Off | Off | Plug-In Charging |
| Mode 2 | Off | Switching | Off | On | On | Off | Boost Discharging |
| Mode 3 | Off | Off | On | Off | Off | Switching | Regenerative Charging |

Implementation of a truth table may be accomplished through analog and/or digital circuitries. According to an embodiment of this invention, digital controls use a DSP (Digital Signal Processor) or other programmable devices for a cost effective design. Desirably, digital control provides the system with additional flexibility in charging strategy, in monitoring the system, in communicating with an external system, in ease of manufacture and in user friendly functions. Control algorithms and/or software logic for three control modes are given as the following equations.

$\text{Vout\_cmd}(t) := D(t) \times Vin(t)$  In buck operation $\text{Vout\_cmd}(t) := \dfrac{1}{1 - D(t)} \times Vin(t)$  In boost operation $Verr(t) := Vref(t) - Vout(t)$  Error in analog control $\text{Vout\_cmd}(t) := Kp \times Verr(t) + \displaystyle\int_0^t Verr(m)\,dm$  PI-control in analog control $Verr(kT) := Vref(kT) - Vout(k \cdot T)$  Error in digital control $\text{Vout\_cmd}[(k+1) \cdot T] :=$
$\quad Kp \times Verr(k \cdot T) + Ki \times \displaystyle\sum_{n=1}^{k} Verr(n \cdot T)$  PI-control in digital control $D(t) := \dfrac{\text{Vout\_cmd}(t)}{Vin(t)}$ $D[(k+1) \cdot T] := \dfrac{\text{Vout\_cmd}[(k+1) \cdot T]}{Vin(k \cdot T)}$  In buck operation $D(t) := 1 - \dfrac{Vin(t)}{\text{Vout\_cmd}(t)}$ $D[(k+1) \cdot T] := 1 - \dfrac{Vin(k \cdot T)}{\text{Vout\_cmd}[(k+1) \cdot T]}$  In boost operation The appropriate operating mode includes following the control flow for the duty cycle calculation. System response improves by changing Vout_cmd control equation with maintaining other conditions intact, for example. This simple strategy provides good stability with proper gain tuning, such as, in conventional PI-control gains. Proper selection of the buck and boost modes includes checking the over-modulation of the duty ratio from the buck mode to the boost mode. This consideration renders a unified and a simplified control strategy regarding the overall input output conditions. Overall input output conditions may vary due to the load current and to the change of voltage drop from input to output, for example. Desirably, the control flow is applied to all three operating modes in common with solidity.

Figure 9A:
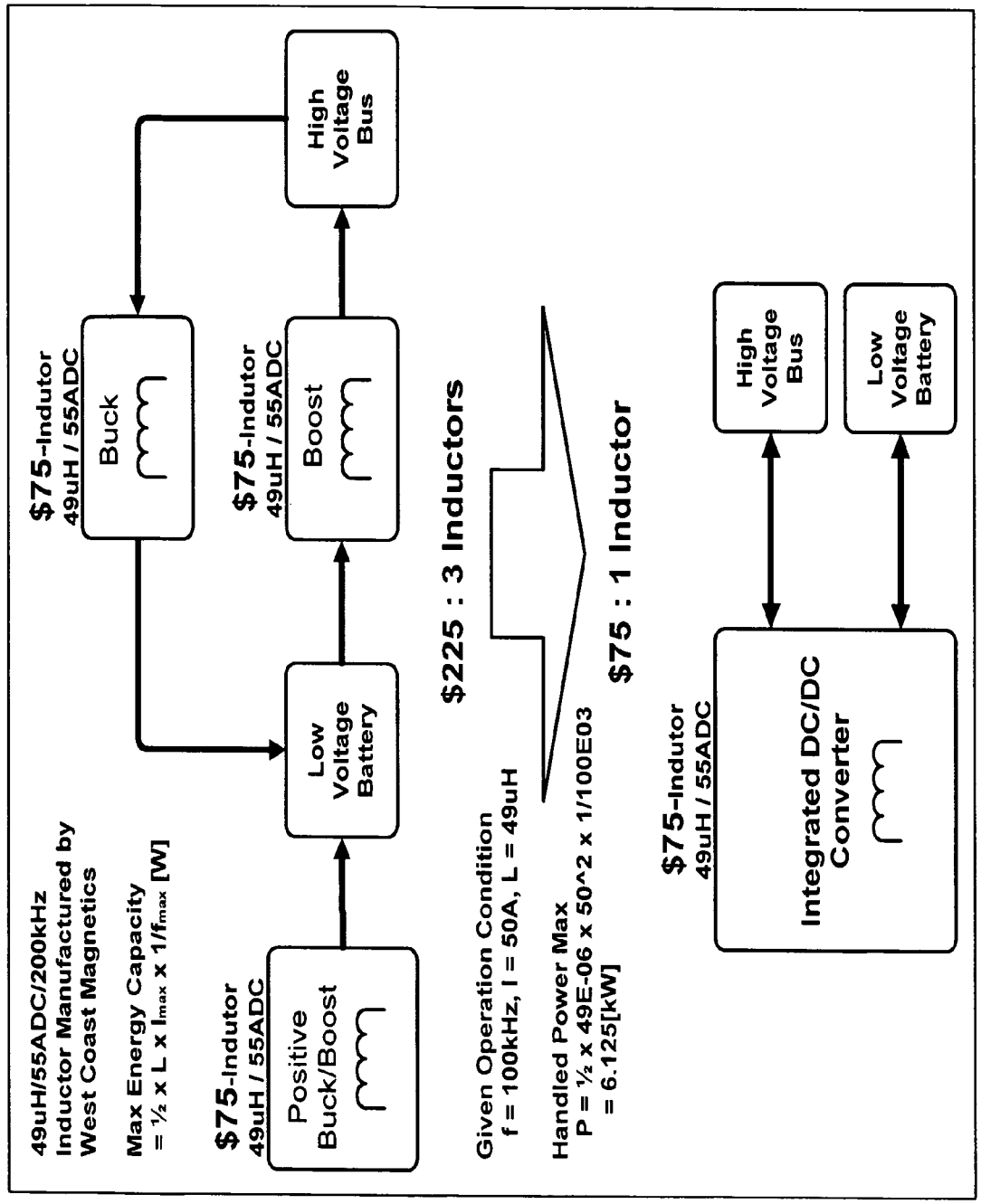
FIG. 9A shows cost-effectiveness, according to an embodiment of this invention.

An additional advantage of this invention includes reduced cost. This integrated structure is cost-effective to both manufacturers and consumers. According to an embodiment of this invention, the cost of the magnetic components is greatly reduced versus the non-integrated cascade structure. The conventional cascaded converter topology includes at least three high current, high frequency inductors for positive buck/boost, boost, and buck operation. Typically the high current, high frequency inductor comprises the most expensive component of the converter. As shown in FIG. 9A, the cost savings from three high current inductors is significant.

Figure 10:
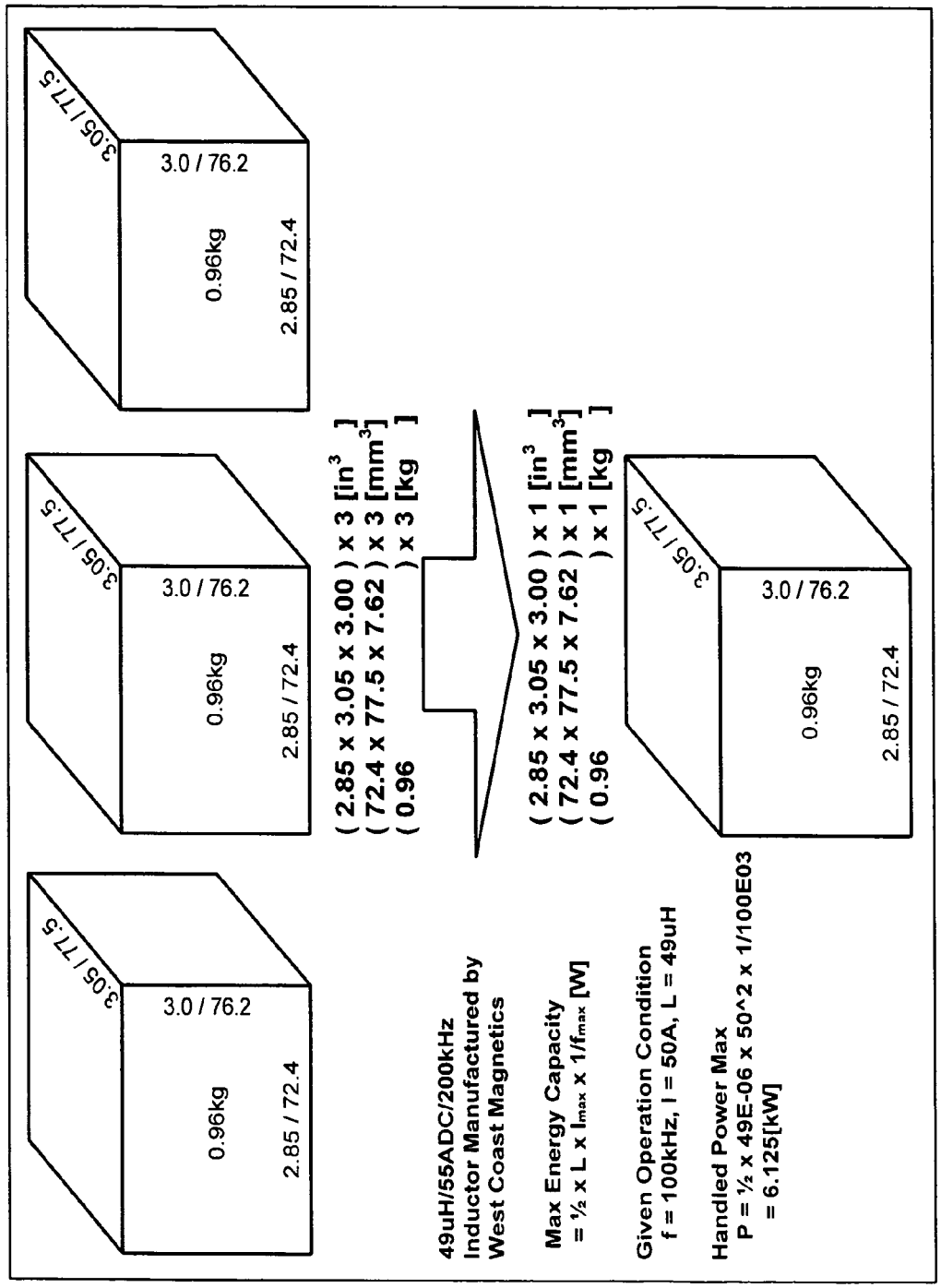
FIG. 10 shows a comparison of the smaller size and less weight of the integrated converter versus the cascade configuration, according to an embodiment of this invention.

An additional advantage of this invention includes reduced size and weight versus the conventional cascade arrangement. The integrated converter configuration utilizing the one shared inductor for all operating modes advantageously weighs less and takes up less space. The high current inductor is one of the largest and heaviest electric and electronic components in constructing the converter. FIG. 10 illustrates weight savings and reduced volume.

According to an embodiment of this invention and as shown in FIG. 2B, the AC/DC power module 14 for a plug-in hybrid electric vehicle 12 having an electric drive system and an electric power supply includes a plug 18 connectable to an AC power source, a battery 24 to store electricity, a rectifier 20 converting AC to DC, a bi-directional DC to DC converter 22 for changing current from a first voltage to a second voltage, an inductor 50 shared with the rectifier 20 and the bidirectional DC to DC converter 22 to form an integrated converter 16 and a bus 26 connectable to the electric drive system of the HEV 10.

According to an embodiment of this invention, the plug 18 comprises any suitable electrical connection, cable, wire, terminal and any other suitable device, desirably allowing rapid connection and disconnection. The AC power supply includes any suitable source, such as, commonly available by the industrial or residential electric grid or transmission infrastructure. According to an embodiment of this invention, the AC power source has between about 100 volts to about 500 volts and one or more phases.

According to an embodiment of this invention, the rectifier 20 has a rectifier input connected to the plug for receiving an alternating current therethrough. The rectifier 20 has a rectifier circuit for changing alternating current to direct current. The rectifier 20 has a rectifier output for supplying a direct current. The rectifier 20 may be any suitable bridge, pulse width modulation, full wave, half wave and/or other appropriate device for changing at least a portion of AC to DC.

According to an embodiment of this invention, the bidirectional DC to DC converter 22 has a first converter terminal operating at a first voltage and a second converter terminal operating at a second voltage that is different than the first voltage. The bidirectional DC to DC converter 22 has a converter circuit changing direct current to or from the first voltage and the second voltage. Desirably, the first converter terminal connects to the rectifier output. The converter circuit may include any suitable voltage increasing and/or decreasing components.

The inductor 50, according to an embodiment of this invention, includes any suitable sized inductor coil and/or windings to function with each of the rectifier 20 and the bidirectional DC to DC converter 22 when power is utilized therethrough.

The battery 24, according to an embodiment of this invention, includes the battery 24 connected to the first converter terminal and the second converter terminal. The battery 24 may be nickel metal hydride, lead acid, lithium ion and/or any other suitable device directly or indirectly storing electrical potential. The battery 24 includes at least one positive terminal and at least one negative terminal.

The bus 26, according to an embodiment of this invention, includes connection to the first converter terminal and the second converter terminal. Desirably the bus 26 is connectable to the electric drive system, such as by appropriately sized wires or conductors. The bus 26 includes at least one positive terminal and at least one negative terminal.

According to an embodiment of this invention, the integrated converter 16 transfers at least 5 kilowatts of power between the battery 24 and the bus 26. Alternately, parallel alternative switching allows a greater power transfer level without an increase in a switching frequency.

According to an embodiment of this invention, the integrated converter 16 includes a processor 52 or a controller with an algorithm in combination with the converter for controlling at least one of gating switch signals, voltage feedback and current feedback. According to another embodiment of this invention, the converter circuit comprises one current feedback loop and three voltage feedback loops.

According to an embodiment of this invention, the integrated converter 16 operates in a plug-in charging mode to supply power from the plug 18 to the battery 24, in a boost function mode to supply power from the battery 24 to the bus 26 and in a buck function mode to supply power from the bus 26 to the battery 24. The bidirectional DC to DC current converter 22 may include at least four switches 28, 30, 32, 34 and at least four diodes 40, 42, 44, 46 operatively connected with respect to each other to function in a plug-in charging mode, a boost function mode and a buck function mode.

The invention further provides a plug-in hybrid electric vehicle 12 with the power module 14 of this invention. The plug-in hybrid electric vehicle 12 may further include a liquid coolant system 54 for cooling at least a portion of the power module 14, as shown in FIG. 1E, for example.

By way of providing a description of the circuitry, as shown in FIG. 2B, for example, according to an embodiment of this invention, a first end of the inductor coil 50 connects to the rectifier output, the first end of the inductor coil 50 connects to the cathode of a first diode 40 and the cathode of a second diode 42. Further, a second end of the inductor coil 50 connects to an anode of a third diode 44 and an anode of a fourth diode 46. An anode of the first diode 40 connects to a first pole of a first switch 28 and an anode of the second diode 42 connects to a first pole of a second switch 30. The invention includes a cathode of the third diode 44 connected to a first pole of a third switch 32 and a cathode of the fourth diode 46 connected to a first pole of a fourth switch 34. A second pole of the first switch 28 connects to a positive bus terminal of the bus 26 and a second pole of the third switch 32 connects to the positive bus terminal of the bus 26. The invention also includes a second pole of the second switch 30 connected to a positive battery terminal of the battery 24 and a second pole of the fourth switch 34 connected to the positive battery terminal of the battery 24. Desirably, a negative battery terminal of the battery 24 and a negative bus terminal of the bus 26 connect to a ground.

According to an embodiment of this invention, the circuits further include a first pole of a fifth switch 36 connected to the second end of the inductor coil 50 and a second pole of the fifth switch 36 connected to the ground. An anode of a fifth diode 48 connects to the ground and a cathode of the fifth diode 48 connects to the first end of the inductor coil 50. The invention further includes a first pole of a sixth switch 38 connected to the rectifier output and a second pole of the sixth switch 38 connected to the first end of the inductor coil. Desirably, the rectifier circuit connects to the ground.

Electromagnetic interference filters 56, also referred to as "EMI" filters, as shown in FIGS. 1E and 1F, for example, may be included and/or connected to at least one of the plug 18, the battery 24 and the bus 26. Electromagnetic interference filters 56 may include inductors but one skilled in the art and guided by the teachings herein readily appreciate that electromagnetic interference filters 56 do have an inductor sized as the power inductor of the invention. Rather, such filter inductors provide functionality without passing the entire current of the transferred or converted power. Electromagnetic interference filters 56 may be used in any suitable location in a circuit to improve a signal and/or reduce noise, for example.

According to an embodiment of this invention, the invention also includes a method of controlling power for a plug-in hybrid electric vehicle 12 having an electric drive system. The method includes charging a battery 24 with an AC power supply by rectifying power from alternating current to direct current and converting in a bidirectional DC to DC converter 22 the power from a supply voltage to a battery voltage for storage in the battery 24. The method also includes boosting power supplied to the hybrid electric vehicle 10 when needed by the electric drive system by converting power stored in the battery 24 from the battery voltage to a bus voltage for use by a bus 26 connectable to the electric drive system. The method also includes bucking power supplied by the hybrid electric vehicle 10 when available by converting power from the bus voltage to the battery voltage for storage in the battery 24. Desirably, a single inductor coil 50 functions during each of charging, boosting and bucking.

According to an embodiment of this invention, charging of the battery is less than about 8 hours and more desirably less than about 4 hours.

EXAMPLE

The comparison of the integrated converter, according an embodiment of this invention, and the conventional cascade configuration is presented and summarized below. The comparison includes battery voltage range, fault current tolerance, voltage polarity and the number components, such as, switches (Q), diodes (D), current transducers (CT) and high current inductors (L). The comparison is also shown in FIGS. 9B-9G and Table 1B, for example.

One difference between the integrated converted and the conventional configuration is an integrated structure. The integrated structure reduces the number of high current inductors and current transducers. Additional switches and diodes provide the selective current paths among voltage sources, $V_{ac}$, $V_{batt}$, and $V_{hv}$. In general, the high current inductor is a larger size and heavier than other power electronic components such as MOSFETs, IGBTs, transistors, diodes and the like.

Figure 9B:
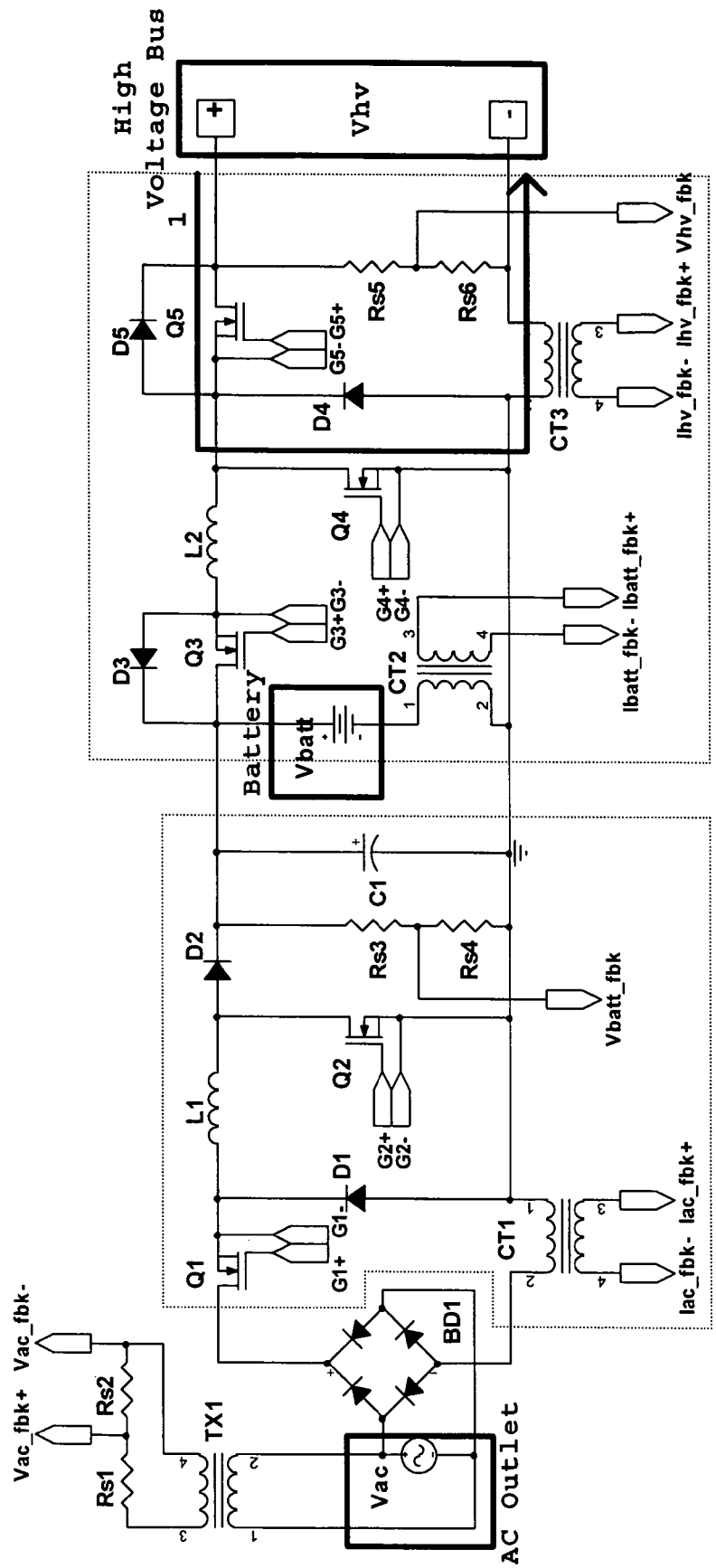
FIG. 9B shows a full bridge rectifier and two non-inverted buck/boost converters.
Figure 9C:
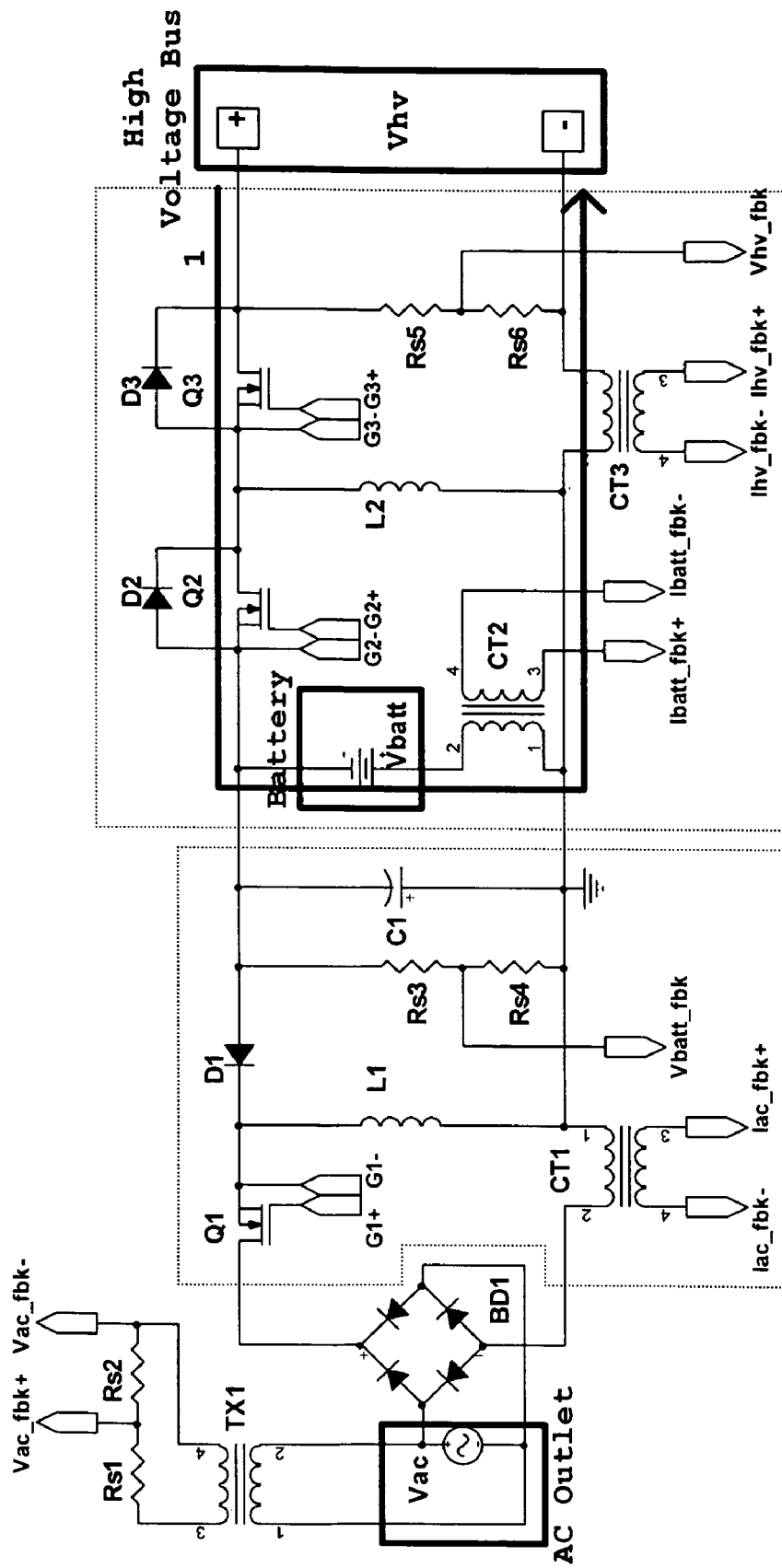
FIG. 9C shows a full bridge rectifier and two buck/boost converters.
Figure 9D:
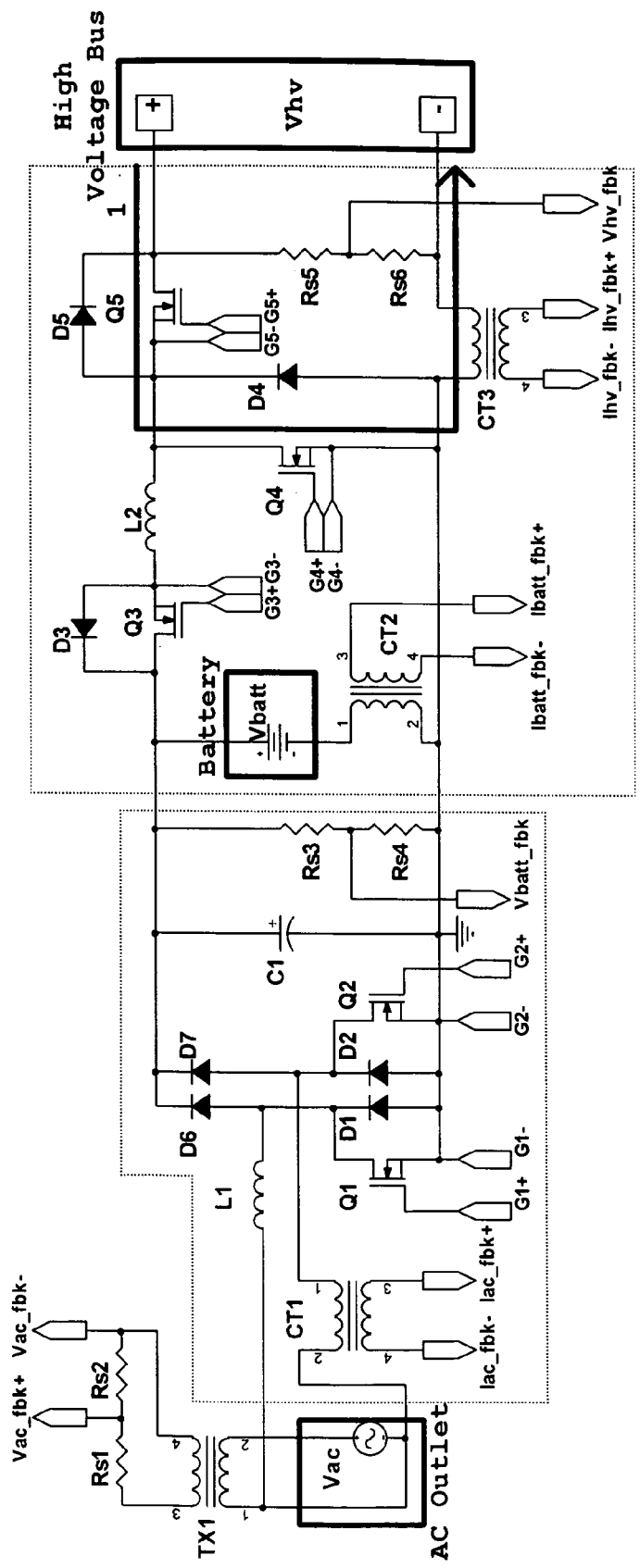
FIG. 9D shows a PWM rectifier and a non-inverted buck/boost converter.
Figure 9E:
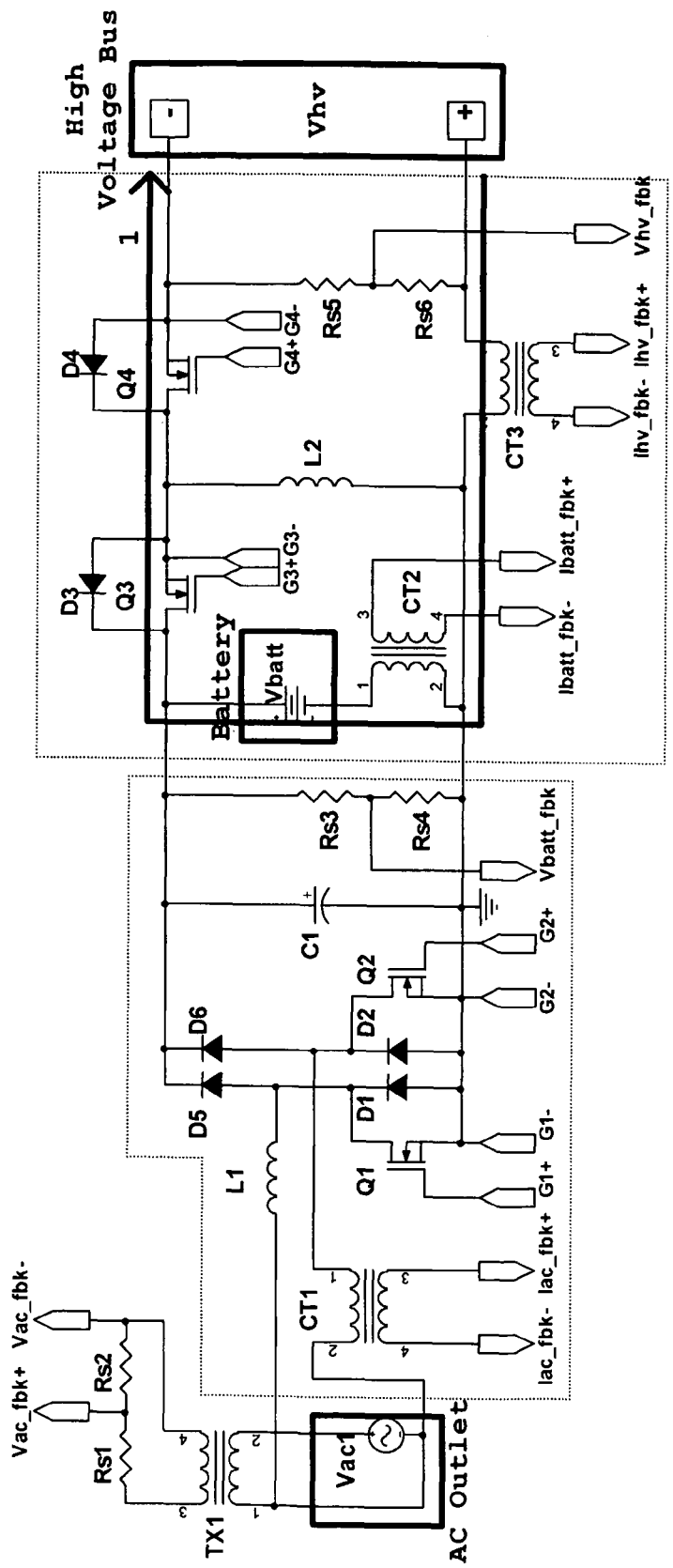
FIG. 9E shows a PWM rectifier and a buck/boost converter.
Figure 9F:
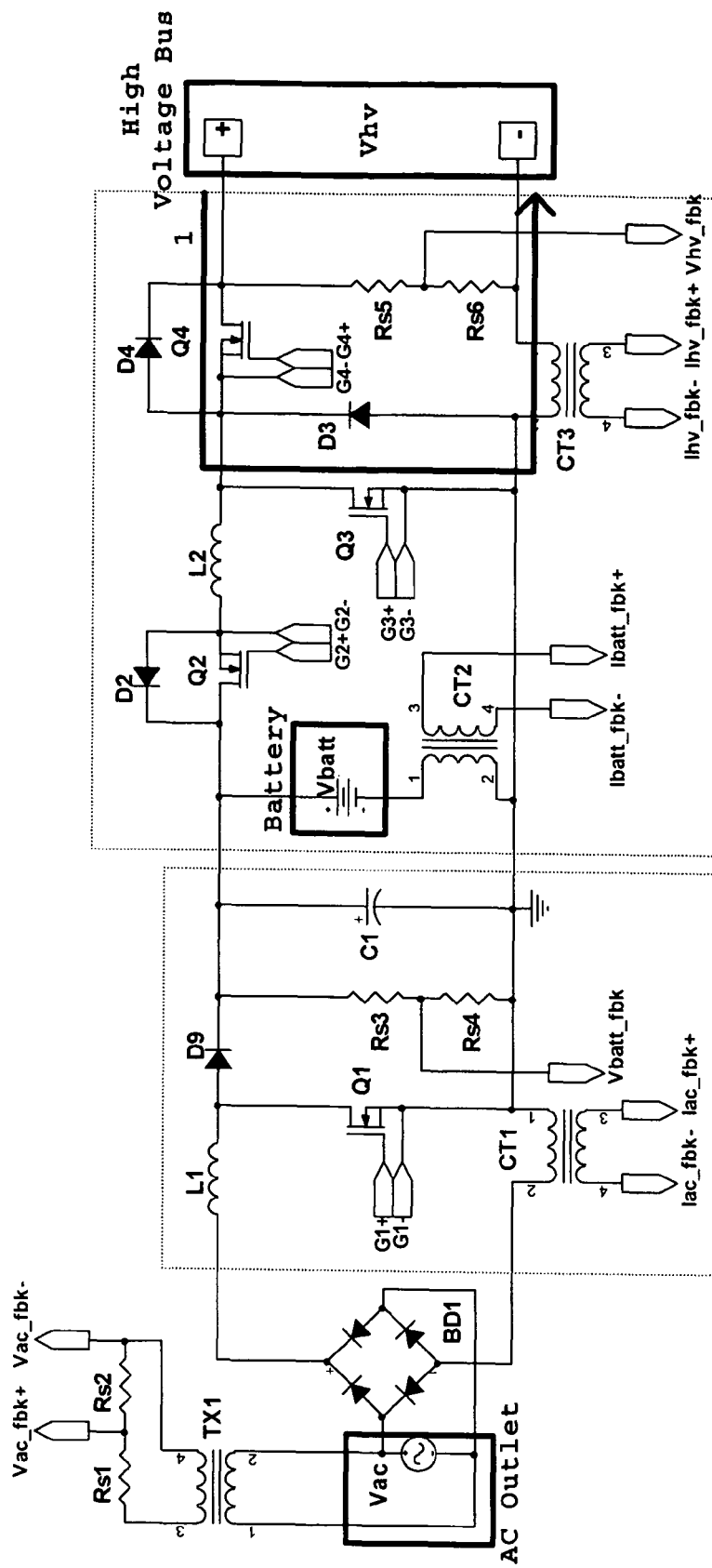
FIG. 9F shows a full bridge rectifier, boost and non-inverted buck/boost converters.
Figure 9G:
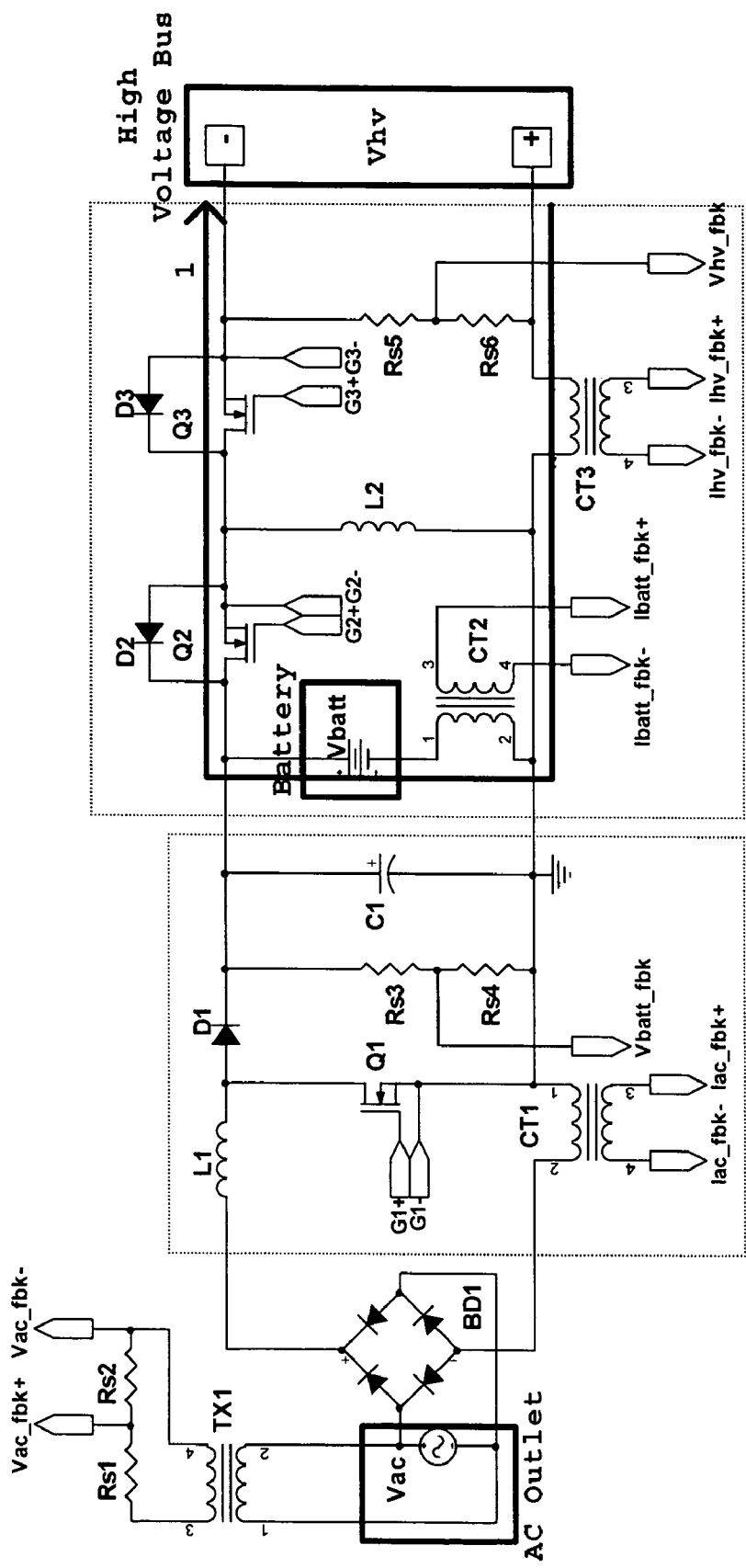
FIG. 9G shows a full bridge rectifier, boost and buck/boost converters.

The number of switches and diodes for the bi-directional buck-boost converter, as shown in FIG. 9C, initially appears favorable. But, the buck-boost converter has an inverted output voltage making it difficult to share a common ground and the system has a higher intrinsic current noise due to the absence of major inductance between the supply through switch-diode and the output, leading to higher spike currents when the switch is turned on. Also, in order to transfer the same amount of energy, a higher peak input current is required than buck or boost converters. Inverted output voltage and intrinsic higher current noise are considered for high power applications. The integrated converter design does not have an inverted output voltage and has an inductance for the supply through switch-diode and the output.

Regarding fault current tolerance and as shown in FIGS. 4B, 4C, 5B and 6B, the current paths including switch passes comprise the inductor to help reduce sharp fault currents. But, in FIGS. 9B-9Q the probable fault current path is path '1' in case of using either a non-inverted bi-directional buck/boost or an inverted bi-directional buck/boost between the add-on battery and the high voltage bus.

Regarding the available battery voltage range, the integrated converter provides a wide range of voltages as a charger as well as bi-directional converter owing to the non-inverted bi-directional buck-boost topology which has the same steady state output transfer function as that of a conventional buck and boost converter.

Regarding the change in average conduction loss, according to an embodiment of this invention, the integrated converter includes relatively more conduction loss during plug-in charging of the add-on battery and during the bi-directional DC/DC conversion between the add-on battery and the high voltage bus. The extra conduction loss arises from additional switches and diodes to comprise the integrated structure and the fault tolerance current paths.

TABLE 1B

| FIG. | Number of components Q | D | CT | L | Voltage Polarity | Fault path | Charger Output Voltage Range | Loss Change |
|---|---|---|---|---|---|---|---|---|
| 9B | 5 | 9 | 3 | 2 | Not reversed | ○ | $0 \sim V_{batt\_max}$ | — |
| 9C | 3 | 7 | 3 | 2 | $V_{batt}$ reversed | ○ | $0 \sim V_{batt\_max}$ | — |
| 9D | 7 | 7 | 3 | 2 | Not reversed | ○ | $V_{ac\_pk} \sim V_{batt\_max}$ | — |
| 9E | 6 | 6 | 3 | 2 | $V_{hv}$ reversed | ○ | $V_{ac\_pk} \sim V_{batt\_max}$ | — |
| 9F | 4 | 8 | 3 | 2 | Not reversed | ○ | $V_{ac\_pk} \sim V_{batt\_max}$ | — |
| 9G | 3 | 7 | 3 | 2 | $V_{hv}$ reversed | ○ | $V_{ac\_pk} \sim V_{batt\_max}$ | — |
| 2B | 6 | 9 | 1 | 1 | Not reversed | X | $0 \sim V_{batt\_max}$ | More Conduction Loss |

Regarding the change in losses, losses are classified based on Mode 1, Mode 2 and Mode 3 discussed above, since each mode is exclusive at any one time. The compared converters have non-inverted and relatively wider output voltage for both the add-on battery and the high voltage bus. The conventional configuration of FIG. 9B was compared with the integrated converter in each operation mode. Conduction losses of diodes and switches can be calculated as $$P_D = V_F \cdot I_F \text{ [W] (diode conduction loss)}, \tag{1}$$

$$P_Q = V_{CE(SAT)} \cdot I_{CE} \text{ [W] } (IGBT \text{ conduction loss}), \tag{2}$$

$$P_Q = R_{DS} \cdot I_D^2 \text{ [W] } (MOSFET \text{ conduction loss}), \tag{3}$$

$$P_{in} = \frac{P_o}{\varepsilon_{old}} \text{ [W] (input power of FIG. 9B).} \tag{4}$$

For Mode 1 (Plug-in Charging of Add-on Battery), it is found that the integrated converter has one more switch as shown in FIGS. 4B and 4C compared to FIG. 9B. And increase in loss is $$\Delta P_I = P_{Q3} [W]. \tag{5}$$

For Mode 2 (Boost Function from Add-on Battery to High Voltage Bus of HEV), as seen in FIG. 5B, one more pair of diodes and a switch is added in the proposed converter compared to FIG. 9B. Variation in loss is $$\Delta P_I = P_{D4} + P_{Q5} [W], \tag{7}$$

For Mode 3 (Regenerative Charging of the Add-on Battery), one more pair of diodes and a switch is placed as shown in FIG. 6B compared to FIG. 9B. Change in loss is $$\Delta P_l = P_{D6} + P_{Q3} [W]. \quad (8)$$

The function of comparative changes in efficiency for all three modes are formed as $$\Delta \varepsilon = P_o \cdot \left( \frac{1}{P_{in} + \Delta P_l} - \frac{1}{P_{in}} \right) = \frac{1}{\frac{1}{\varepsilon_{old}} + \frac{\Delta P_l}{P_o}} - \varepsilon_{old}. \quad (9)$$

Through equation (9), comparative change in efficiency can be presented with the previous efficiency $\varepsilon_{old}$, added loss $\Delta P_l$, and same output power $P_o$. If the diodes are in series with the switches which are only for enhancing reliability of switches, are omitted then losses in diodes can be neglected. Also, using and paralleling MOSFETs for switches makes it possible to reduce the increase in conduction loss.

Regarding feasibility estimation, Table 1 and equation (9) serves as the basis to estimate feasibility of the integrated converter. It is necessary to select a range of output power $P_o$, previous efficiency $\varepsilon_{old}$, $V_{batt}$, $V_{hv}$, $V_{ac}$, and duty ratio d which are shown on Table 2. The battery current $I_{batt}$, high voltage bus current $I_{hv}$, IGBTs (insulated-gate bipolar transistors), MOSFETs (metal-oxide-semiconductor field-effect transistors) and diodes are provided for relative loss comparison.

TABLE 2

Electrical Specification

| Mode | $P_o$ | d |
|---|---|---|
| 1 | 0~1.2 [kW][1] | 0~0.70 |
| 2 | 0~5 [kW] | 0~0.70 |
| 3 | 0~5 [kW] | 0~0.70 |

$\varepsilon_{old}$ = 0.8~0.9
$V_{batt}^{2}$ = Nominal 180 [V] (134~202 [V])
$V_{hv}$ = Nominal 330 [V] (216~397 [V])
$V_{ac}$ = 120 [V]/60 [Hz] ($\bar{V}_{ac}$ = 108 [V])
$I_{L\_max}$ = 50 [A]
Diode - STTH60L06W, 60 A/600 V, $V_F$ = 0.95 V
IGBT - STGW40N60V, 50 A/600 V, $V_{CE(SAT)}$ = 2.5 V
MOSFET - STY60NM60, 60 A/500 V, $R_{DS}$ = 0.045 Ω

[1]Based on 120 V/15 A AC with current drawn up to 80%
[2]High energy battery pack with a series of 12 modules consisting of nominal 3.7 [V] Li-Ion cells in 4S5P Assuming continuous conduction mode and low ripple current through the inductor with maximum output power $P_o$, approximate additional average loss $\Delta P_l$ and maximum change in efficiency $\Delta \varepsilon_{max}$ are calculated on the basis of the duty ratio between the input and the output as summarized as on Table 3, for example. Average loss calculation using duty ratio according to each operation mode is as follows.

For Mode 1, in FIG. 4B, assuming buck-boost operation, $$P_{o\_max} = 1200 \ [W] = V_{o\_min} \cdot I_{o\_max}, \quad (10)$$

$$I_{o\_max} = \frac{1200}{134} = 8.95 \ [A], \quad (11)$$

$$d = \frac{V_{o\_min}}{V_{o\_min} + \bar{V}_{ac}} = \frac{134}{134 + 108} = 0.554, \quad (12)$$

$$d' = 1 - d = 0.446. \quad (13)$$

For MOSFETs, $$\Delta P_l = P_{Q3} = \frac{I_{o\_max}^2 \cdot R_{DS}}{d'} = 8.08 [W], \quad (14)$$

$$\Delta \varepsilon_{max} = \frac{1}{\frac{1}{\varepsilon_{old}} + \frac{8.08}{1200}} - \varepsilon_{old} = -0.429 \sim -0.542 [\%]. \quad (15)$$

For IGBTs, $$\Delta P_l = P_{Q3} = I_{o\_max} \cdot V_{CE(SAT)} = 22.38 \ [W], \quad (16)$$

$$\Delta \varepsilon_{max} = \frac{1}{\frac{1}{\varepsilon_{old}} + \frac{22.38}{1200}} - \varepsilon_{old} = -1.176 \sim -1.486 [\%]. \quad (17)$$

For Mode 2, in FIG. 5B, $$P_{o\_max} = 5000 \ [W] = V_{hv\_min} \cdot I_{hv\_max}, \quad (18)$$

$$I_{hv\_max} = \frac{5000}{216} = 23.15 \ [A], \quad (19)$$

$$V_{hv\_min} = \frac{1}{1-d} \cdot V_{batt\_min}, \quad (20)$$

$$d = 1 - \frac{V_{batt\_min}}{V_{hv\_min}} = 1 - \frac{134}{216} = 0.379 \quad (21)$$

$$d' = 1 - d = 0.621, \quad (22)$$

$$I_{batt\_max} = \frac{I_{hv\_max}}{d'} = \frac{23.15}{0.621} = 37.27 \ [A]. \quad (23)$$

For MOSFETs, (24)

$$\Delta P_l = P_{D4} + P_{Q4} = V_F \cdot I_{batt\_max} + \frac{I_{hv\_max}^2 \cdot R_{DS}}{d'} = 74.24 \ [W]$$

$$\Delta \varepsilon_{max} = \frac{1}{\frac{1}{\varepsilon_{old}} + \frac{74.24}{5000}} - \varepsilon_{old} = -0.939 \sim -1.187 [\%]. \quad (25)$$

For IGBTs, (26)

$$\Delta P_l = P_{D4} + P_{Q4} = V_F \cdot I_{batt\_max} + V_{CE(SAT)} \cdot I_{hv\_max} = 93.28 \ [W]$$

$$\Delta \varepsilon_{max} = \frac{1}{\frac{1}{\varepsilon_{old}} + \frac{93.28}{5000}} - \varepsilon_{old} = -1.588 \sim -1.785 [\%]. \quad (27)$$

In Mode 3, in FIG. 6B, $$P_{o\_max} = 5000 \ [W] = V_{batt\_min} \cdot I_{batt\_max}, \quad (28)$$

$$I_{batt\_max} = \frac{5000}{134} = 37.31 \ [A], \quad (29)$$

$$V_{batt\_min} = d \cdot V_{hv\_min}, \quad (30)$$

-continued $$d = \frac{V_{batt\_min}}{V_{hv\_min}} = \frac{134}{216} = 0.620, \quad (31)$$

$$d' = 1 - d = 0.38, \quad (32)$$

$$I_{hv\_max} = I_{batt\_max} \cdot d' = 14.179 \ [A]. \quad (33)$$

For MOSFETs, $$\Delta P_l = P_{D6} + P_{Q3} = V_F \cdot I_{hv\_max} + I_{batt\_max}^2 \cdot R_{DS} = 7611 \ [W], \quad (34)$$

$$\Delta \varepsilon_{max} = \frac{1}{\frac{1}{\varepsilon_{old}} + \frac{76.11}{5000}} - \varepsilon_{old} = -0.962 \sim -1.216[\%]. \quad (35)$$

For IGBTs, $$\Delta P_l = P_{D6} + P_{Q3} = V_F \cdot I_{hv\_max} + V_{CE(SAT)} \cdot I_{batt\_max} = 106.75 \ [W], \quad (36)$$

$$\Delta \varepsilon = \frac{1}{\frac{1}{\varepsilon_{old}} + \frac{106.75}{5000}} - \varepsilon_{old} = -1.343 \sim -1.697[\%]. \quad (37)$$

Based on the equations above, the configurations of switches and diodes, Tables 3-6 show the different values for $\Delta \varepsilon_{max}$.

TABLE 3

Changes in loss and efficiency

| | | $\Delta P_l$ | | |
|---|---|---|---|---|
| Mode | Loss | Loss (MOSFET IGBT) | Total (MOSFET IGBT) | $\Delta \varepsilon_{max}$ (MOSFET IGBT) |
| 1 | $P_{Q3}$ | 8.08 [W] 22.38 [W] | 8.08 [W] 22.38 [W] | -0.429~-0.542[%] -1.176~-1.486[%] |
| 2 | $P_{D4}$ $P_{Q5}$ | 35.4 [W] 38.83 [W] 57.88 [W] | 74.23 [W] 93.28 [W] | -0.939~-1.187[%] -1.588~-1.785[%] |
| 3 | $P_{D6}$ $P_{Q3}$ | 13.47 [W] 62.64 [W] 93.28 [W] | 76.11 [W] 06.75 [W] | -0.962~-1.216[%] -1.343~-1.697[%] |

TABLE 4

Changes in loss and efficiency with paralleled switches

| | | $\Delta P_l$ | | |
|---|---|---|---|---|
| Mode | Loss | Loss (MOSFET IGBT) | Total (MOSFET IGBT) | $\Delta \varepsilon_{max}$ (MOSFET IGBT) |
| 1 | $P_{Q3}$ | 4.04 [W] 22.38 [W] | 4.04 [W] 22.38 [W] | -0.215~-0.271[%] -1.176~-1.486[%] |
| 2 | $P_{D4}$ $P_{Q5}$ | 35.4 [W] 19.42 [W] 57.88 [W] | 54.82 [W] 93.28 [W] | -0.696~-0.879[%] -1.588~-1.785[%] |
| 3 | $P_{D6}$ $P_{Q3}$ | 13.47 [W] 31.32 [W] 93.28 [W] | 44.79 [W] 106.75 [W] | -0.569~-0.720[%] -1.343~-1.697[%] |

TABLE 5

Changes in loss and efficiency without diodes

| | | $\Delta P_l$ | | |
|---|---|---|---|---|
| Mode | Loss | Loss (MOSFET IGBT) | Total (MOSFET IGBT) | $\Delta \varepsilon_{max}$ (MOSFET IGBT) |
| 1 | $P_{Q3}$ | 8.08 [W] 22.38 [W] | 8.08 [W] 22.38 [W] | -0.429~-0.542[%] -1.176~-1.486[%] |
| 2 | $P_{Q5}$ | 38.83 [W] 57.88 [W] | 38.83 [W] 57.88 [W] | -0.494~-0.625[%] -0.734~-0.928[%] |
| 3 | $P_{Q3}$ | 62.64 [W] 93.28 [W] | 62.64 [W] 93.28 [W] | -0.794~-1.003[%] -1.176~-1.486[%] |

TABLE 6

Changes in loss and efficiency with paralleled switch and without diodes

| | | $\Delta P_l$ | | |
|---|---|---|---|---|
| Mode | Loss | Loss (MOSFET IGBT) | Total (MOSFET IGBT) | $\Delta \varepsilon_{max}$ (MOSFET IGBT) |
| 1 | $P_{Q3}$ | 4.04 [W] 22.38 [W] | 4.04 [W] 22.38 [W] | -0.215~-0.271[%] -1.176~-1.486[%] |
| 2 | $P_{Q5}$ | 19.42 [W] 57.88 [W] | 19.42 [W] 57.88 [W] | -0.248~-0.313[%] -0.734~-0.928[%] |
| 3 | $P_{Q3}$ | 31.32 [W] 93.28 [W] | 31.32 [W] 93.28 [W] | -0.399~-0.505[%] -1.176~-1.486[%] |

Table 3 shows that maximum change in efficiency $\Delta \varepsilon_{max}$ is below 1.3[%] when MOSFETs are used for switches instead of IGBTs. Paralleling MOSFETs yields a $\Delta \varepsilon_{max}$ which is lower than 0.9[%] as shown Table 4. $\Delta \varepsilon_{max}$ as shown in Table 5 is equal or less than 1.0[%] in all three operation modes in case that diodes paired with switches are removed. If MOSFETs are paralleled then $\Delta \varepsilon_{max}$ is equal to or less than 0.5[%] in all three operation modes as on Table 6. These additional losses and the slight reduction in efficiency is a favorable trade off compared to the other advantages of the integrated converter enumerated above.

Alternative Parallel Switching

Typically, there are two ways to increase available output power from a converter. One is to employ higher rated components from the supplier for voltage and current. The other is to use parallel connections among two or more converters. In case of the former, available switching frequency of the power devices diminishes as the required maximum rate increases, that is, the inductor at some level of power becomes limiting and the difficulties in obtaining higher current (larger) inductors is more difficult when the switching frequency is decreased. The lower switching frequencies need larger inductors and larger capacitors. Alternatively, increasing the switching frequency allows smaller components. Conventional parallel operation of multi converters is not desirable for PHEV since it increases size, weight and cost, for example.

Figure 11:
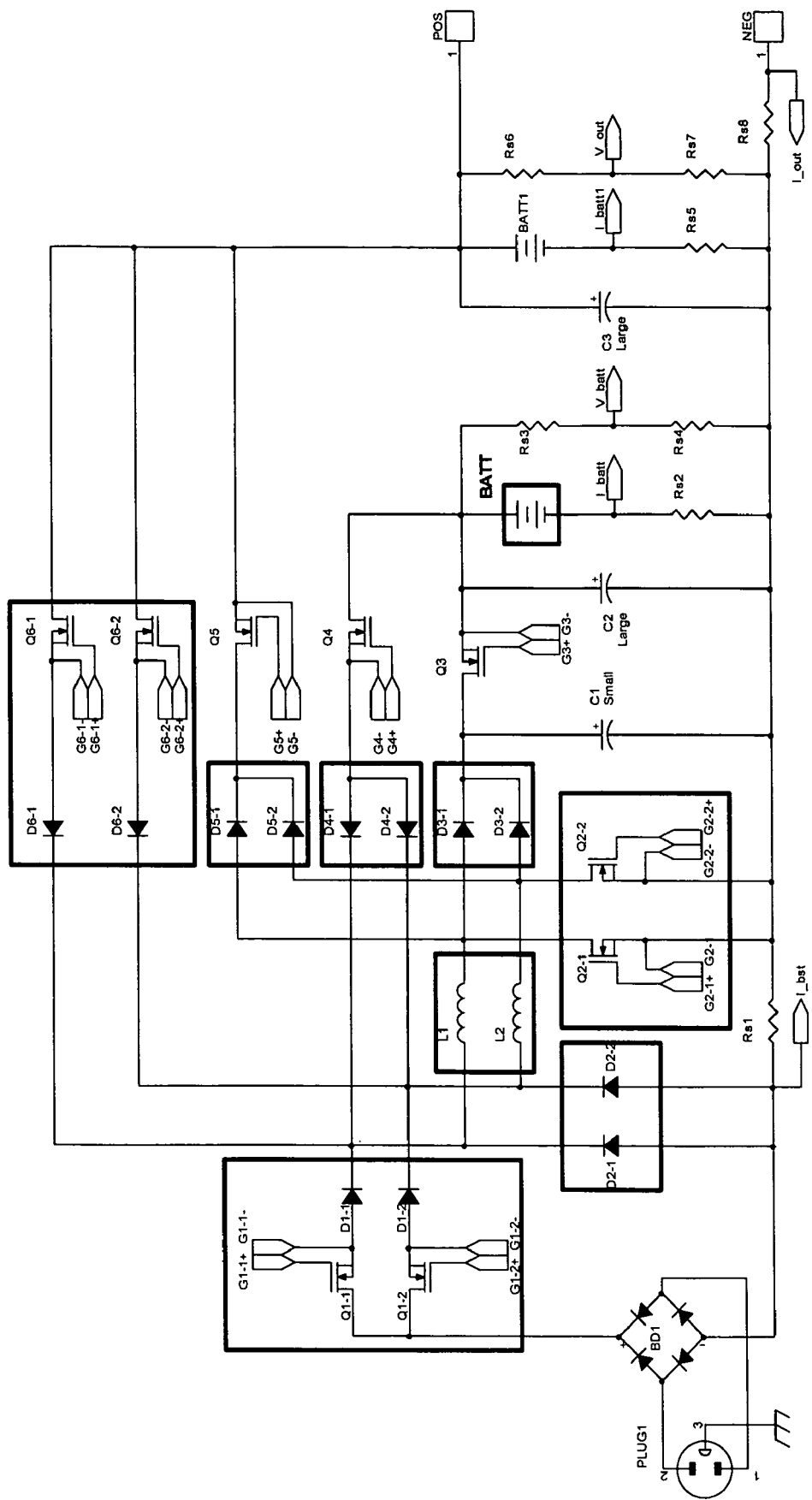
FIG. 11 shows a parallel alternative switched converter, according to an embodiment of this invention.

According to an embodiment of this invention, a Parallel Alternative Switching Strategy is employed in the converter design. The Parallel Alternative Switching Strategy offers an increase in frequency of the ripple current through the inductors without augmenting the actual switching frequency of the power devices. FIG. 11 shows an overall hardware configuration of the Parallel Alternative Switching Strategy including superposing two converters. The paired switching devices shown by boxes are turned on and off exclusively with each other in the individual operating mode.

Figure 8:
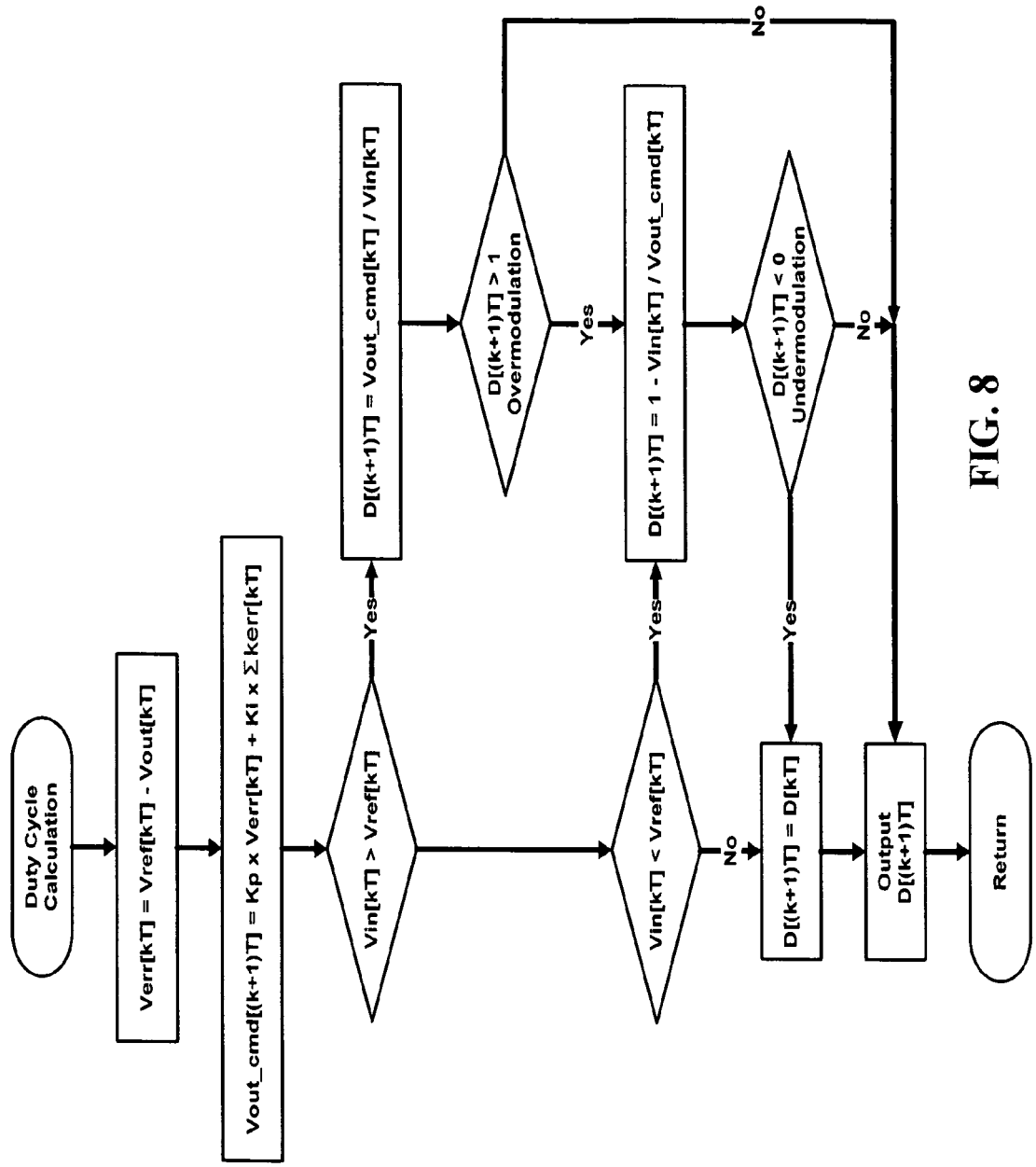
FIG. 8 shows a calculation of duty cycle, according to an embodiment of this invention.

Table 7 illustrates the switching truth table for the Parallel Alternative Switched Converter using the same control flow as shown in FIG. 8.

TABLE 7

The Parallel Alternative Switching Truth Table for Operation Mode

| Switch Mode | Q1-1 | Q1-2 | Q2-1 | Q2-2 | Q3 | Q4 | Q5 | Q6-1 | Q6-2 | Comments |
|---|---|---|---|---|---|---|---|---|---|---|
| Mode 1 | Alternative Switching | Alternative Switching | | | On | Off | Off | | Off | Plug-In Charging |
| Mode 2 | Off | | Alternative Switching | | Off | On | On | | Off | Boost Discharging |
| Mode 3 | Off | | Off | | On | Off | Off | Alternative Switching | | Regenerative Charging |

Regarding thermal issues, heat generated by the power electronic devices is dissipated to prevent damage of the semiconductor chip junctions. Heat accumulation can be a cause of unstableness and premature failure of the control circuitry of power electronics devices.

According to an embodiment of this invention, the Integrated Bi-Directional DC/DC Converter includes proper cooling methods and suitable heat sinks. Suitable devices for heat dissipation include heat sinks, fins, thermal grease, fans, liquid cooling, heat exchangers, refrigeration, semiconductor cooling and any other apparatus transferring thermal energy away from a component of the integrated converter. Typical criteria for selecting cooling methods and devices include:

Power losses calculation of switching devices

Operating temperature of switches (which should be below 125° C. for the conventional technology semiconductors such as IGBTs)

Heat flux limitations determined by the conductivity of the thermal paste

The cost effectiveness of any cooling method.

Figure 12A:
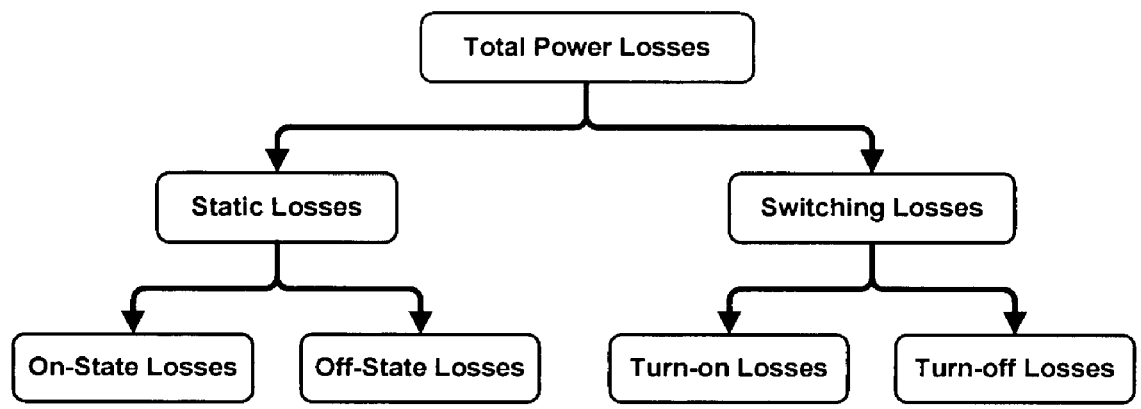
FIG. 12A shows power losses in power electronic devices, according to an embodiment of this invention.

Desirably, the power loss calculations are the basis of selecting the proper cooling method. FIG. 12A shows the possible single power dissipations during switching operation of the power electronics devices.

According to an embodiment of this invention, the proposed method of power loss calculation is to calculate the on-state losses, blocking losses, turn-on losses and turn-off losses separately before adding them together to arrive at the total power losses of the switching IGBTs. The relation between power losses and the conditions of switching, such as, junction temperature, collector voltage, current and switching speed is measured. The Integrated Bi-Directional DC/DC Converter includes a combination of an AC input power supply and a DC input converter. The losses are different in these two modes of operation. For the DC/DC boost converter mode of operation, the switching loss can be calculated with the help of a digital storage oscilloscope. The conduction losses can be done by a reasonable estimate which uses the average and RMS (root mean square) currents in conjunction with the forward voltage drop versus current curve for the device.

Figure 12B:
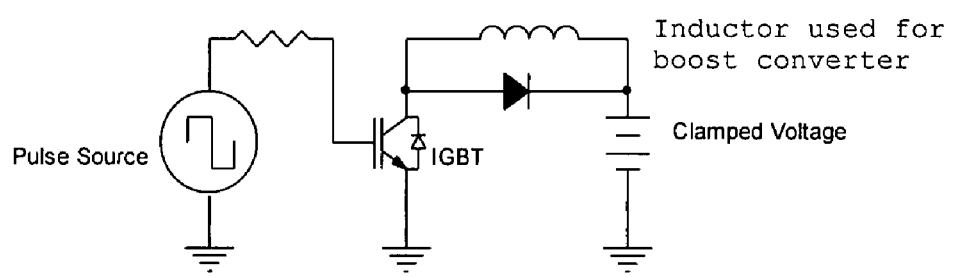
FIG. 12B shows a basic test circuit, according to an embodiment of this invention.

For the AC input power supply mode of operation, the loss calculation method includes several components. A basic test circuit as shown in the FIG. 12B can be used for calculation of the turn-off and turn-on losses.

The energy loss measurements will be made for a single pulse with the device preheated to a specific junction temperature. Two voltage values will be employed. The equation below shows the basic form of turn-off losses in an IGBT at a fixed voltage of v1.

$$\text{Power\_off\_v1}(I, Tj) := ka(Tj) \cdot I^3 + kb(Tj) \cdot I^2 + kc(Tj) \cdot I + kd(Tj)$$

Vectors ka(Tj), kb(Tj), kc(Tj), kd(Tj) in equation above can be determined by curve fitting the practical inductive turn-off data. The power loss in another voltage v2 is measured.

$$\text{Power\_off\_v2}(I, Tj) := ka(Tj) \cdot I^3 + kb(Tj) \cdot I^2 + kc(Tj) \cdot I + kd(Tj)$$

Then by using curve fitting methods, the turn off losses as a function of voltage, junction temperature and collector current are calculated. The equation is shown below.

$$\text{Power\_off}(V, I, Tj) := \text{Power\_off\_v1}(I, Tj) + \frac{(V - v1)}{v2 - v1}(\text{Power\_off\_v2}(I, Tj) - \text{Power\_off\_v1}(I, Tj))$$

The turn off current is expressed in the equation below.

$$\text{I\_off}(Vac, Pout, y) := \sqrt{\frac{2 \cdot Pout}{\textit{eff} \cdot Vac}} \cdot \sin(\omega \cdot t) + \frac{\Delta IL(t)}{2}$$

The turn off losses according to time is shown below.

$$IGBT\_off\_loss(Vac, Pout, t, Tj) := fs \cdot \text{Power\_off}(V, |I\_off(Vac, Pout, t)|, Tj)$$

By integrating the power losses, the turn off loss watt expression is shown below.

$$IGBT\_off\_watts(Vac, Pout, Tj) := \frac{4}{T} \cdot \int_0^{\frac{T}{4}} IGBT\_off\_loss(Vac, Pout, t, Tj) dt$$

Regarding on-state losses, on-state saturation voltage is expressed as a function of collector current and junction temperature shown as following.

$$VsIGBT(I, Tj) := VsT1(I) + (VsT2(I) - VsT1(I)) \cdot \frac{T1 - Tj}{T1 - T2}$$

VsT1(I) and VsT2(I) are determined based on curve fitting IGBT saturation voltages at two specific temperatures T1 and T2. The expression for the saturation voltage is then determined by the application of a linear extrapolation between the two specific temperatures. Then the IGBT on-state losses can be expressed as a function of current and on-state saturation voltage as shown below.

$$IGBT\_onstate\_loss(Vac,Pout,Tj,t) := Iline \cdot VsIGBT(Iline,Tj) \cdot D(Vac,t)$$

Integrating the power losses provides the on state loss watt expression below.

$$IGBT\_onstate\_watt(Vas, Pout, Tj) := \frac{4}{T} \cdot \int_0^{\frac{T}{4}} IGBT\_onstate\_loss(Vac, Pout, t, Tj)dt$$

Off-state losses are typically ignored because they are usually insignificant with respect to turn-on, on-state, and turn-off losses.

By adding the loss components together, the power loss is a function of junction temperature, collector voltage, current and switching speed.

Cooling

According to an embodiment of this invention the Integrated Bi-Directional DC/DC Converter is extended to 30 kW. Installing the integrated converter on a car with an existing liquid cooling system is straightforward. Conventional coolant typically has an operating envelope including about 129° C. without boil over based on a mixture of about 50% coolant and about 50% water. Desirably, at least a portion of the integrated converter is liquid cooled without increasing the radiator size of the HEV Alternately, the radiator is increased to a larger-sized radiator and/or an additional radiator is added to the HEV cooling capabilities with the integrated converter.

According to an embodiment of this invention, the design of the integrated converter reduces a risk for electrical shock or fire. Desirably the integrated converter complies with and passes suitable CE (European Conformity) and UL (Underwriter Laboratory) regulations and/or standards for electrical equipment.

Figure 13:
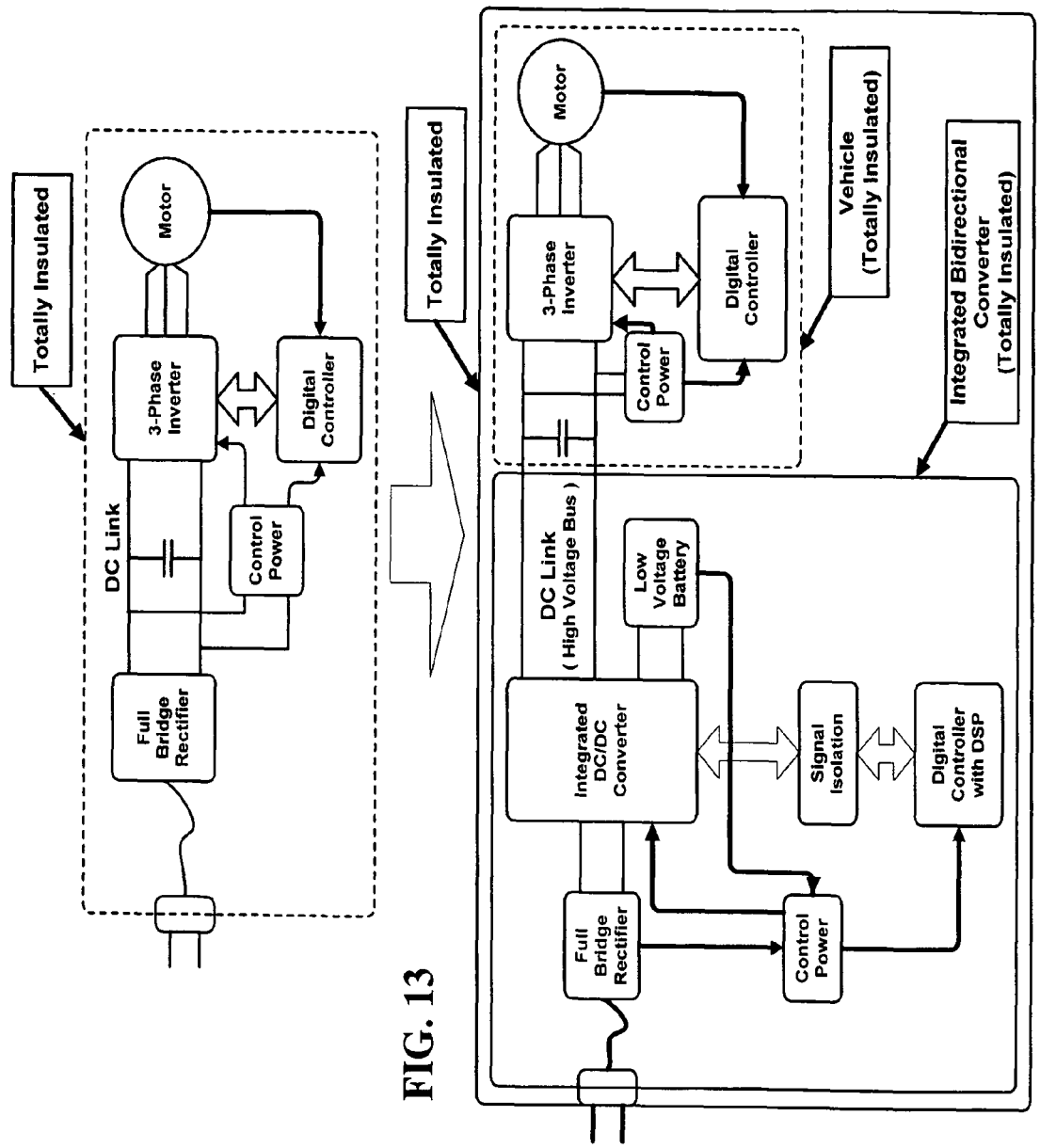
FIG. 13 shows the relation between a normal motor driver and the PHEV driver system, according to an embodiment of this invention.

FIG. 13 illustrates a suitable electric insulating relationship between the general motor driver and the PHEV driver system with the integrated converter. Desirably, users cannot touch electrically charged parts either directly or indirectly.

Figure 14:
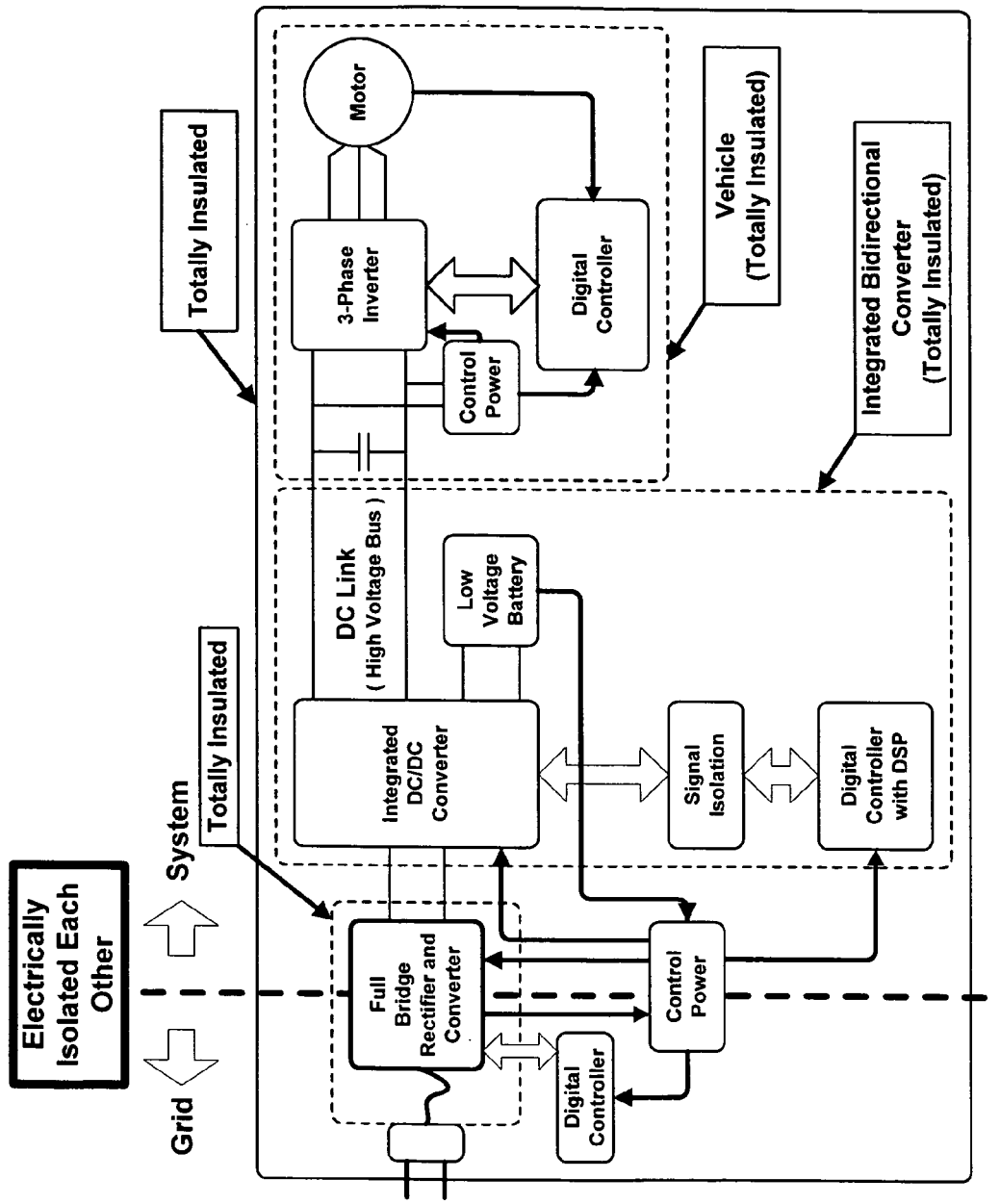
FIG. 14 shows a system configuration with an isolated full bridge converter, according to an embodiment of this invention.

Alternately, the electrical isolation between the grid and the vehicle includes a full bridge converter with a high power high frequency isolation transformer instead of full bridge rectifier at the AC input side, as shown in FIG. 14, for example.

According to another embodiment of this invention, the converter comprises a 2.4 kW/24V/100 A AC-DC converter including a low voltage and high current AC-DC converter to supply stable power for charging of the High Power Li-Ion Battery packs. To minimize the size of the inductor, a Parallel Alternative Switching Strategy may be employed. The Parallel Alternative Switching Strategy maintains the high ripple frequency in the inductor current at a relatively lower switching frequency of the switching devices and gains a high current output with relatively low peak current through each inductor.

Figure 15:
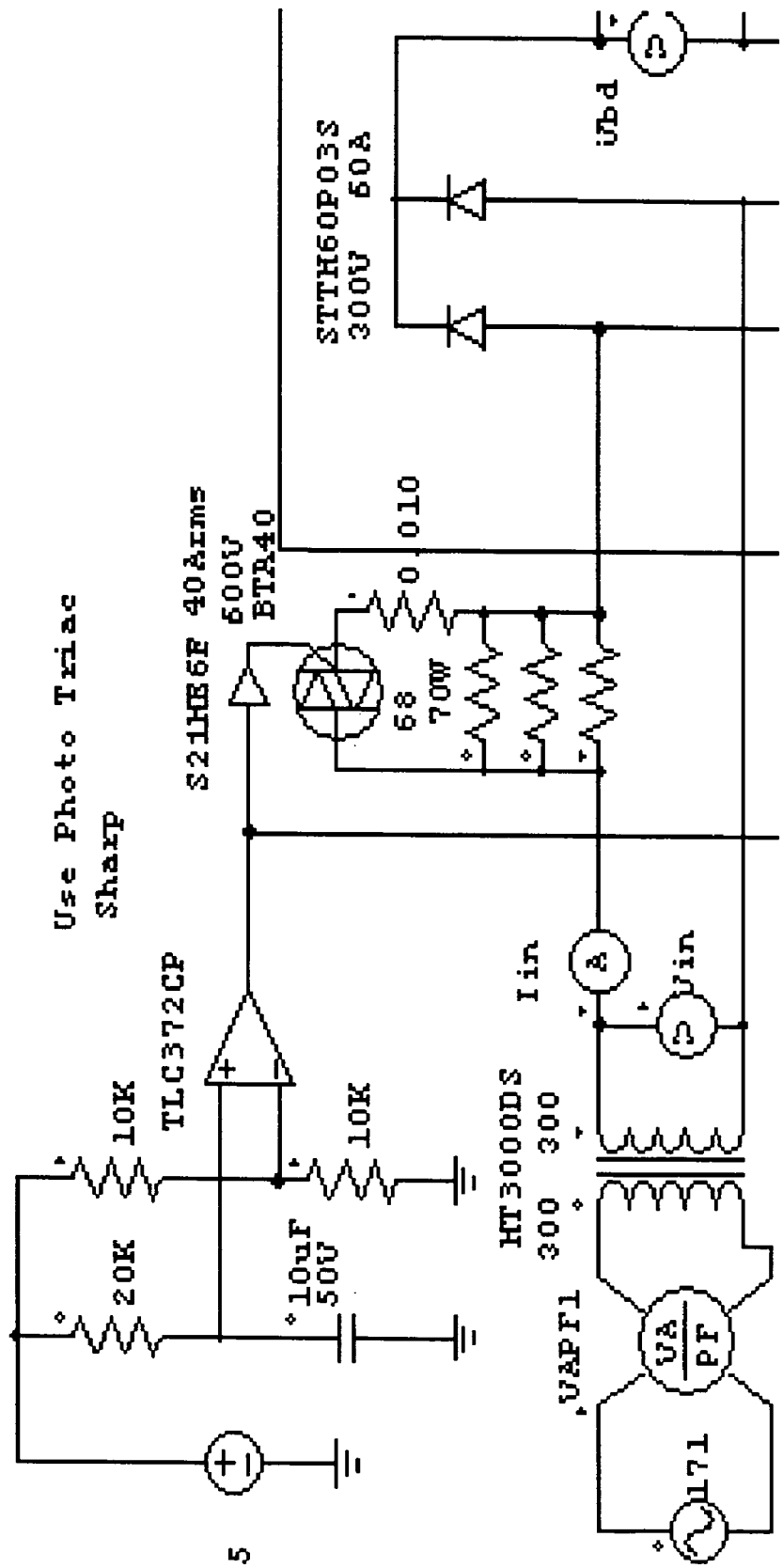
FIG. 15 shows a simulation circuit using the parallel alternative switching strategy, according to an embodiment of this invention.

According to an embodiment of this invention, the integrated converter has a PFC function with boost converter and buck converter functionality at 24V and 100 A. A 2.4 kW load bearing converter of this design provides good output voltage and high current with relatively low rated current devices while maintaining a high frequency ripple current through inductor. FIG. 15 shows the circuit diagram for the converter with a Parallel Alternative Switching Strategy, according to an embodiment of this invention.

Figure 16:
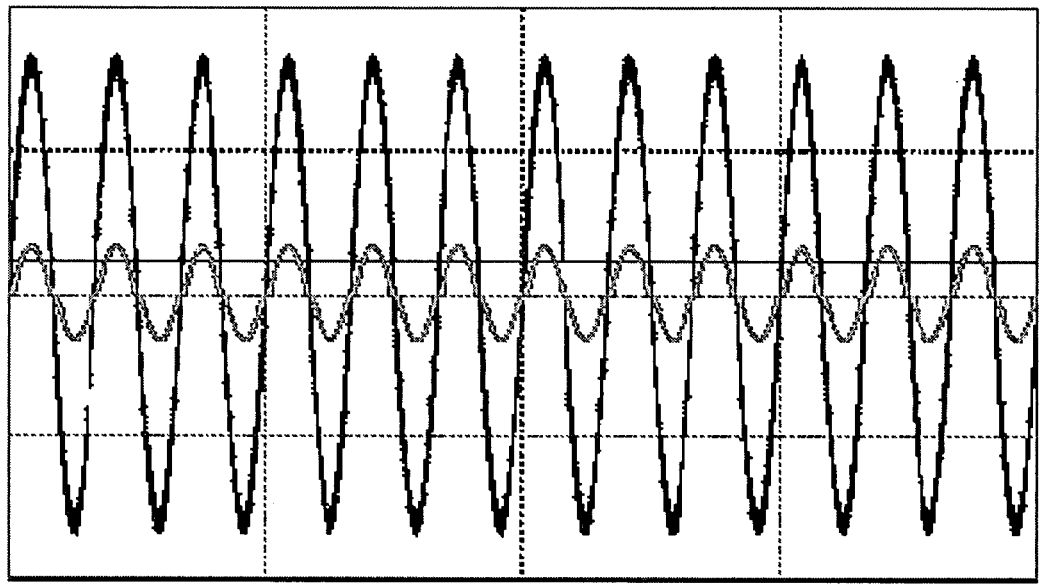
FIG. 16 shows the input voltage, input current and output voltage, according to an embodiment of this invention.
Figure 17:
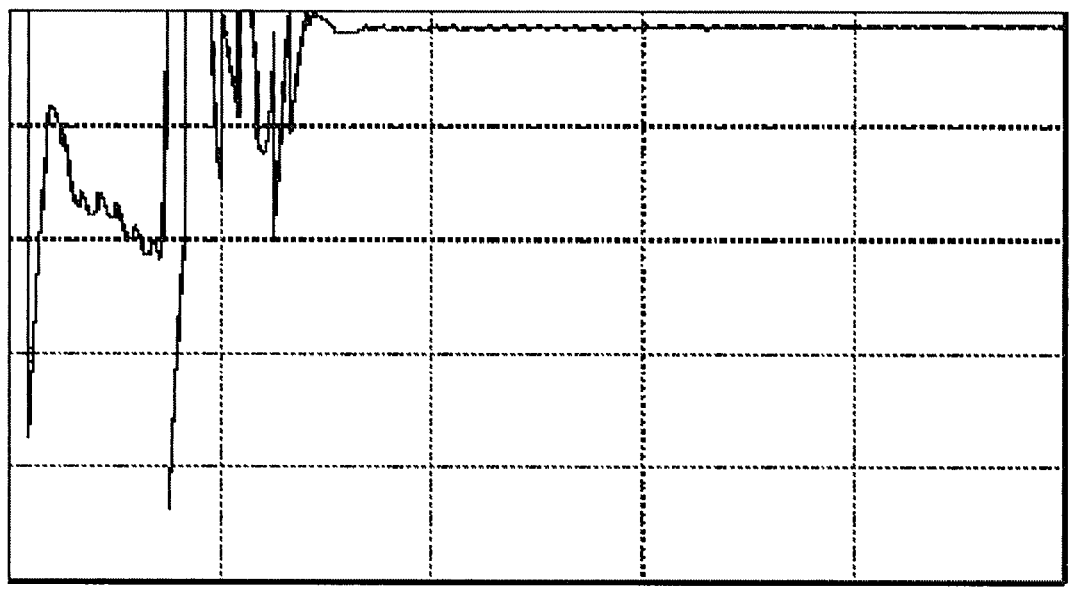
FIG. 17 shows a power factor correction from transient to steady state, according to an embodiment of this invention.

FIG. 16 depicts the AC input voltage, the input current and the 24V DC output voltage with a 0.24Ω resistor load. FIG. 16 shows a stable PFC with sinusoidal input voltage and current while providing a stable 24V DC output with 0.24Ω resistor load. FIG. 17 shows the PFC from a transient to a steady state PFC of an acceptable value of 0.96. This state applies to the plug-in charging mode, for example.

Figure 18:
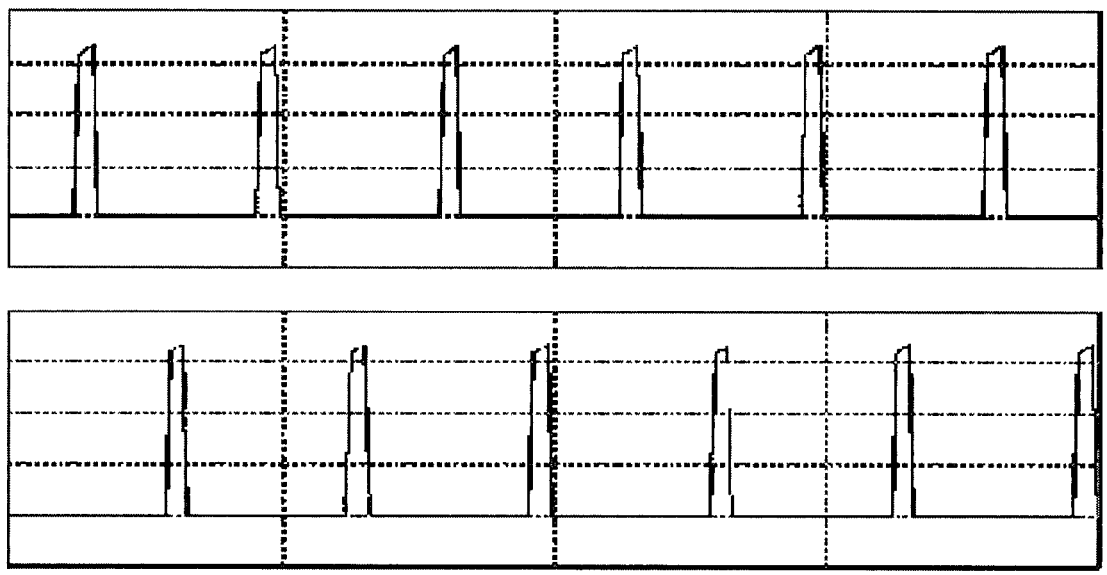
FIG. 18 shows the current through each switch of the boost converter, according to an embodiment of this invention.

FIG. 18 shows the current through each switch of the boost converter where the actual switching frequency is half of the frequency of the current through the boost inductor due to the alternative switching of those two switches.

Figure 19:
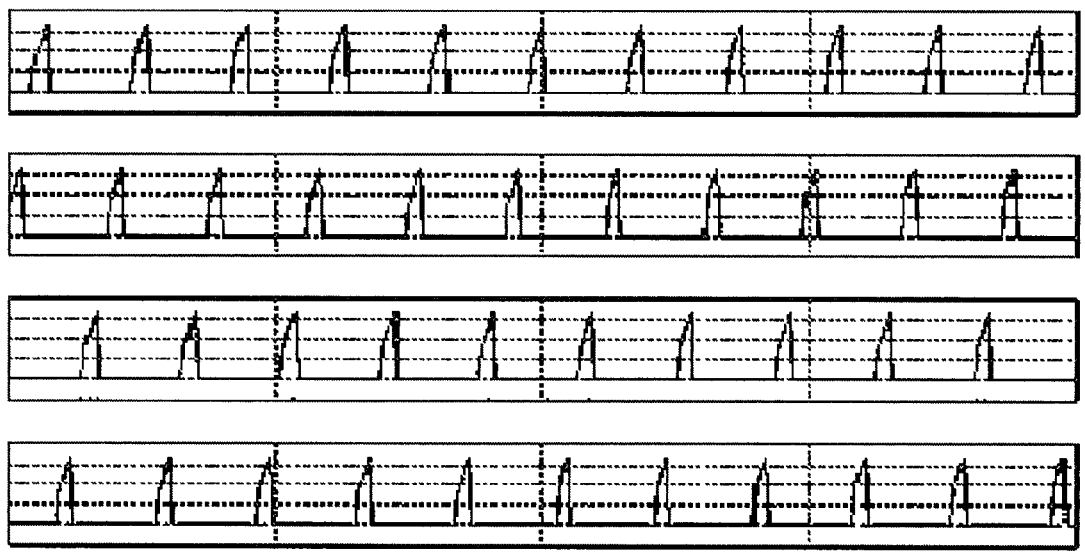
FIG. 19 shows the current through each switch of the buck converter, according to an embodiment of this invention.
Figure 20:
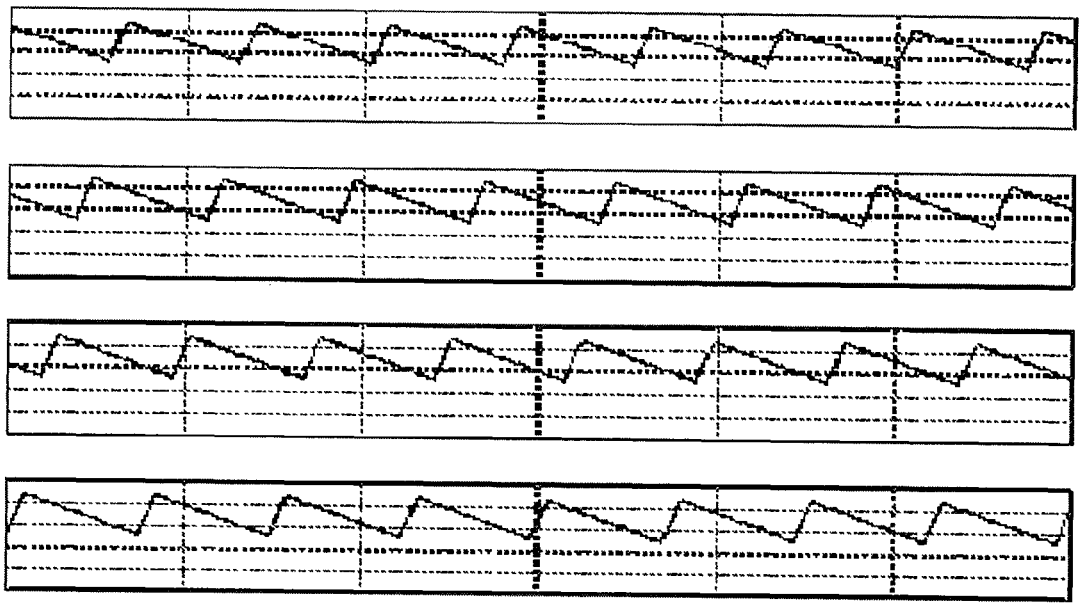
FIG. 20 shows the current through each inductor of the buck converter, according to an embodiment of this invention.
Figure 21:
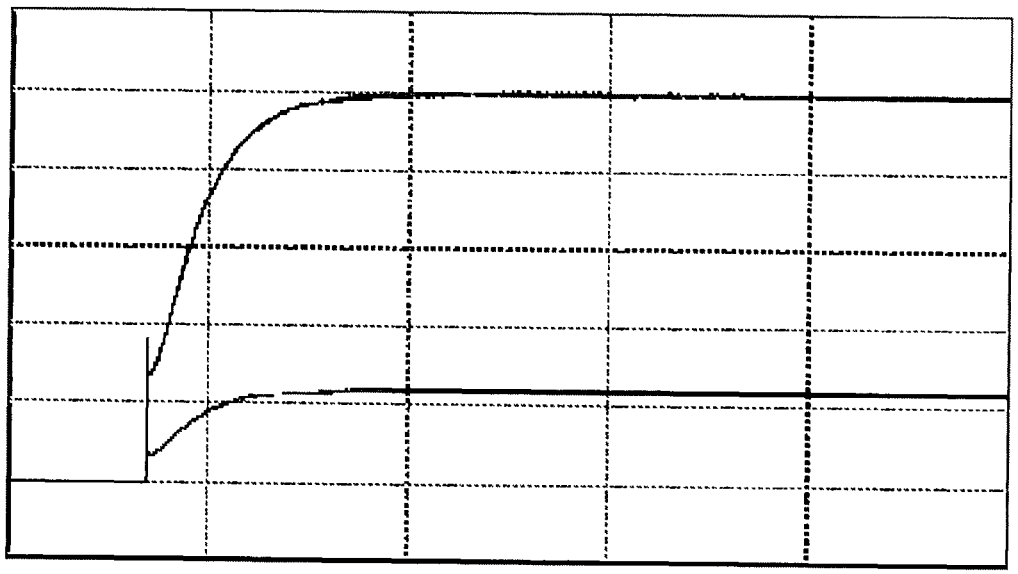
FIG. 21 shows the output voltage with 24V and current with 100 A, according to an embodiment of this invention.

FIGS. 19 and 20 show the individual current through each switch and inductor of the buck converter, respectively. The average current of four inductors is 25 A which reduces the peak current of inductors and switches over the total of 100 A. FIG. 21 shows the output voltage of 24 VDC and current of 100 A from the buck converter.

Figure 22:
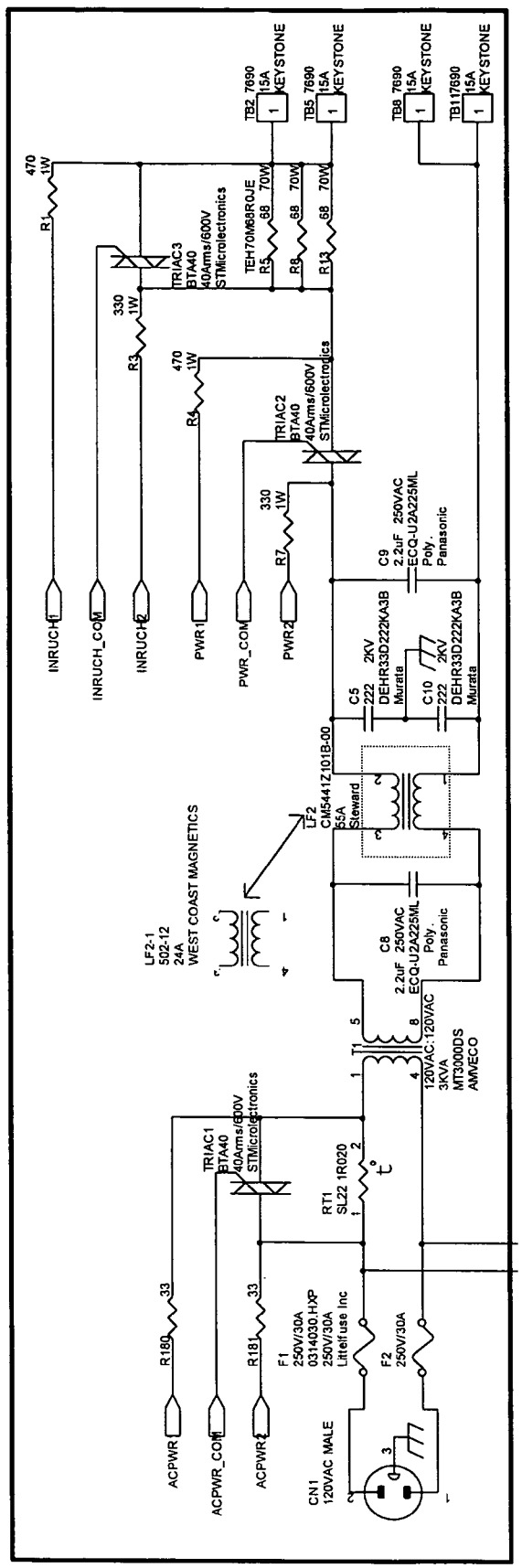
FIG. 22 is a circuit diagram for the working prototype of the integrated converter, according to an embodiment of this invention.

FIG. 22 shows the circuit diagram to power high power Li-ion battery packs, according to an embodiment of this invention, for example.

Figure 23:
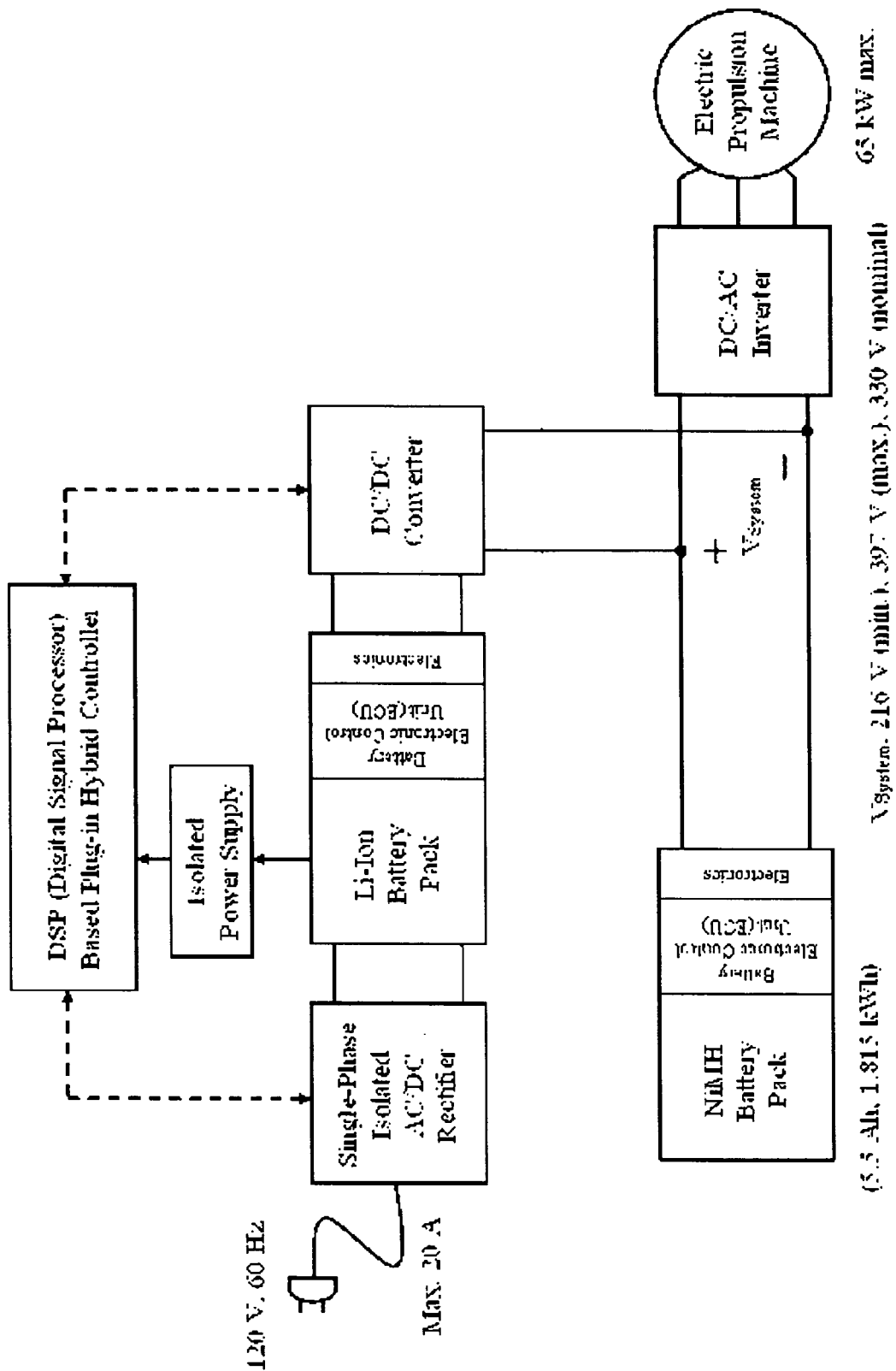
FIG. 23 shows the minimum components of the integrated converter, according to an embodiment of this invention.

According to an embodiment of this invention, a retrofit kit in combination of with the current controller and the power electronics of a 2006 Ford Escape Hybrid doubled the average gas mileage. This retrofit kit obtains its improved performance and reduced emissions by increasing the vehicle's energy storage capacity with additional secondary batteries recharged from the electrical grid. The minimum components of the retrofit kit includes an AC/DC rectifier, a DC/DC converter, a battery bank and a controller for safety supervision and system interaction, as shown in FIG. 23, for example.

High power lithium-ion cells ensure the battery's ability to power demands of the 65 kW peak electric motor. A modular high power pack includes 20 18650 lithium-ion cells in a 4 series, 5 parallel configuration. Desirably, these cells are feed through a printed circuit board that contains protection and battery management circuits. This arrangement provides 12-16.8V swing capacity, nominal 7.5 Ah capacity and 50 A continuous output in a package roughly 4"×3"×3" and weighting about 3 lbs. These light, powerful, compact, and highly intelligent battery modules, for example, allow quick scaling to nearly any vehicular application.

Desirably, lithium-ion batteries have a fast charge time over traditional rechargeable battery chemistries when industry standard charging algorithms are used. In addition, the PHEV's impact to the electrical grid must be minimized for future grid stability.

According to an embodiment of this invention, the AC/DC rectifier is designed to power external charging circuits of large numbers of individual modules simultaneously and allows the rectifier to be used regardless of the final battery's modular configuration or end application. For a given rectifier, a 120 Vac, 60 Hz input produces a 24 Vdc 2.4 kW output that simulations show has a power factor correction of greater than 0.96 at all times. This delivers power to chargers which use a constant current, constant voltage algorithm to fully charge battery modules in 4 hours or less.

The 2006 Ford Escape Hybrid powered by the prototype kit employed DC bus voltage matching to eliminate the fundamental need of a DC/DC converter, for example, but reduced the state of charge window and reduced the electrical control of the kit-to-car interface. This prototype also removed the battery modules from the vehicle for charging. According to other embodiments of this invention, the battery of the power module is not removed from the vehicle for charging. The controller matches the necessary battery parameters for the car to accept the majority of electrical power required from the external energy source. Desirably, the retrofit kit does not alter an electronic or mechanical control or safety measure incorporated by the OEM (original equipment manufacturer).

Controller debugging provides feedback to properly employ the inherent resources of the HEV's original energy control unit.

According to another embodiment of this invention, a 3.3 kW/330 V10 A with a full bridge converter includes a DSP controller. Desirably, the design includes interfaces among blocks of circuits with different voltage and current levels. The DSP provides communication with an external system and a flexible control strategy.

Figure 24:
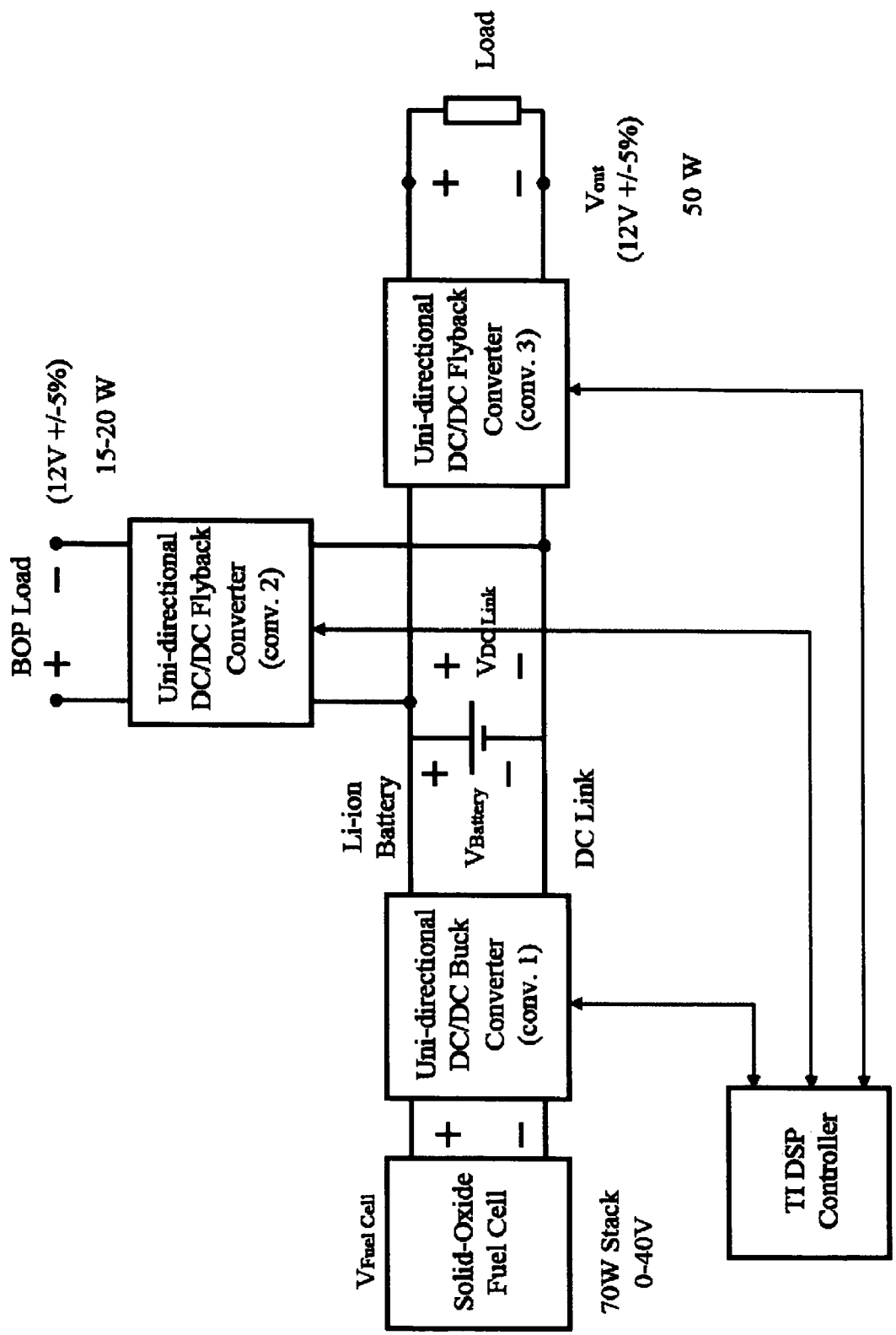
FIG. 24 is an overall block diagram showing an isolated active hybrid fuel cell/Li-ion battery power supply, according to an embodiment of this invention.
Figure 25A:
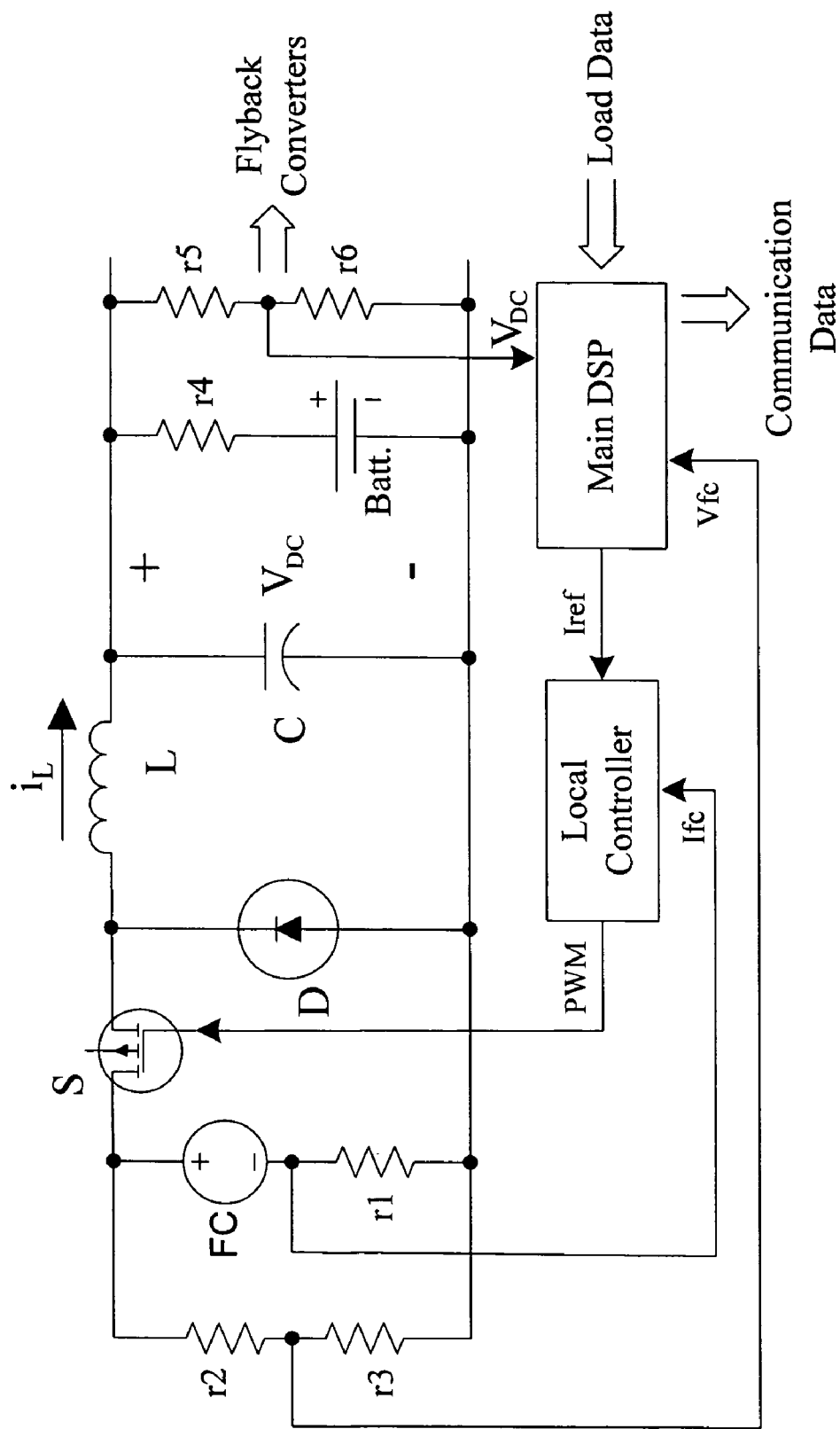
FIG. 25A shows a DC/DC buck converter, according to an embodiment of this invention.
Figure 25B:
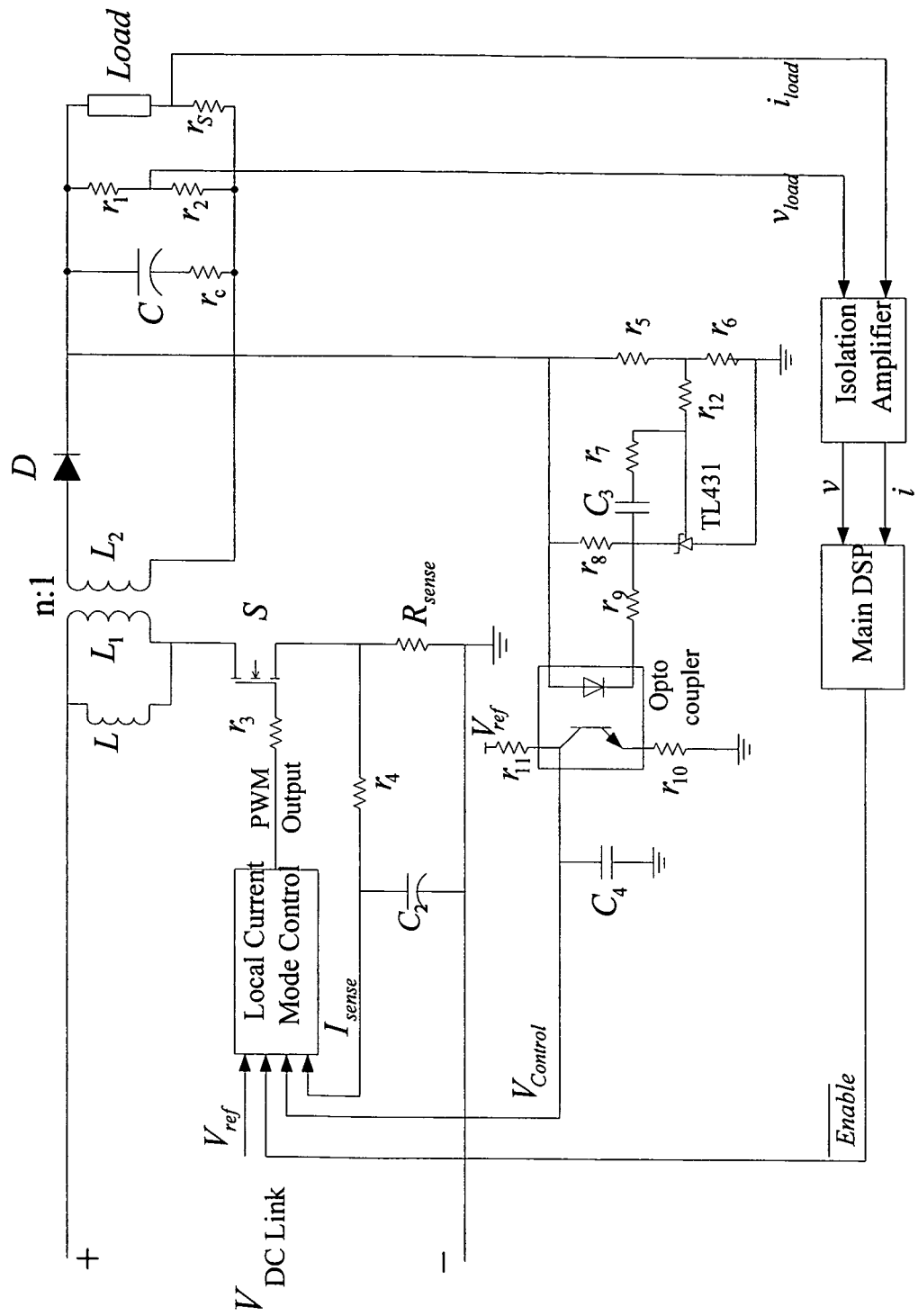
FIG. 25B shows a current-mode controlled flyback converter, according to an embodiment of this invention.

According to another embodiment of this invention, the integrated converter includes Digital Control of an Isolated Active Hybrid Fuel Cell/Li-Ion Battery Power Supply with a DC-DC converter based on a DSP controller. FIG. 24 shows the overall block diagram. FIGS. 25A and 25B show the schematic configuration for the buck converter and the schematic configuration for the flyback converter corresponding to FIG. 24, according to an embodiment of this invention.

Figure 26A:
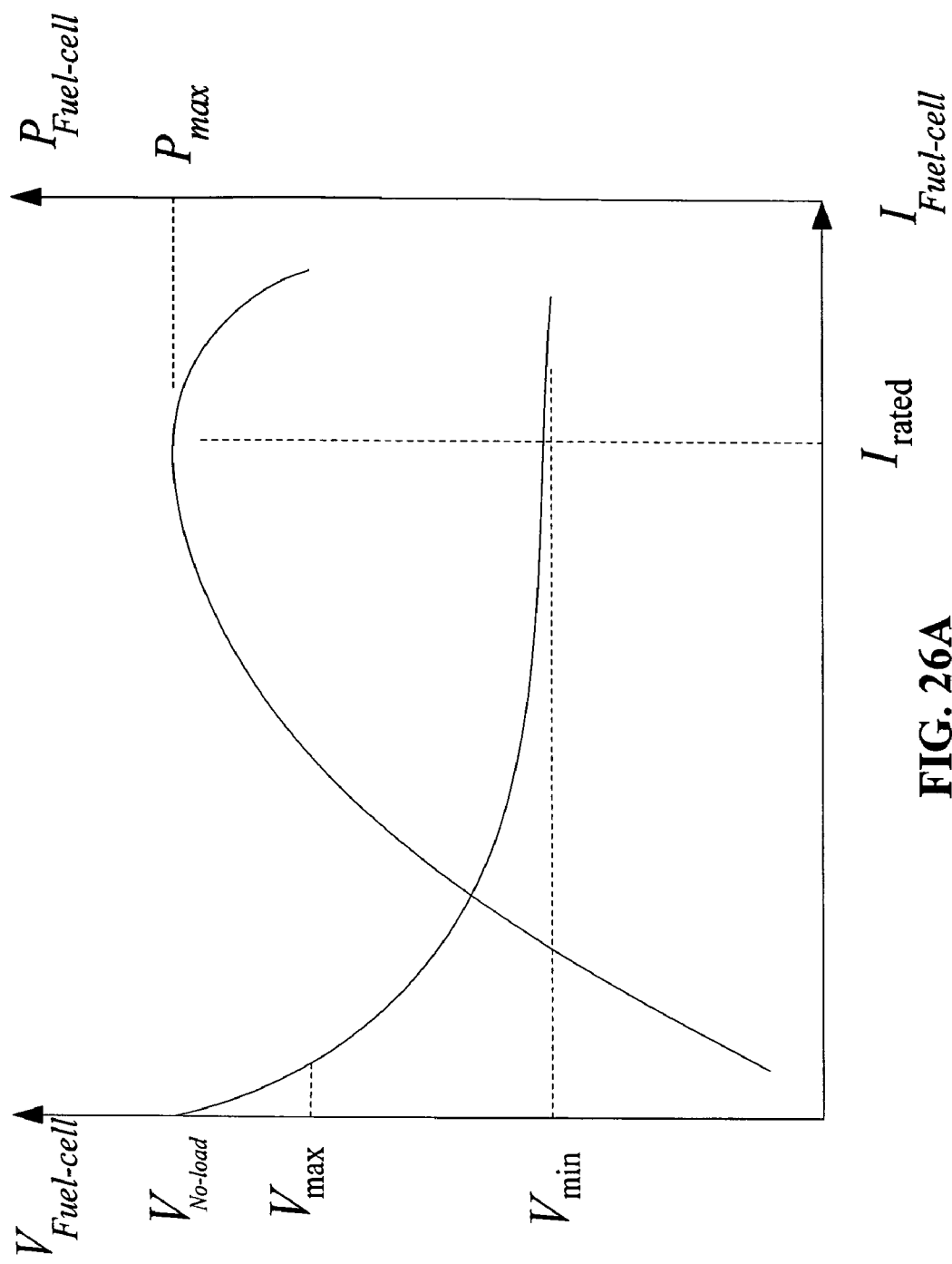
FIG. 26A shows the V-I and P-I characteristics of a typical fuel cell, according to an embodiment of this invention.
Figure 26B:
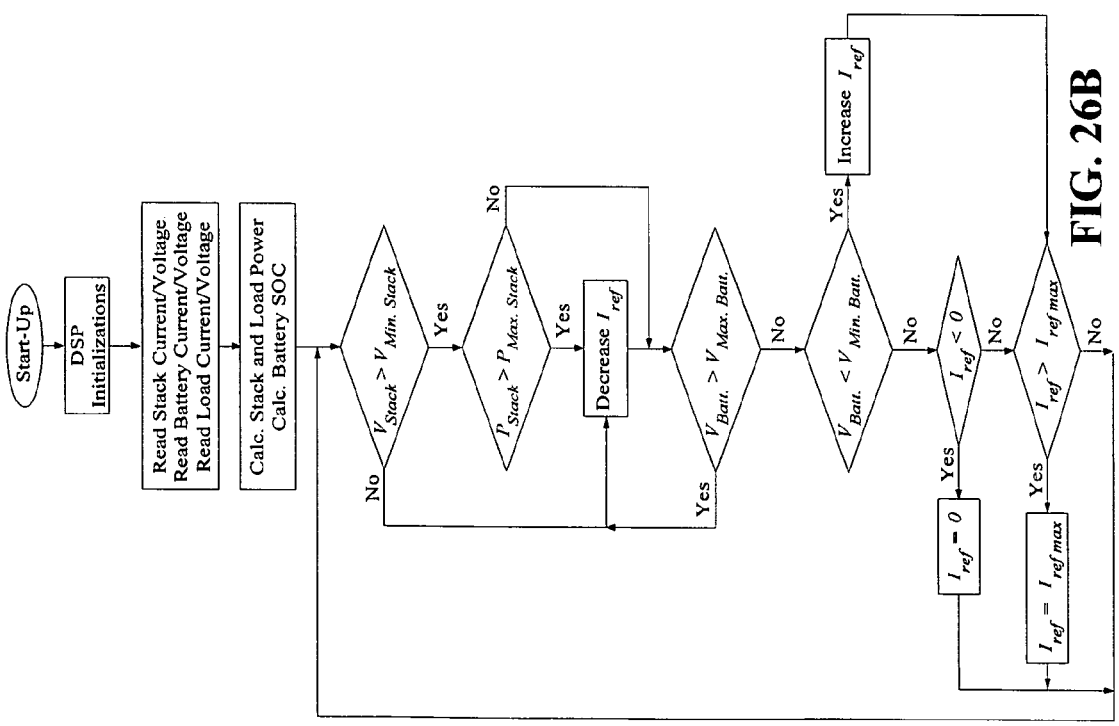
FIG. 26B shows the control flow strategy for an isolated active hybrid fuel cell/Li-ion battery power supply, according to an embodiment of this invention.

In this system, the DSP controller performs overall system control with each local controller, including fuel cell conditioning, constant power control, constant voltage control and communication with an external computer to send information including system status and to receive any command from the higher controller. FIG. 26A shows the voltage current characteristic curve for a fuel cell battery, according to an embodiment of this invention. FIG. 26B shows the corresponding control strategy for the fuel cell.

According to an embodiment of this invention, the invention includes an integrated configuration for AC-DC and DC-DC bi-directional converter and the plug-in hybrid conversion of a HEV. Comparison of the integrated converter and combinations of conventional converters shows several advantages. Increased losses due to additional diodes and switches can be reduced by paralleling of MOSFETs and omitting of diodes paired to switches.

It will be appreciated that details of the foregoing embodiments, given for purposes of illustration, are not to be construed as limiting the scope of this invention. Although only a few exemplary embodiments of this invention have been described in detail above, those skilled in the art will readily appreciate that many modifications are possible based at least in part on the exemplary embodiments without materially departing from the novel teachings and advantages of this invention. Accordingly, all such modifications are intended to be included within the scope of this invention, which is defined in the following claims and all equivalents thereto. Further, it is recognized that many embodiments may be conceived that do not achieve all of the advantages of some embodiments, particularly of the preferred embodiments, yet the absence of a particular advantage shall not be construed to necessarily mean that such an embodiment is outside the scope of the present invention.

What is claimed is:

1. An AC/DC power module for a plug-in hybrid electric vehicle having an electric drive system and an electric power supply, the power module comprising:
 a plug connectable to an AC power source;
 a rectifier having a rectifier input connected to the plug for receiving an alternating current therethrough, the rectifier having a rectifier circuit changing alternating current to direct current, the rectifier having a rectifier output supplying a direct current;
 a bidirectional DC to DC converter having a first converter terminal operating at a first voltage and a second converter terminal operating at a second voltage that is different than the first voltage, the bidirectional DC to DC converter having a converter circuit changing direct current to or from the first voltage and the second voltage, the first converter terminal connected to the rectifier output;
 an inductor, the rectifier comprising the inductor when during operation in a plug-in charging mode and the bidirectional DC to DC converter comprising the inductor during operation in a boost function mode and a buck function mode;
 a battery connected to the first converter terminal and the second converter terminal; and
 a bus connected to the first converter terminal and the second converter terminal, the bus connectable to the electric drive system.

2. The power module of claim 1, wherein the converter transfers at least 5 kilowatts of power between the battery and the bus.

3. The power module claim 1, further comprising a processor with an algorithm in combination with the converter for controlling at least one of gating switch signals, voltage feedback and current feedback.

4. The power module of claim 1, wherein the converter circuit comprises one current feedback loop and three voltage feedback loops.

5. The power module of claim 1, wherein the AC power source has between about 100 volts to about 500 volts and one or more phases.

6. The power module of claim 1, wherein the converter operates:
 in a plug-in charging mode to supply power from the plug to the battery;
 in a boost function mode to supply power from the battery to the bus; and
 in a buck function mode to supply power from the bus to the battery.

7. The power module of claim 1, wherein the rectifier comprises a pulse width modulation rectifier.

8. The power module of claim 1, wherein the bidirectional DC to DC current converter comprises at least four switches and at least four diodes operatively connected with respect to each other to function in the plug-in charging mode, the boost function mode and the buck function mode.

9. The power module of claim 1, wherein the battery comprises at least one of the group consisting of lithium ion, nickel metal hydride and lead acid.

10. A plug-in hybrid electric vehicle comprising the power module of claim 1.

11. The plug-in hybrid electric vehicle of claim 10, further comprising a liquid coolant system that cools at least a portion of the power module.

12. An AC/DC power module for a plug-in hybrid electric vehicle having an electric drive system and an electric power supply, the power module comprising:

a plug connectable to an AC power source;

a rectifier having a rectifier input connected to the plug for receiving an alternating current therethrough, the rectifier having a rectifier circuit changing alternating current to direct current, the rectifier having a rectifier output supplying a direct current;

a bidirectional DC to DC converter having a first converter terminal operating at a first voltage and a second converter terminal operating at a second voltage that is different than the first voltage, the bidirectional DC to DC converter having a converter circuit changing direct current to or from the first voltage and the second voltage, the first converter terminal connected to the rectifier output;

an inductor coil, each of the rectifier and the bidirectional DC to DC converter comprising the inductor coil when power is utilized therethrough;

a battery connected to the first converter terminal and the second converter terminal;

a bus connected to the first converter terminal and the second converter terminal, the bus connectable to the electric drive system;

a first end of the inductor coil connected to the rectifier output, the first end of the inductor coil connected to a cathode of a first diode and a cathode of a second diode;

a second end of the inductor coil connected to an anode of a third diode and an anode of a fourth diode;

an anode of the first diode connected to a first pole of a first switch;

an anode of the second diode connected to a first pole of a second switch;

a cathode of the third diode connected to a first pole of a third switch;

a cathode of the fourth diode connected to a first pole of a fourth switch;

a second pole of the first switch connected to a positive bus terminal of the bus;

a second pole of the third switch connected to the positive bus terminal of the bus;

a second pole of the second switch connected to a positive battery terminal of the battery;

a second pole of the fourth switch connected to the positive battery terminal of the battery; and a negative battery terminal of the battery and a negative bus terminal of the bus connected to a ground.

13. The power module of claim 12, further comprising a parallel alternative switching strategy to increase power transferred between the bus and the battery without an increase in a switching frequency.

14. The power module of claim 12, further comprising:
a first pole of a fifth switch connected to the second end of the inductor coil;
a second pole of the fifth switch connected to the ground;
an anode of a fifth diode connected to the ground;
a cathode of the fifth diode connected to the first end of the inductor coil;
a first pole of a sixth switch connected to the rectifier output;
a second pole of the sixth switch connected to the first end of the inductor coil; and
the rectifier circuit connected to the ground.

15. The power module of claim 12, further comprising:
electromagnetic interference filters connected to at least one of the plug, the battery and the bus.

16. A method of controlling power for a plug-in hybrid electric vehicle having an electric drive system comprising:
charging a battery with an AC power supply by rectifying power from alternating current to direct current and converting in a bidirectional DC to DC converter the power from a supply voltage to a battery voltage for storage in the battery;
boosting power supplied to the hybrid electric vehicle when needed by the electric drive system by converting power stored in the battery from the battery voltage to a bus voltage for use by a bus connectable to the electric drive system; and
bucking power supplied by the hybrid electric vehicle when available by converting power from the bus voltage to the battery voltage for storage in battery; and
wherein a single inductor functions during each of charging the battery with the AC power, boosting power supplied to the hybrid electric vehicle, and bucking power supplied by the hybrid electric vehicle.

17. The method of controlling power of claim 16, wherein a power transfer between the battery and the bus is at least 5 kilowatts.

18. The method of controlling power of claim 16, wherein charging of the battery is less than about 8 hours.

19. The method of controlling power of claim 18, wherein charging of the battery is less than about 4 hours.

20. The method of controlling power of claim 16, further comprising controlling in a controller with an algorithm switch gating within the bidirectional converter.

* * * * *